(12) United States Patent
Aman

(10) Patent No.: US 10,719,134 B2
(45) Date of Patent: Jul. 21, 2020

(54) INTERACTIVE OBJECT TRACKING MIRROR-DISPLAY AND ENTERTAINMENT SYSTEM

(71) Applicant: James Andrew Aman, Poinciana, FL (US)

(72) Inventor: James Andrew Aman, Poinciana, FL (US)

( * ) Notice: Subject to any disclaimer, the term of this patent is extended or adjusted under 35 U.S.C. 154(b) by 114 days.

(21) Appl. No.: 15/975,236

(22) Filed: May 9, 2018

(65) Prior Publication Data

US 2018/0329511 A1 Nov. 15, 2018

Related U.S. Application Data

(60) Provisional application No. 62/503,746, filed on May 9, 2017.

(51) Int. Cl.

| | |
|---|---|
| G06F 3/01 | (2006.01) |
| A63J 21/00 | (2006.01) |
| G08C 17/02 | (2006.01) |
| A63H 30/04 | (2006.01) |
| G06F 3/03 | (2006.01) |
| A63G 31/00 | (2006.01) |
| A63G 31/16 | (2006.01) |
| A63G 33/00 | (2006.01) |

(52) U.S. Cl.
CPC ............ *G06F 3/017* (2013.01); *A63G 31/00* (2013.01); *A63G 31/16* (2013.01); *A63G 33/00* (2013.01); *A63H 30/04* (2013.01); *A63J 21/00* (2013.01); *G06F 3/0308* (2013.01); *G08C 17/02* (2013.01); *G08C 2201/32* (2013.01)

(58) Field of Classification Search
CPC ...................................................... G06F 3/017
See application file for complete search history.

(56) References Cited

U.S. PATENT DOCUMENTS

| | | | | |
|---|---|---|---|---|
| 2016/0026253 A1* | 1/2016 | Bradski | ................ | G02B 27/225 345/8 |
| 2016/0062121 A1* | 3/2016 | Border | ............... | G02B 27/0172 359/630 |

* cited by examiner

*Primary Examiner* — Gustavo Polo

(57) ABSTRACT

A mirror-display is taught for use in a destination such as a theme park or hotel that allows a guest to move an article such as a wand in front of the mirror-display, where the movements are tracked and interpreted as commands. Visual movement feedback of the article is provided to help train the guests. The mirror-display can act as a full mirror, but then switch into a half-mirror mode where the guest sees their partial reflection along with output from the display, or a transparent mode where the guest does not see their reflection. Output includes secret messages only viewable to guests wearing glasses that are controllably detected and synchronized with the display output. The mirror-display comprises means for automatically determining guest identity and for exchanging commands and information with either or both of a local or global eco-system.

27 Claims, 12 Drawing Sheets

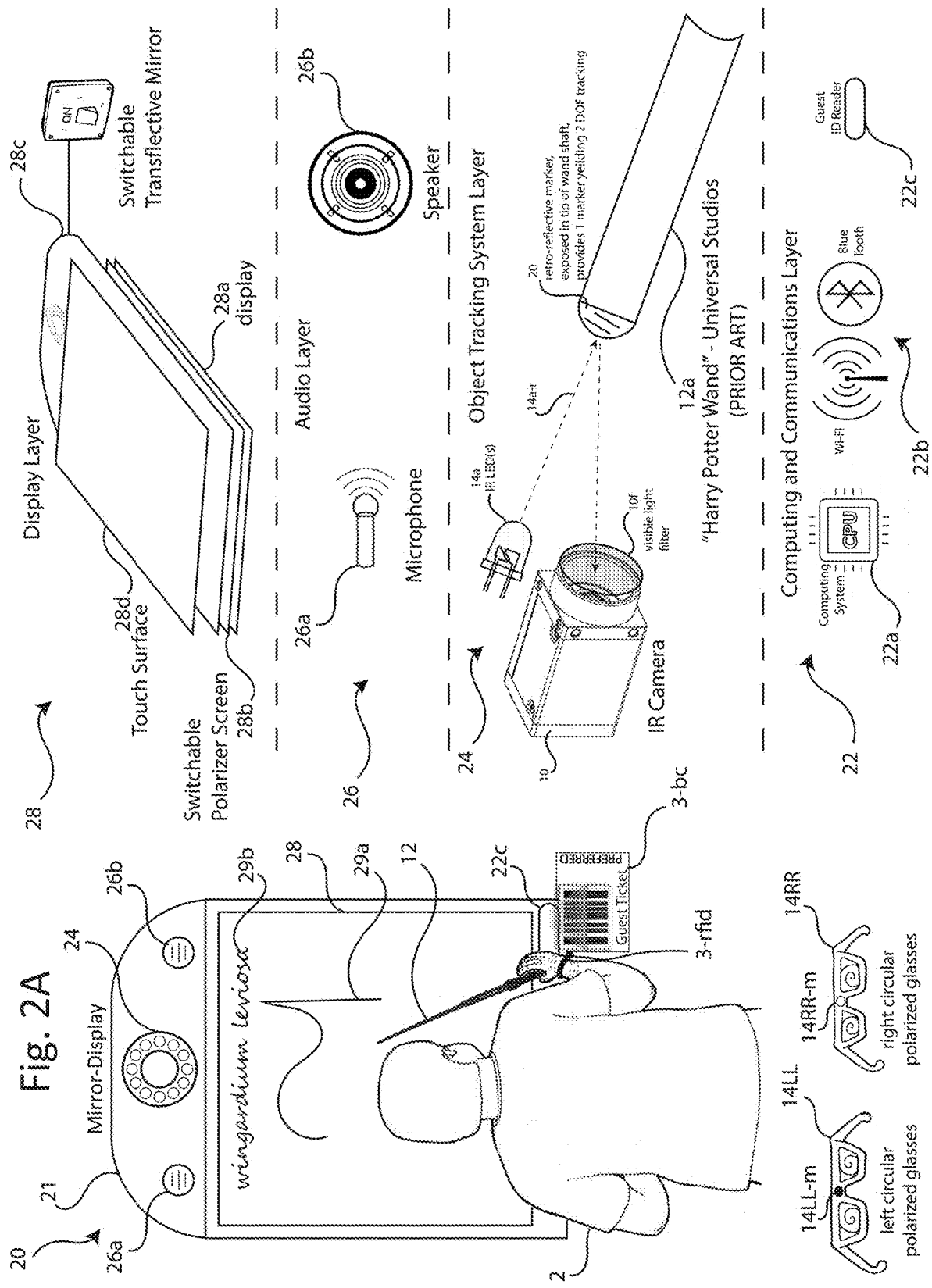

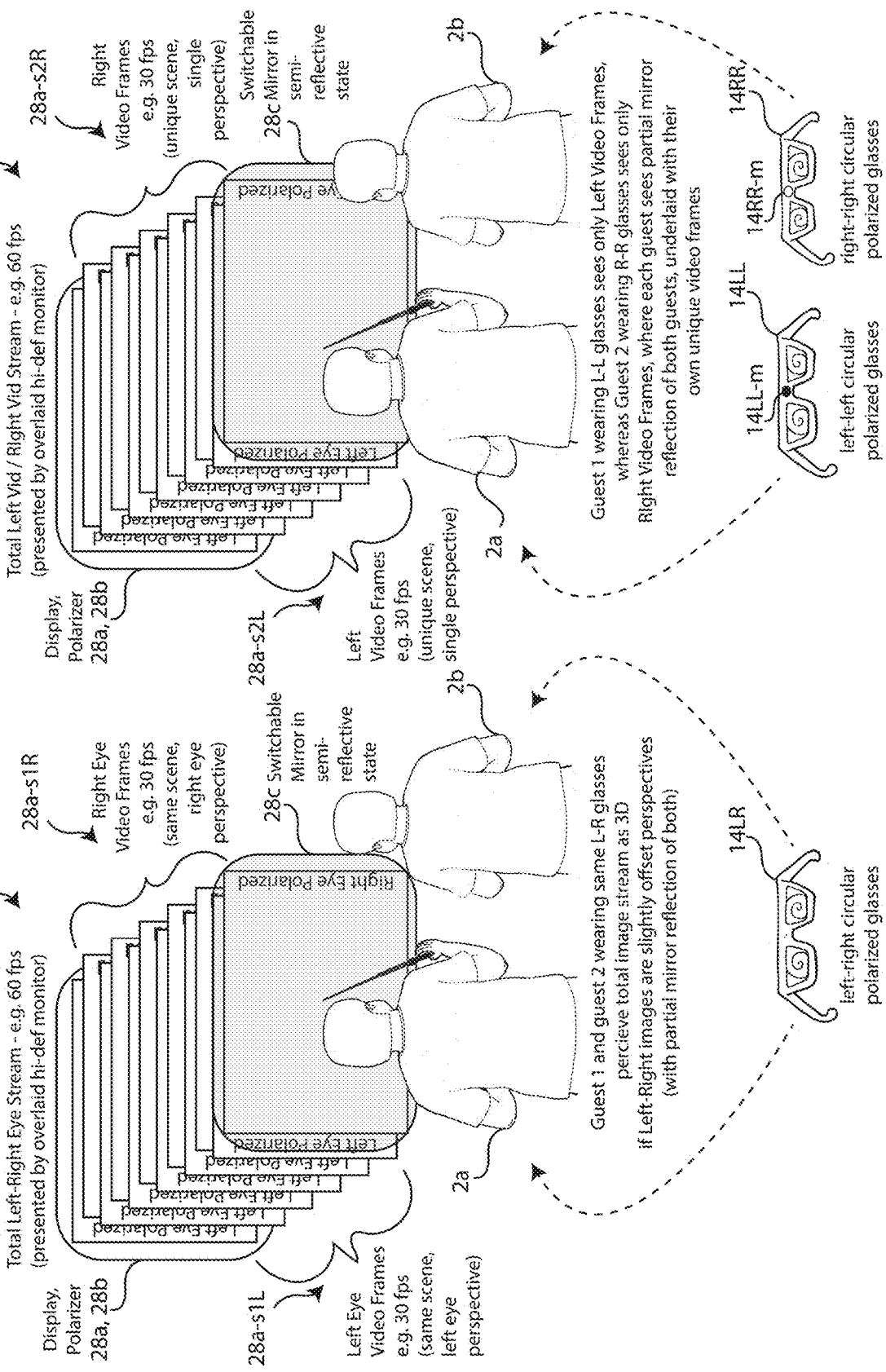

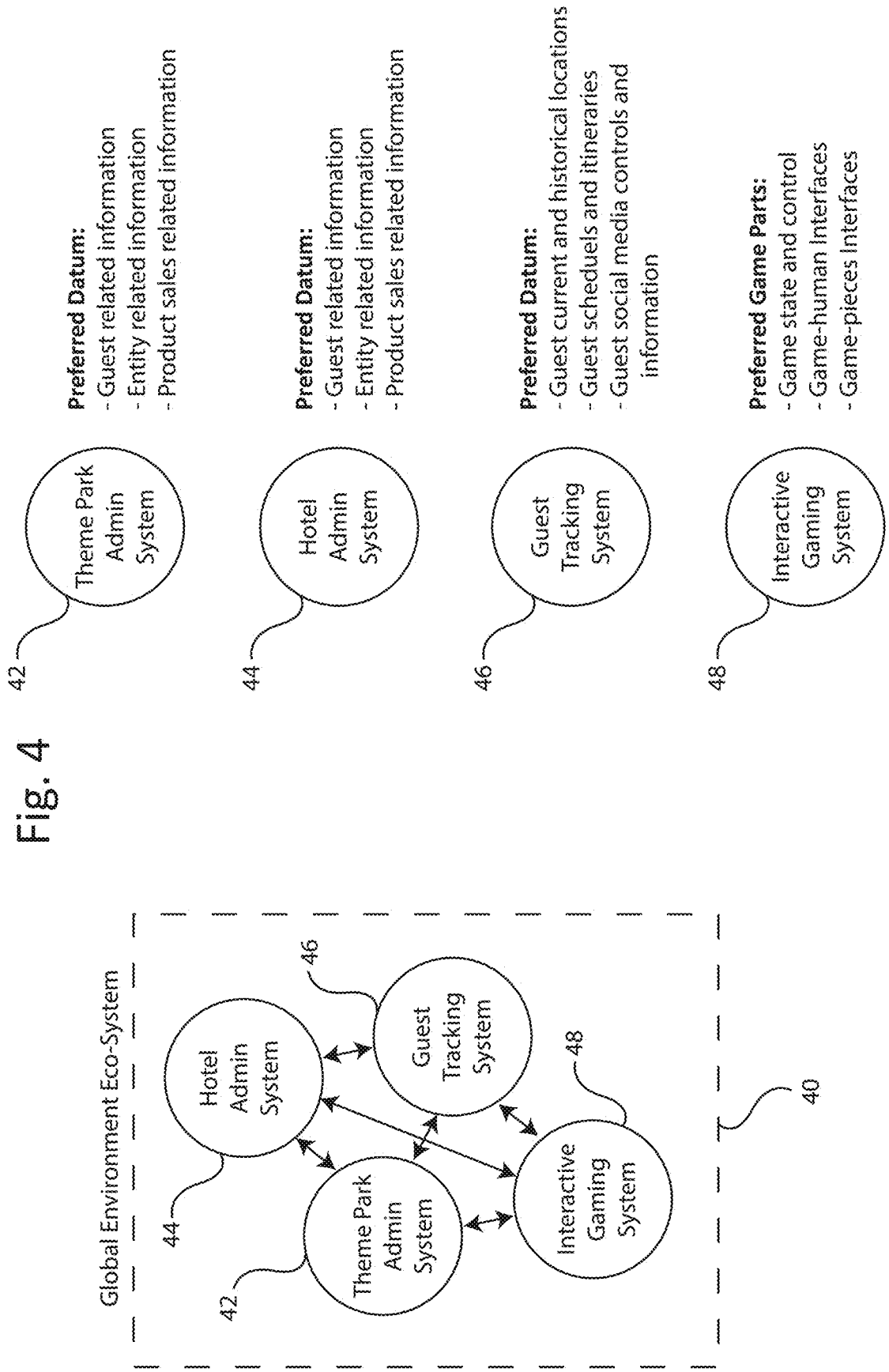

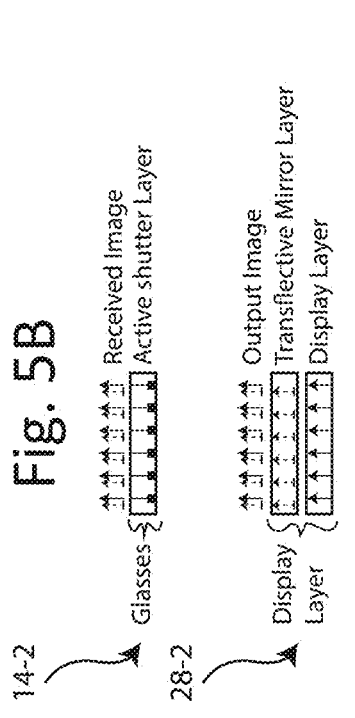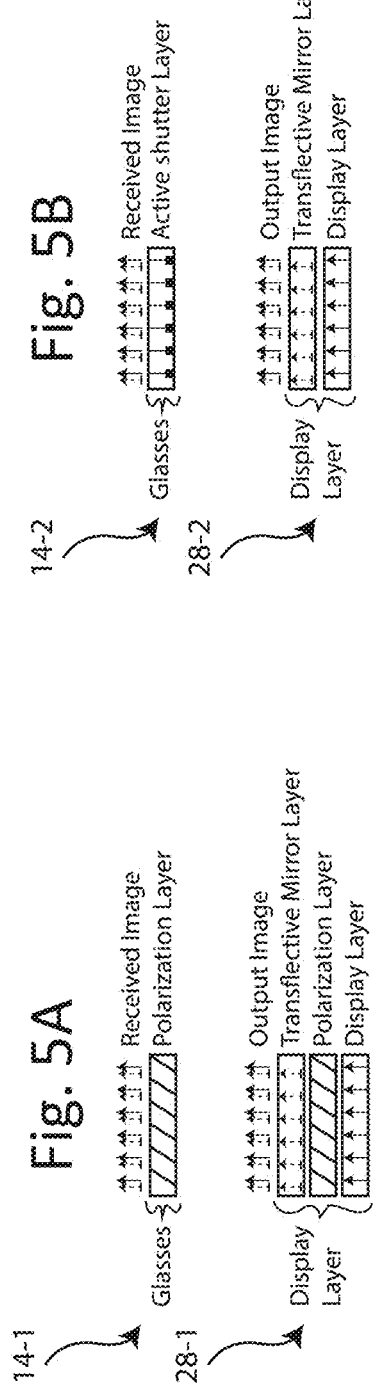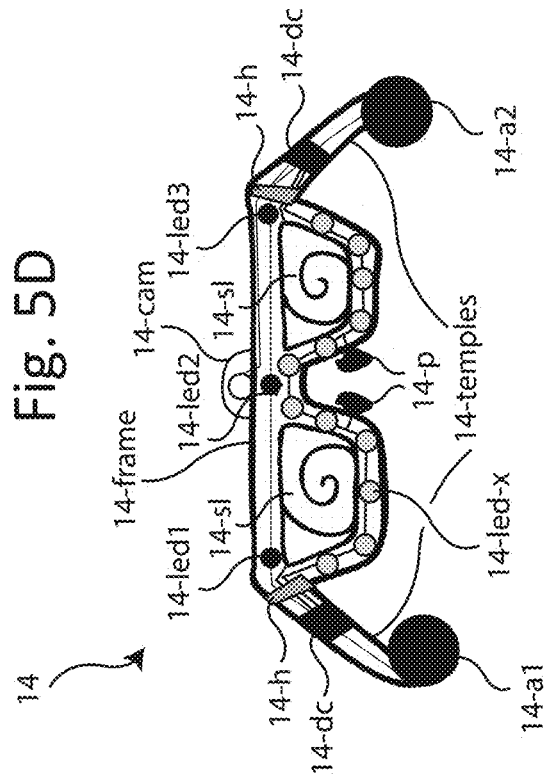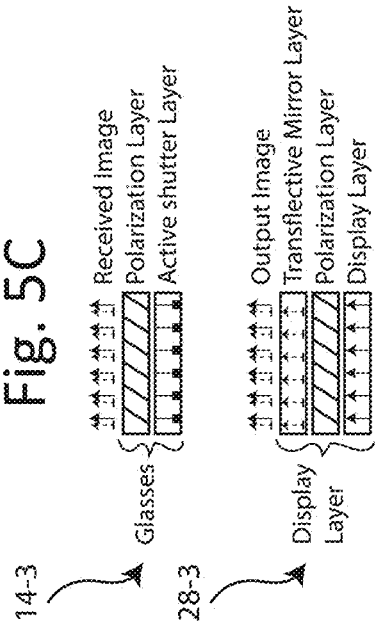

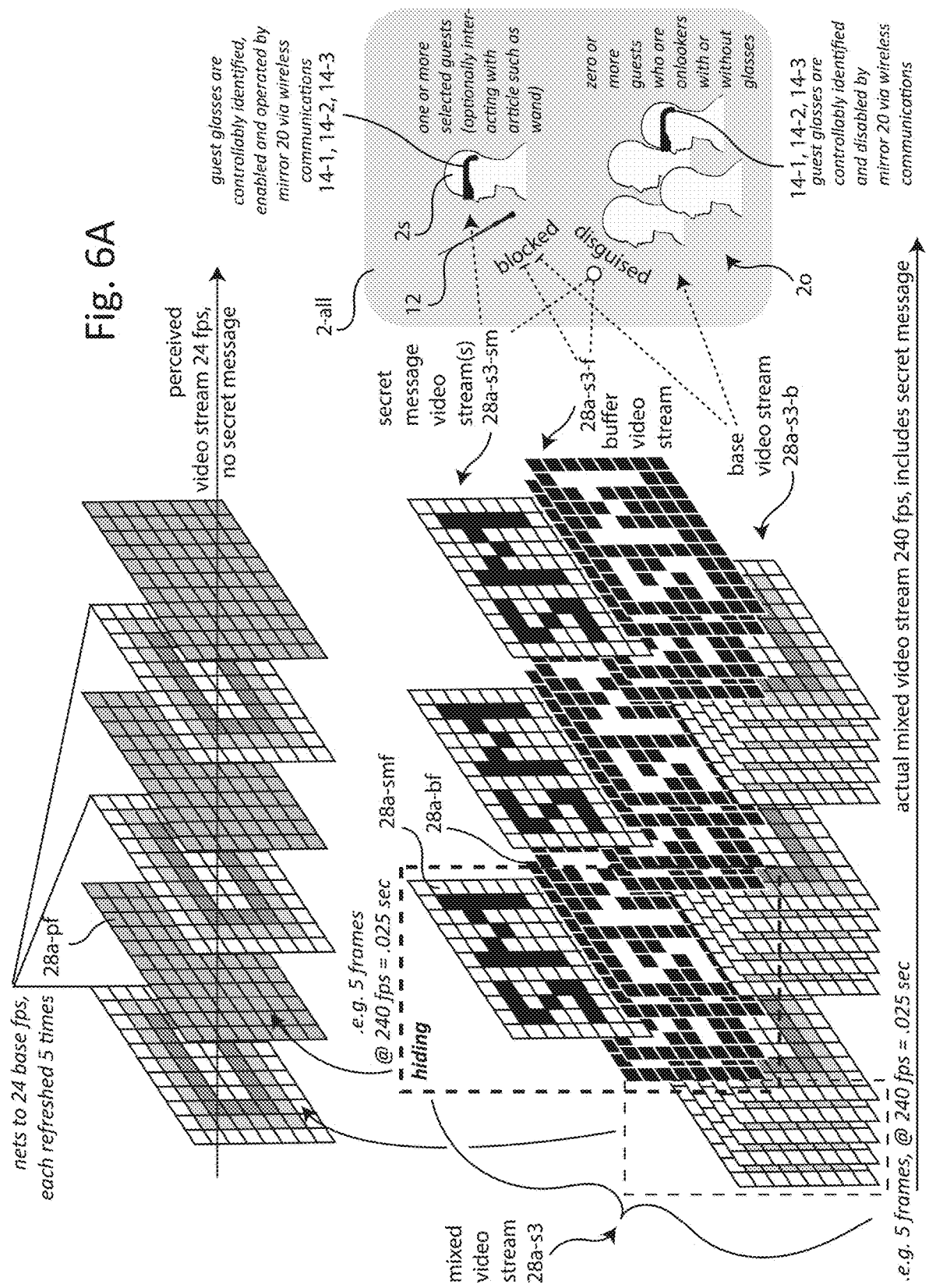

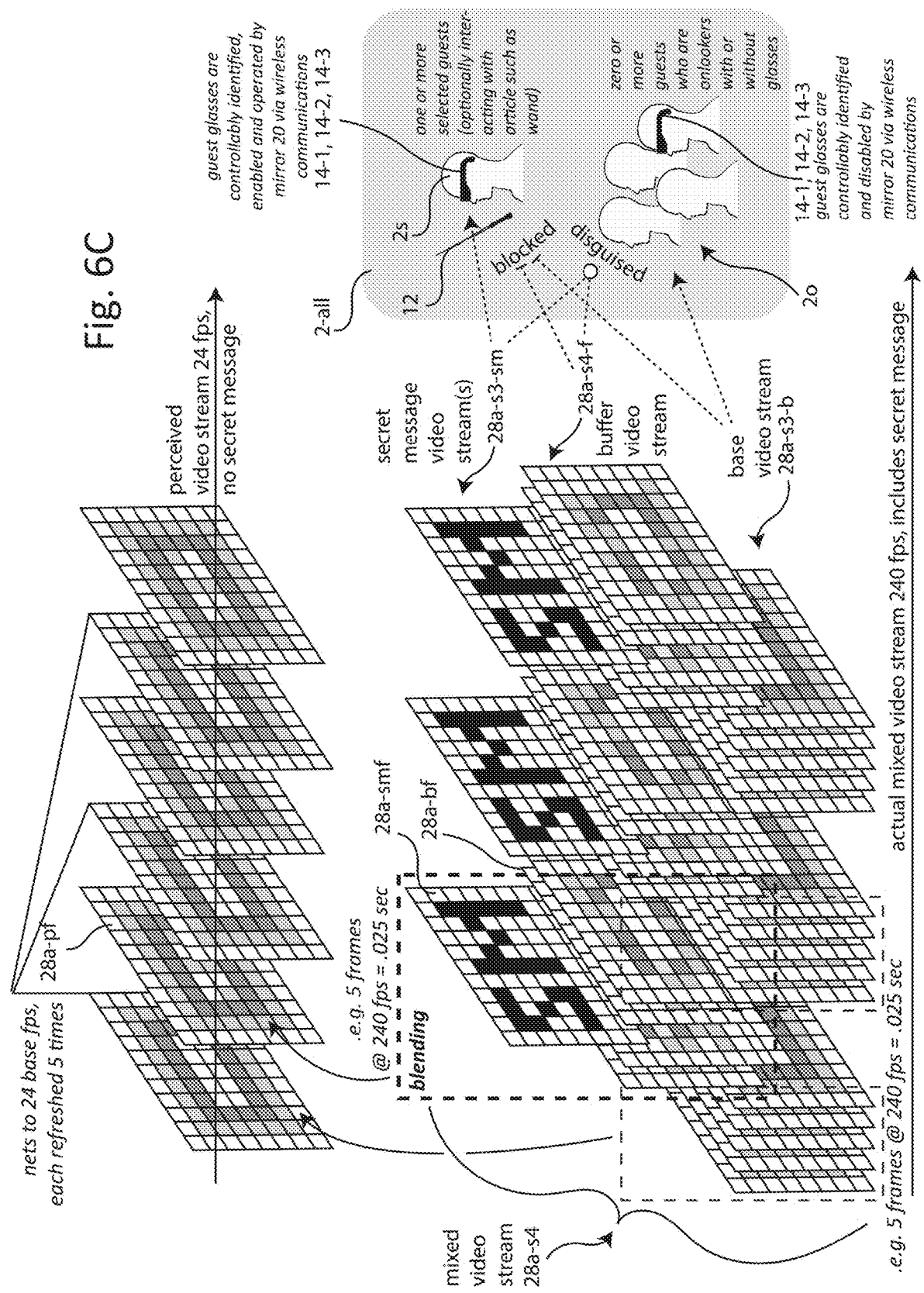

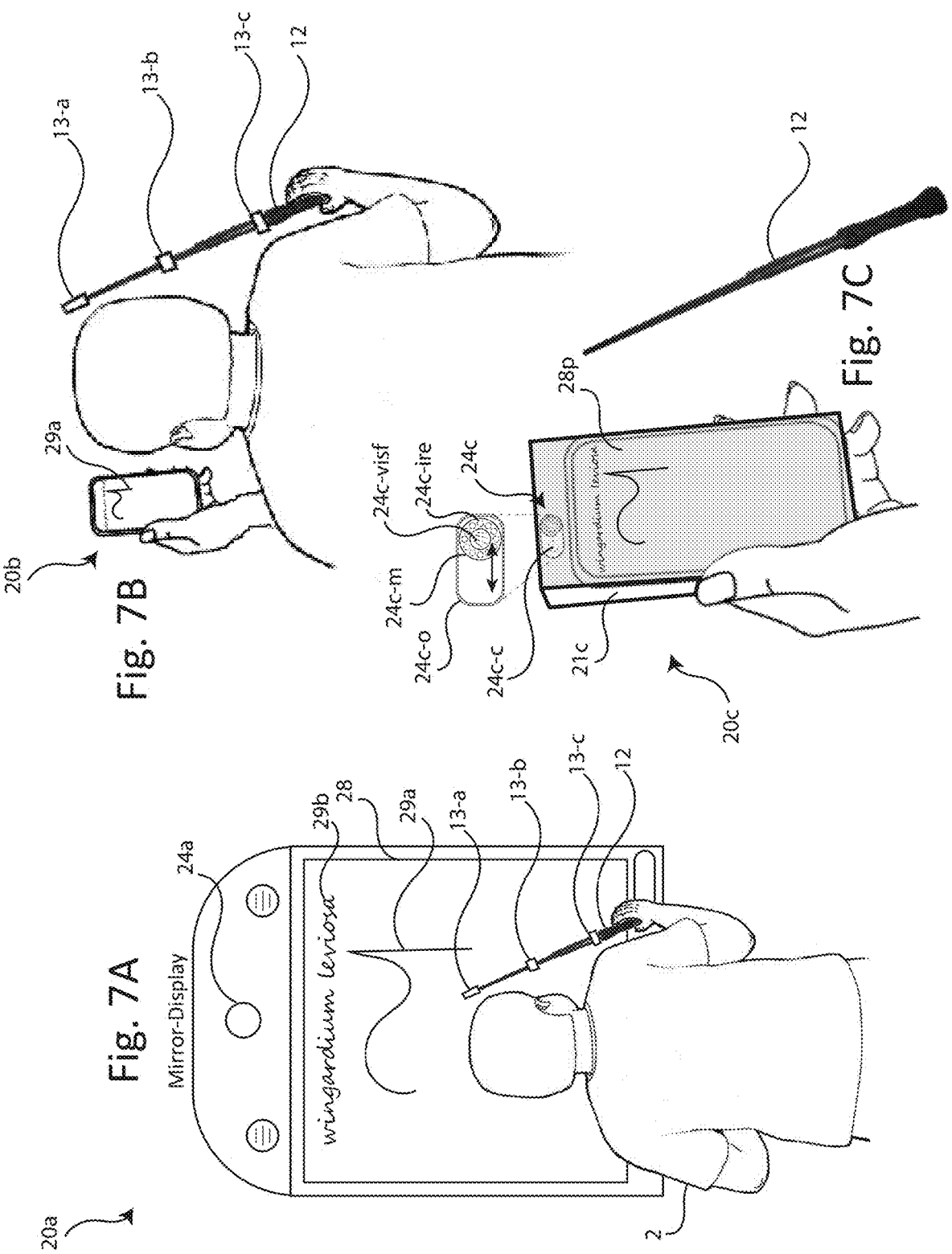

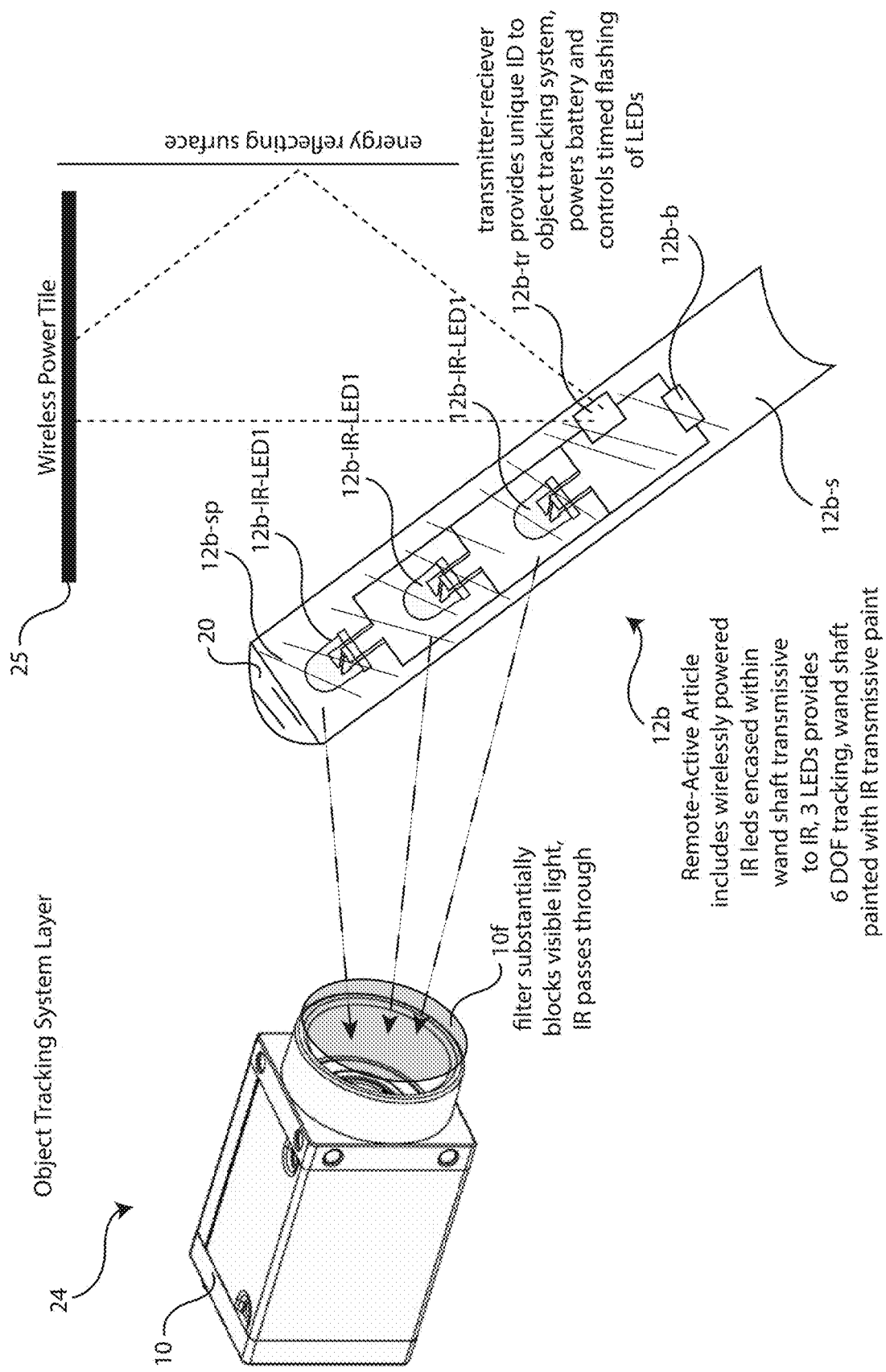

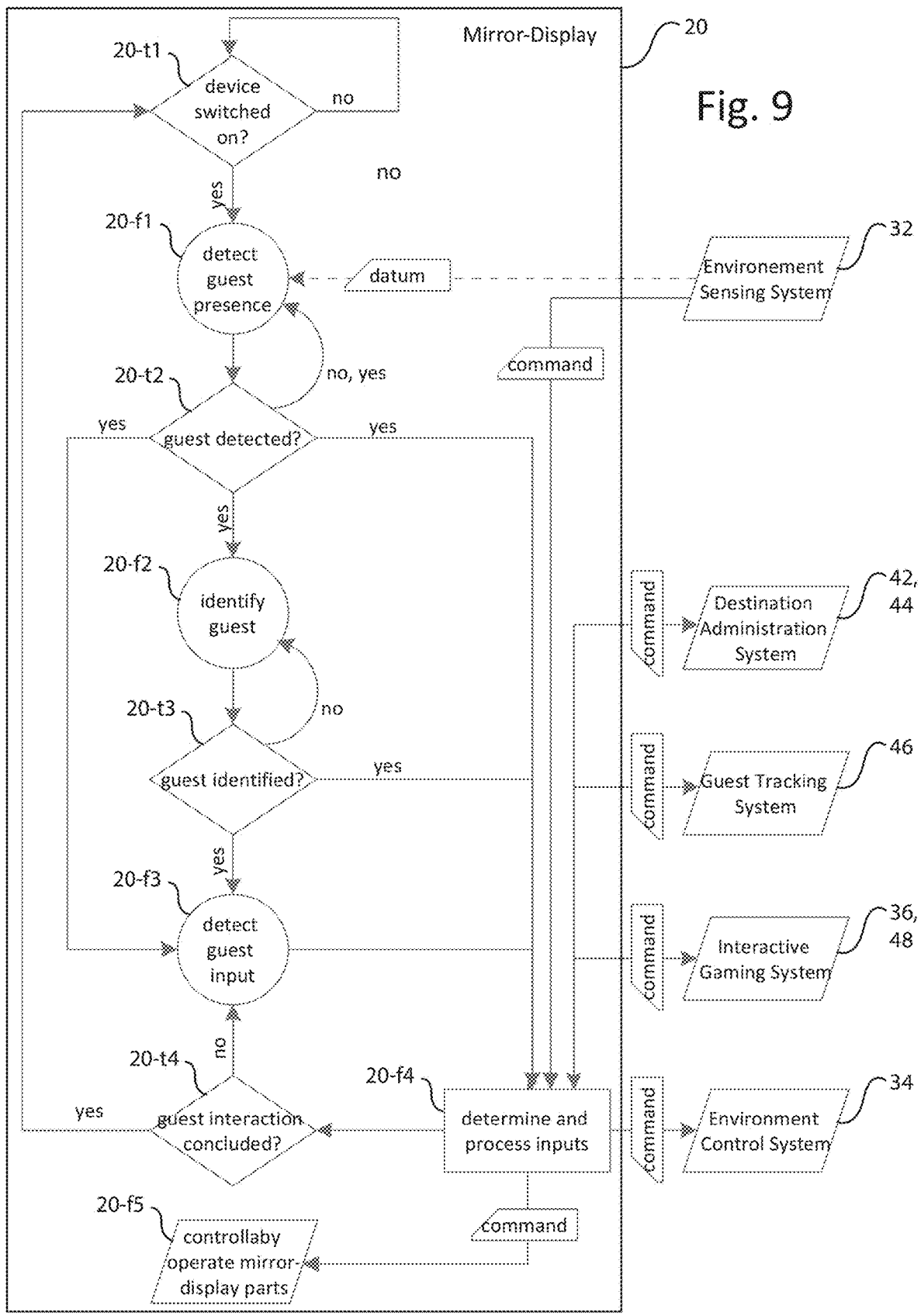

INTERACTIVE OBJECT TRACKING MIRROR-DISPLAY AND ENTERTAINMENT SYSTEM

CROSS-REFERENCE TO RELATED APPLICATIONS

This application claims the benefit of U.S. Provisional Application No. 62/503,746 filed on May 9, 2017.

FIELD OF INVENTION

The present invention relates to interactive display apparatus and methods.

BACKGROUND OF THE INVENTION

Theme parks such as Universal Studios and Disney World provide immersive environments for their guest's enjoyment. Overtime, parks such as these have incorporated major movie themes into their settings and rides. Examples include the Wizarding World of Harry Potter at Universal Studios and a new Star Wars Land currently being built at Disney World. As theme park rides and environments become more sophisticated, new ways for engaging the park visitor when they are not on a ride are also becoming increasingly valuable.

One example of a new type of theme integrated, non-ride visitor engagement is the SYSTEM AND METHOD FOR TRACKING A PASSIVE WAND AND ACTUATING AN EFFECT BASED ON A DETECTED WAND PATH described by Kawash, et al. in pending application US 2014/0240102 A1. The teachings of this system have been implemented at Universal Studios where guests may purchase a Harry Potter Wand constructed in accordance with the pending application comprising an infrared (IR) retroreflective tip, which may then be used in front of various playing areas such as a store-front within the Wizarding World of Harry Potter. These playing areas include hidden IR LEDs for emitting IR tracking energy that is retroreflected off the tip of the wand, where the retroreflected energy is then detected by a camera filtered to receive the IR energy, after which the images are processed in order to track the wand tip in two degrees of freedom (2 DOF,) e.g. X and Y. As the wand tip transverses through various positions its path is then compared to a pre-known set of paths, where each path defines a unique "spell." If a guest correctly moves their wand's tip, mimicking a spell path or gesture, then the system outputs a control signal to actuate an effect, e.g. causing a fake flower to move.

The present invention is capable of working with the Kawash, et al. teachings and also provides a first preferred alteration that allows the Harry Potter wand to be tracked using visible light in 6 DOF, and a second preferred alteration to allows for a new type of wand that is remote-active and provides at least 3 IR LEDs embedded within the wand for emitting non-visible IR tracking signals (thus the wand is active) while then being powered/recharged by remote wireless power (thus the wand is remote-active.) Regardless of the type of wand implemented, the present system then further addresses the lack of feedback to the park guest regarding their spell path trajectories using the current Kawash, et. al teachings. Some of the spells are not easy and young children especially can find it difficult to comprehend the path their wand tip is tracing as they stand in front of a Universal play area. Their only feedback is to not see the hoped-for effect. To compensate for this, Universal Studios dedicates a park agent to stand and provide assistance and training. Also, the Kawash system does not include or anticipate the use of facial recognition as a means of identifying individual park guests, matching them through a database to their specific wand nor is there any means within the Kawash wand for providing a unique wand ID.

The present inventor envisions solutions to these problems that also then extend into new opportunities to enhance the guest experience that both coordinate with the Harry Potter Wand and extend beyond the Harry Potter Wand into new uses. It is also important to note that while a Harry Potter Wand is used as an exemplification of a guest-controlled article for indicating gestures and commands through an interactive user interface, this should not be construed as a limitation of the present invention. As is mentioned herein, and will be evident from a careful reading of the present teachings, other objects may be used by guests to indicate gestures, especially those of similar elongated shapes such as a Disney Light Saber, or a Wizard's Staff, swords, rifles, etc. As will be discussed further in the conclusion and ramifications to the present invention, the present inventor also anticipates a theme character mask and gloves as devices like a wand for interfacing with the present invention.

The major opportunity for extending and increasing the guest experience as taught herein, is the creation of a new "magic mirror" to provide a visible user interface going beyond the hidden emitter and sensing device necessary for interacting with a guest by tracking Wand movements as described by Kawash et al. Such a magic mirror as presently envisioned would have several key goals including: 1) providing visual feedback to the guest for practicing and leaning article movements, 2) extending the use and enjoyment of the article tracking concepts, where the article for example is Universal Studio's Harry Potter Wand, beyond the destination such as a theme park into other destinations such as theme park hotels, restaurants, shops, museums, airports and even to a guest's home, 3) providing means for conveniently sensing or in some way determining guest identity, 4) providing access to theme park and hotel information systems for information exchange and transactions, 5) providing interfaces to local environment sensors and controls, where the local environment includes a hotel room or guest home, 6) providing access for interacting with a distributed community of guests for collective experiences including for example theme park-wide games, contests, treasure hunts, etc., 7) interacting with a guest wearing either passive and active glasses for receiving secret messages and communications, 8) interacting with a guest via their mobile device (such as a cell phone or tablet) loaded with a specialized theme park app causing the mobile device to act as magic mirror and otherwise contribute as a theme park-wide game interface, as well as other benefits of the present invention that will be obvious to those skilled in the art of theme parks, guest services and entertainment.

Indeed, within the Harry Potter books and movies there is also thematic support for the concept of a magic mirror, where the Mirror of Erised as was introduced in the first Harry Potter movie entitled Harry Potter and the Sorcerer's Stone. A particular point of interest is that the Mirror of Erised would cast both a reflection as well as an image of what the viewer desired, where multiple individuals standing in front of the Mirror or Erised at the same time would see each other's reflections as would be normal with a mirror, but simultaneously see a private visualization of their own desires. The present invention teaches apparatus and methods for accomplishing this same effect, which is anticipated to both support the Harry Potter storyline as well as provide unique possibilities for enhancing the guest experience, especially in relation to theme park-wide games.

The concept of a non-adjustable mirror-display is well known and essentially comprises a display mounted behind a fixed two-way mirror such that a person can stand in front of the mirror-display and see a combination of a partial reflection of themselves as well as information being output by the underlying display. Since the two-way mirror is fixed in this permanent state and is not therefore electronically controllable, it is not then possible to allow the mirror-display to have multiple modes of operation, e.g. including a mirror-only mode for guests not wanting the mirror-display functionality, while then also allowing the a partial-mirror-display mode for providing partial reflections of the guests and for example secret message images, or a display-only mode for providing video information without substantially guest reflections.

There are many videos available on YouTube for building such non-adjustable mirror-display systems. However, these mirror-displays are unable to track specifically crafted articles like the Harry Potter wand with its IR retroreflective tip, or the preferred alternate wands of or tracking techniques as described herein. What is minimally needed is a mirror-display combined with at least 2 DOF and preferably 6 DOF object tracking, where such a system could amongst other benefits provide a means for training the guest by showing them in real-time the path their article (e.g. wand) tip is tracing out, alternatively in comparison to a visualization of the pre-established path that they are attempting to mimic. What is also needed is apparatus for allowing two different guests to stand in from of the same mirror-display, see each other's mirror reflection but then also see different private display images. It is also preferable that the mirror function as a full mirror with a hard switch such that guests in a hotel control the mirror to remain in a mirror-only mode. Alternatively, the guest may activate the mirror-display to then be in a mirror-display mode than tracks an article such as the Harry Potter or similar wand, allowing a guest to cast spells for example changing the mirror into a partial-mirror-display for receiving secret messages while also seeing their own reflections.

There are currently several other existing technologies that are available in the marketplace for creating novel extensions to the basic mirror-display for accomplishing the goals of the present invention. The technologies include: switchable transflective mirrors, switchable polarization screens, passive and active polarization glasses, active shutter glasses, image processing and object tracking software techniques, and communications networks with secured command and information exchange. The present invention teaches how these existing technologies are uniquely combinable for achieving the goals envisioned and stated herein, such that individual guests are afforded extended and increased user experiences.

BRIEF SUMMARY OF THE INVENTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes a mirror display capable of multiple states or modes of operation at least including partially reflecting the image of a guest while also displaying customized video content, where the mirror is further adapted to include an object tracking system for detecting and tracking the movement of an marked article being held by the guest, various identification methods for identifying the guest, and a computer and communication means for exchanging commands and information with both local and global environment eco-systems, whereby the guest indicates and responds to commands at least in part using detected movements of the article. When the present invention is used within a destination such as a theme park setting, commands have many uses including retrieving theme park or hotel related information, retrieving event and product information, conducting transactions, causing changes to the local environment and participating in games and contests. The embodiment further includes interacting with passive or active glasses worn by a guest to at least present customized video to one or more guests that is not visually apparent to other guests.

In accordance with alternate embodiments, the mirror display operates without a mirror function, and the mirror display and coordinated glasses operate based upon various combinations of polarization and active shutter. In still yet other embodiments, the mirror display is implemented as a combination of a guest mobile device controlled by a specialized theme park app, where additional variations include a mobile device case for adding IR based object tracking for working with either an existing Harry Potter Wand tracking 2 DOF or the new teachings of the present invention that provides 6 DOF.

BRIEF DESCRIPTION OF THE SEVERAL VIEWS OF THE DRAWING

FIG. 2A is a combined front view and parts diagram of mirror-display 20, where the parts are associated with several layers including computing and communication 22, object tracking 24, audio 26 and display layer 28. Also depicted with mirror-display 20 are coordinated glasses 14LL and 14RR.

FIG. 2B is a front-view conceptual diagram of a display 28a with an overlaid polarizing layer 28b, the combination of which outputs an alternating stream of left-eye and right-eye polarized images that pass through an overlaid switchable mirror 28c set to a semi-reflective state. Also shown are guest 2a and 2b each wearing identical polarizing glasses 14LR whereby each guest is perceiving the output stream of images as 3D.

FIG. 2C is a front-view conceptual diagram of a display 28a with an overlaid polarizing layer 28b, the combination of which outputs an alternating stream of two different unique 2D scenes, where each scene is polarized oppositely.

Polarized images then pass through an overlaid switchable mirror 28c set to a semi-reflective state. Also shown are guest 2a and 2b each wearing different oppositely polarizing glasses 14LR whereby each guest is perceiving either of the two different 2D output scenes, but not both.

Figure 3:
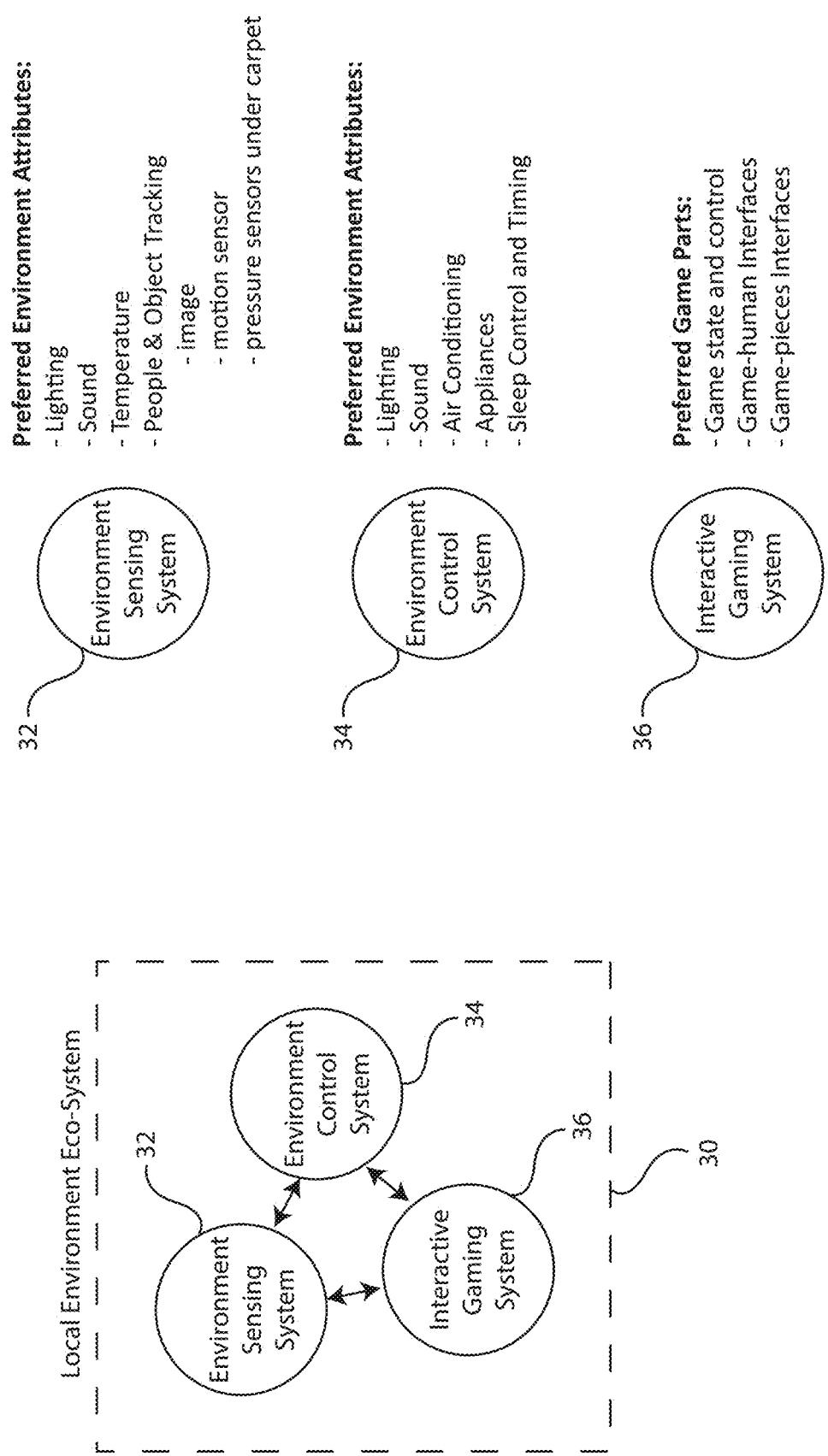

FIG. 3 is a block diagram detailing the local environment eco-system 30 as comprising environment sensing system 32, environment control system 34 and interactive gaming system 36. Each system 32, 34 and 36 is shown with example attributes or parts.

FIG. 4 is a block diagram detailing the global environment eco-system 40 as comprising theme park admin system 42, hotel admin system 44, guest tracking system 46 and interactive gaming system 48. Each system 42, 44, 46 and 48 is shown with example preferred datum or parts.

FIG. 5A is a block diagram of a construction of display layer 28-1 and coordinated glasses 14-1, where the construction comprises a polarization layer both within display layer 28-1 and glasses 14-1.

FIG. 5B is a block diagram of a construction of display layer 28-2 and coordinated glasses 14-2, where the construction comprises an active shutter layer within glasses 14-2.

FIG. 5C is a block diagram of a construction of display layer 28-3 and coordinated glasses 14-3, where the construction comprises a polarization layer both within display layer 28-3 and glasses 14-3, and active shutter layer within glasses 14-3.

FIG. 5D is a front view diagram of representative glasses 14, that can be any of glasses 14-1, 14-2 and 14-3, where glasses 14 include detector-communicator 14-*dc* for controlling glasses 14 components and communicating with mirror-display 20, where components include: in-use detectors such as hinges 14-*h* or nose pads 14-*p*, active shutter and/or passive or active polarization filter lenses 14-*sl*, hidden signal LEDs 14-*led*1, 14-*led*2 and 14-*led*3, visible notification signal LEDs 14-*led-x*, camera 14-*cam*, audio outputs 14-*a*1 and 14-*a*2.

FIG. 6A is a block diagram of a mixed video stream 28*a*-*s*3 comprising base video stream 28*a*-*s*3-*b* mixed with secret message stream 28*a*-*s*3-*sm* and buffer video stream 28*a*-*s*3-*f*, where the buffer images 28*a*-*bf* in stream 28*a*-*s*3-*f* are created to hide secret images 28*a*-*smf* into neutralized frames 28*a*-*pf*. Also shown are all guests 2—all comprising selected guests 2*s* that perceive secret message stream 28*a*-*s*3-*sm* and other guests 2*o* that do not perceive secret message stream 28*a*-*s*3-*sm*.

Figure 6B:
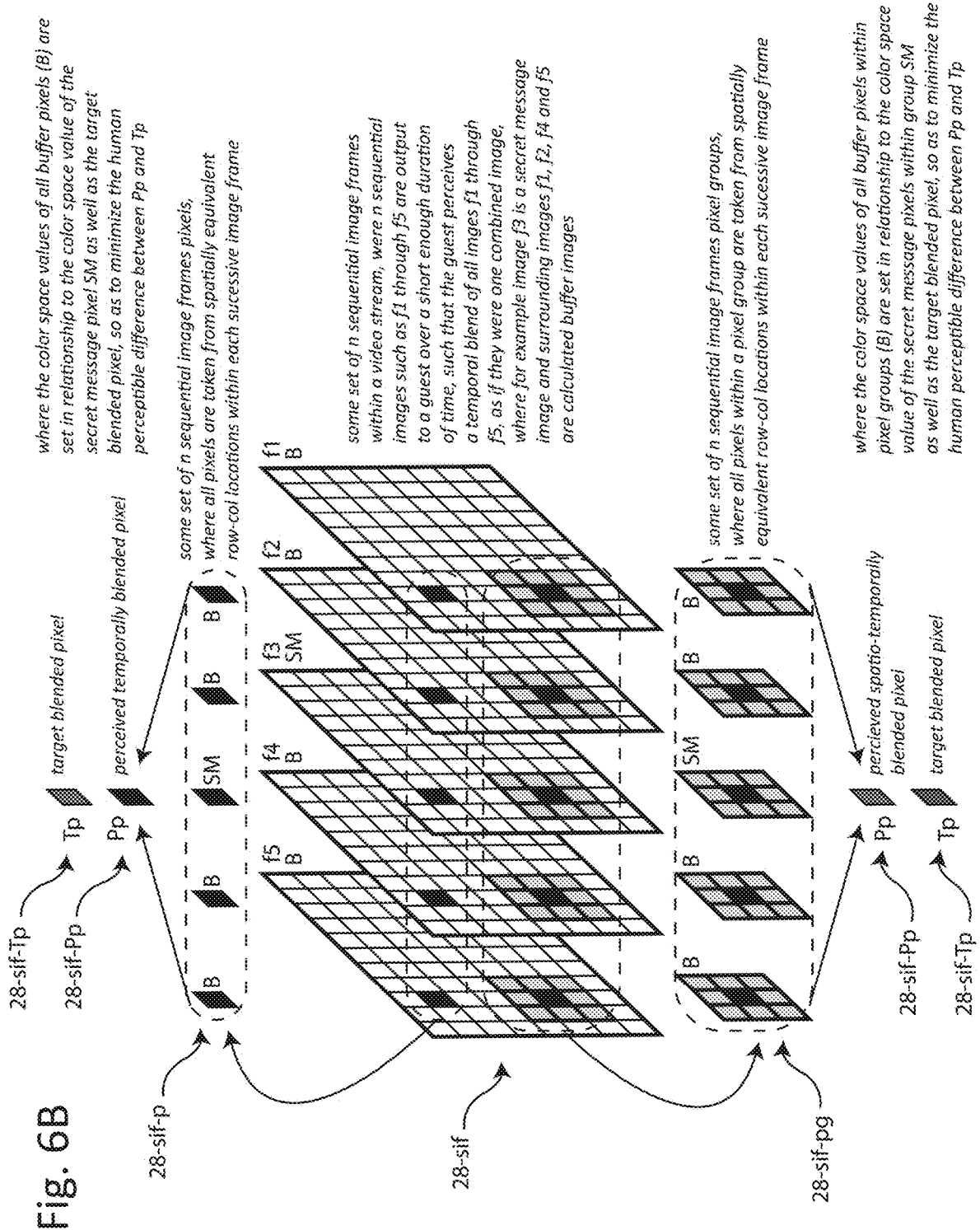

FIG. 6B is a block diagram showing a series of five single image frames 28-*sif*, across and within which are 5 single pixels 28-*sif-p* forming a temporally blended pixel 28-*sif*-P*p* for matching with a target pixel 28-*sif*-T*p*. Also depicted across and within the five single image frames 28-*sif* are 5 pixel groups 28-*sif-pg* forming a spatio-temporally blended pixel 28-*sif*-P*p* for matching with a target pixel 28-*sif*-T*p*.

FIG. 6C is a block diagram of a mixed video stream 28*a*-*s*4 comprising base video stream 28*a*-*s*3-*b* mixed with secret message stream 28*a*-*s*3-*sm* and buffer video stream 28*a*-*s*4-*f*, where the buffer images 28*a*-*bf* in stream 28*a*-*s*4-*f* are created to blend secret images 28*a*-*smf* into the temporally surrounding base images comprising stream 28*a*-*s*3-*b*. Also shown are all guests 2—all comprising selected guests 2*s* that perceive secret message stream 28*a*-*s*3-*sm* and other guests 2*o* that do not perceive secret message stream 28*a*-*s*3-*sm*.

FIG. 7A is an alternate embodiment mirror-display 20*a* comprising a lower cost object tracking system 24*a* that is only capable of capturing visible light images, and a lower cost passive transflective layer. Also shown are visible markers 13-*a*, 13-*b* and 13-*c* for adhering to article 12 providing trackable points for system 24*a*.

FIG. 7B is an alternate embodiment mirror-display 20*b* comprising a mobile device running a special theme park application for causing the mobile device to mimic alternate mirror-display 20*a*.

FIG. 7C is an alternate embodiment mirror-display 20*c*, that is further adapted from alternate 20*b* that tracks article 12 in visible light to include case 21*c* with opening 24*c-o* that exposes mobile device camera 24*c-c*, where mount 24*c-m* is movable within opening 24*c-o* so as to cause visible light filter 24*c*-*visf* and IR LEDs 24*c*-*ire* to optionally cover the native mobile device camera 24*c-c* such that mirror-display 20*c* acts like mirror-display 20 and tracks article 12 in IR.

FIG. 8 depicts a remote-active article 12*b* that is a preferred alternate to article 12, where article 12*b* comprises a shaft 12*b-s* within which one or more IR emitting LEDs such 12*b*-IR-LED1, 12*b*-IR-LED1 or 12*b*-IR-LED1 are embedded, where the IR emitting LEDs are powered by a rechargeable battery 12*b-b* connected to the LEDs in a circuit also comprising wireless power system transmitter-receiver 12*b-tr*. Transmitter-reviver 12-*b-tr* communicates a unique identification for identifying article 12*b* to system 1, receives remote wireless power from tile(s) 25 and receives control signals for operating IR emitting LEDs, where the emissions of the IR LEDs transmit through the IR transmissive material of article shaft 12*b-s* and any shaft paint 12*b-sp* to be detected by at least one camera 10 of the object tracking system 24.

FIG. 9 depicts a flow diagram of the five main internal functions of the mirror-display 20 including: 1) detecting a guest's presence 20-*f*1; 2) identifying the detected guest 20-*f*2; 3) detecting guest inputs 20-*f*3; 4) determining and processing the detected inputs 20-*f*4 as guest responses and commands, and 5) controllably operating mirror-display parts 20-*f*5. Also depicted are the four main tests processed by the mirror-display 20 including: 1) determining if the device (mirror-display 20) is switched on 20-*t*1; 2) determining if a guest has been detected 20-*t*2; 3) determining the identity of a detected guest 20-*t*3, and 4) determining if a guest's interaction with the mirror-display 20 is concluded 20-*t*4.

In the following description, numerous specific details are set forth, such as examples of specific components, types of usage scenarios, etc. in order to provide a thorough understanding of the present disclosure. It will be apparent, however, to one skilled in the art that the present disclosure may be practiced without these specific details and with alternative implementations, some of which are also described herein. In other instances, well known components or methods have not been described in detail in order to avoid unnecessarily obscuring the present disclosure. Thus, the specific details set forth are merely exemplary. The specific details may be varied from and still be contemplated to be within the spirit and scope of the present disclosure.

DETAILED DESCRIPTION OF THE INVENTION

Figure 1:
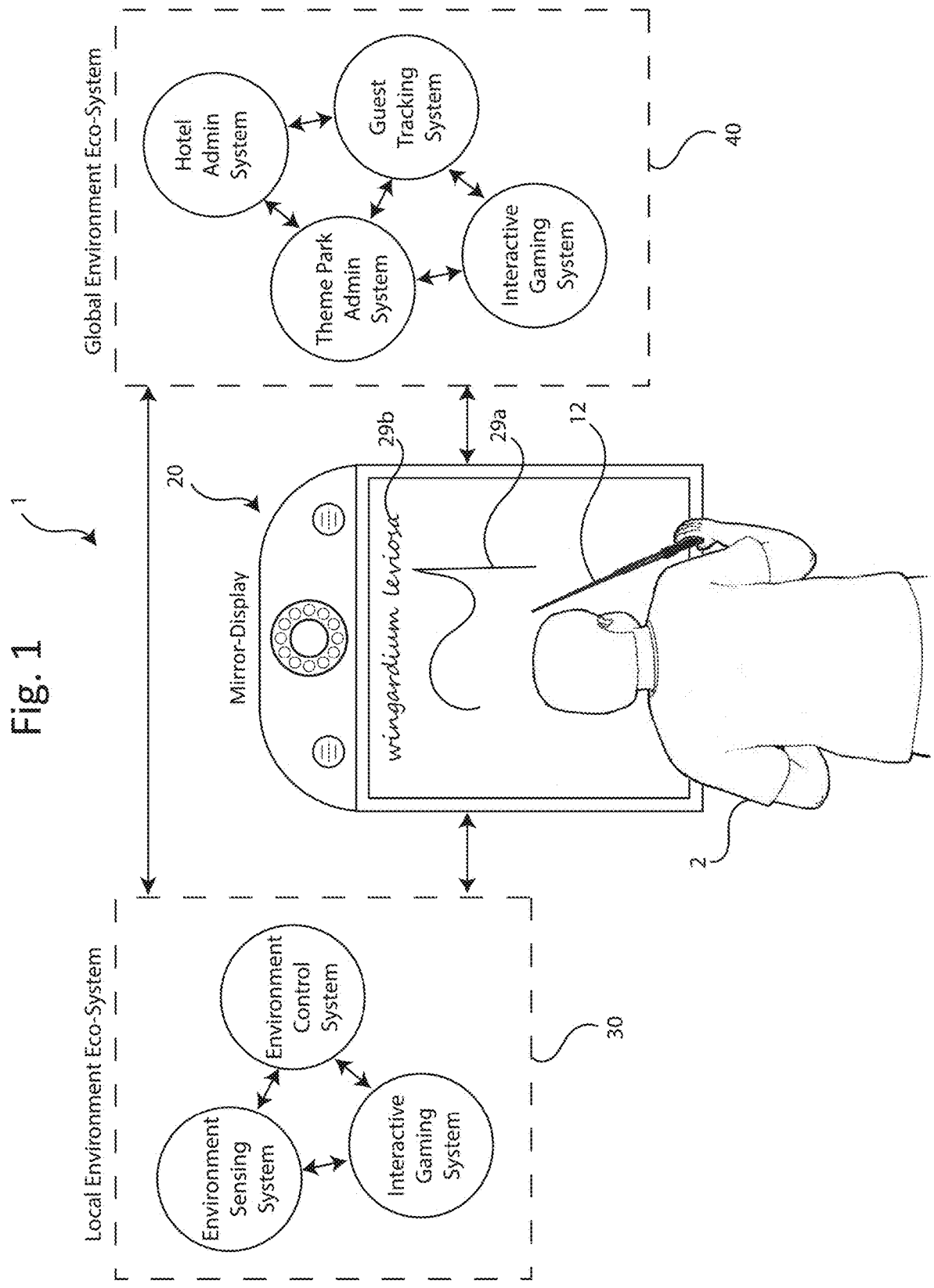
FIG. 1 is a combined front view and block diagram of preferred system 1 comprising mirror-display 20, local environment eco-system 30 and global environment eco-system 40. Guest 2 interacts with mirror-display 20 in one of many ways to indicate guest commands including moving an article 12 in any of six degrees of freedom (6 DOF) recognizable to mirror-display 20 as pre-known paths and gestures that are represented by mirror-display 20 as movement feedback 29a and 29b. Eco-systems 30 and 40 generate eco-system commands. Mirror-display 20 interacts with local eco-system 30 and global eco-system 40 at least in part according to guest or eco-system commands to exchange and affect information as well as to carry out actions.

Referring to FIG. 1 there is shown preferred system 1 comprising mirror-display 20, local environment eco-system 30 and global environment eco-system 40. Mirror-display 20 and eco-systems 30 and 40 exchange and affect information as well as carry out actions in accordance to commands communicated between and within any of the systems. Mirror-display 20 and eco-systems 30 and 40 use any of well-known methods for communicating commands as electronic information, including LANs, WANs, and WLANs, as will be well understood by those familiar with computing and communication systems. Communicated commands may be any of guest 2 commands or local 30 or global 40 eco-system commands. Guest 2 commands are indicated in any of several possible ways including by guest 2 moving article 12 detectable by mirror-display 20, by guest 2 touching mirror-display 20 in relationship to a displayed user interface or by guest 2 speaking audible commands detectable by mirror-display 20. While other ways for accepting guest 2 commands are possible, what is most important for the preferred embodiment is that mirror-display 20 is at least capable causing a partial reflection of guest 2 while also detecting, interpreting and displaying representations of the movement trajectories of article 12 as moved by guest 2, where the trajectories are either tracked in 2 DOF or preferably 6 DOF and are comparable to pre-known trajectories for interpreting guest 2 article 12 gestures as commands. It is also important to see that mirror-display 20 provides critical movement feedback such as by displaying image and video datum using mirror-display 20, preferably in real-time or near-real time that includes any one of, or combination of: 1) at least one article 12 movement representation such as tip path 29*a* that is useful to the guest 2 for both training and article movement input confirmation, and 2) at least one movement translation such as spell name 29*b* that is useful for guest 2 to at least confirm their indicated response or command.

The present inventor notes that with respect to the implementation of article 12 as a Harry Potter Wand, in comparison to the teachings of Kawash et al., the present invention is novel in that it provides visual movement feedback 29*a*, 29*b* representative of article 12's movement path useable for both training and enjoyment. While mirror-display 20 still provides many novel benefits operating in a mode similar to the teachings of Kawash et al. for detecting and interpreting article 12 movements without visual movement feedback 29*a* or 29*b*, when using the preferred mirror-display 20 guest 2 sees both their own reflection along with at least a visualization of the trajectory 29*a* being traced by the tip of the article 12. It is also anticipated that mirror-display 20 will operate in at least one mode where article 12 movements are individuated and approved by mirror-display 20 using either visual feedback such as spell name 29*b* or audible signals (e.g. an audio confirmation speaking the name of the detected spell.) This is anticipated to be especially helpful when the article 12 is a wand and guest 2 is learning wand 12 movements that are sufficiently correct for representing pre-known spells (e.g. used as game responses or commands.) While it is preferred that one or more pre-known gestures of article 12 are translatable into guest 2 commands, it is not necessary that a single gesture becomes a single command. The present inventor anticipates that multiple sequential gestures may be required for a specific command, and as such mirror-display 20 will preferably display the building sequence of gestures as some visualization, for example including symbols, letters or names such as 29*b*.

Furthermore, mirror-display 20 may require some combination of gestures along with additional indications from guest 2 for successfully indicating a command. For example, when article 12 is a wand, guest 2 might be required to make a gesture with wand 12 indicative of a spell while simultaneously speaking the name of the spell. The present inventor also anticipates using the mirror-display 20's visual interface to allow guest 2 to confirm or reject gestures, much like the concept of building a sentence in a word processor that allows for an undo/redo indication for example through an additional simple gesture or even through a touch command (e.g. pressing a virtual button being presented by and on the mirror-display 20.) The present inventor further anticipates that mirror-display 20 provides the function of replaying, or essentially retracing a prior movement path of article 12 with optional corrective indications for learning and improvement.

Still referring to FIG. 1, guest 2 commands as accepted through mirror-display 20 exchange and affect information with eco-systems 30 and 40 as well as request actions that affect physical aspects of the global or local environment. Commands have many purposes with respect to affecting information, some of which are to be detailed herein, others of which will be obvious to those skilled in the arts of information systems and in particular theme park and hotel guest services systems. Commands also have many purposes with respect to requesting physical actions to be carried out, some of which are to be detailed herein, others of which will be obvious to those skilled in the arts of environment control systems. The present inventor will further teach the use of commands for exchanging and affecting information as well as requesting actions in association with both global and local gaming systems.

Referring next to FIG. 2A there is shown mirror-display 20 along with its significant parts portrayed as layers including: computing and communications layer 22, object tracking system layer 24, audio layer 26 and display layer 28. Specifically, computing layer 22 preferably comprises at least computing system means 22*a* and communications means 22*b*, as well as optional guest ID reader 22*c*. Computing means 22*a* comprises any of well-known computer systems including PC's and single-board computers such as Raspberry Pi, where means 22*a* is preferably capable of executing software on hardware comprising processing, memory and data storage. Communication means 22*b* comprises any of well-known devices for exchanging information between computing systems, for example network cards, infrared devices, wi-fi devices and Bluetooth devices. Guest ID reader means 22*c* comprises any devices for reading guest ID formats. For example, Universal Studios uses a printed paper ticket with a barcode 3-*bc*, and as such means 22*c* includes a bar code scanner, or a camera for imaging and decoding the barcode. Disney World has instituted RFID wristbands 3-*rfid* for individual guests 2, and as such means 22*c* includes an RF ID scanner. As will be discussed shortly, object tracking system 24 may optionally include means for imaging guest 2's face for comparison and recognition using pre-known facial profiles as might be communicated to mirror-display 20 from global eco-system 40. All means on computing and communications layer 22 are well understood by those skilled in the art of automated systems and as such are not the focus of the present invention as many options are possible. What is most important is that mirror-display 20 identifies a unique guest 2, provides a reflection of the guest 2 and has means for tracking objects such as article 12 being moved by the guest 2, determining and processing commands and information, exchanging commands with either or both of the global eco-system 40 or local eco-system 30, outputting information in visual and audible formats to the guest 2 including visualizations of the moved object such as movement feedback 29*a* and 29*b*.

Still referring to FIG. 2A, object tracking system 24 preferably comprises an object tracking system capable of tracking a location on an article with cm to mm accuracy. A preferred approach uses a camera 10 that is capable of capturing images at a sufficient frame rate such as 30 fps in either visible or non-visible light, where non-visible light includes ultra-violet light and infra-red (IR) light. Tracking in a non-visible light such as IR is a preferred solution since it reduces noise by substantially removing visible light reflections off any objects within the camera's field-of-view that are not specifically pre-marked for IR tracking, all of which is well-known to those familiar with object tracking systems. To best track in non-visible IR light, a visible light filter 10*f* is typically mounted in front of the camera 10 lens, where substantially all frequencies detectable by the camera 10 that are not in the near-IR spectrum are blocked and thus the captured images primarily represent the scene in IR. Another well-known technique is to place the IR emitting light source such as one or more IR LEDs 14*a* near to the camera 10 lens and to use what are known as retroreflective markers such as 20, where the purpose of the retroreflector is to reflect a maximum amount of light back towards the emitting LED where since the IR LED 14*a* is placed near the camera 10 lens a maximum amount of IR light is captured by the camera 10. The configuration depicted as object tracking system 24 of the present figure represents the teachings of the pending Kawash, et. al. patent.

However, it is important to note that other object tracking apparatus and methods, different from the teachings of Kawash, et al. may also be implemented in mirror-display 20 as object tracking system 24. As will be understood by a careful reading of the present invention along with the alternate object tracking system teachings provided herein, both the Kawash and present alternative teachings for an object tracking system 24 are sufficient for tracking in 2 DOF the movements of the article 12 tip, where these tip movements are trajectories, paths, gestures, etc. interpretable as guest 2 responses or commands via comparison to pre-known trajectories, paths, gestures, etc. It is important to note that article 12 as taught by Kawash et al. represents actual Harry Potter Wands now being sold at Universal Studios, and as such mirror-display 20 is preferably capable of tracking the movements of an article 12 in the form of a currently existing Harry Potter Wand that is limited to a single retroreflective marker 20 in its tip.

Still referring to FIG. 2A, what is most important about object tracking system 24 is that it provides the ability to minimally track article 12 tips in 2 DOF. As long as guest 2's movements of article 12 are detected and comparable to any of pre-known trajectories, paths or gestures that are themselves interpretable as commands, object tracking system 24 in any embodiment taught by either Kawash et al. or the present inventor, or some other variation as will be obvious to those skilled in the art of object tracking systems, is considered to be within the scope of the present invention. While the present inventor prefers tracking objects such as article 12 using a camera 10 as a detector, it is possible to track objects using electromagnetic wavelengths that are not detectable to a camera 10, e.g. using RF frequencies. While RF based object tracking systems are not generally considered to be as precise as camera based systems, in some implementations of the present invention, especially based upon the form of the article 12, it is sufficient to implement the object tracking system 24 using for example any of well-known RF local positioning systems rather than a camera 10 based tracking system. And finally, the object tracking system 24, preferably includes a visible light sensor for detecting visible images, where visible images are additionally useable for performing guest 2 face recognition using for instance pre-established facial images of guests 2 provided to mirror-display 20 by for example global ecosystem 40, all as will be well understood by those familiar with the art of biometrics. However, as is also well understood, it is possible to perform facial recognition using IR images and thus visible light images are only preferred and not required. As is well-known in the art of image processing systems, it is possible to use for example either two cameras 10, one capturing in visible light and the other capturing in IR, or a single camera 10 using an internal beam-splitter to direct the incoming visible light towards a first sensor and the incoming IR light towards a second sensor. Thus, in either exemplary approach, object tracking system 24 provides for capturing both visible images (e.g. best used in facial recognition) and IR image (e.g. for tracking articles 12 using IR retro-reflectors.)

Still referring to FIG. 2A, audio layer 26 preferably comprises microphone 26*a* and speaker 26*b*. As will be well understood by those skilled in the art of human interfaces, microphone 26*a* is useful for inputting sounds from guest 2, where the sounds may be recognizable as words, claps, clicks or in any way appropriate responses or commands. Speaker 26*b* is useful for generating speech and other sounds that provide both means for responding to guest commands, prompting guests and otherwise providing entertainment. Especially in combination with display layer 28, the present inventor anticipates that mirror-display 20 will self-activate in response to local environment cues including the system 1 detected presence of one or more guests 2, where the self-activation includes presenting visualizations through display layer 28 and sounds through speaker 26*b*.

Still referring to FIG. 2A, preferred display layer 28 comprises display 28*a*, overlaid with switchable polarizer screen 28*b*, overlaid with switchable transflective mirror 28*c*, overlaid with touch surface 28*d*. Currently there are widely available plans for creating what is generally referred to as a "magic mirror" or "smart mirror." Several videos can be found on YouTube for their construction which typically includes display 28*a* overlaid with a non-switchable two-way mirror, as will be discussed with respect to upcoming FIG. 7A as an alternative to the preferred display layer 28. These types of non-switchable two-way mirrors overlaid on displays or TVs can for instance be purchased from companies such as Two Way Mirrors that sell what they refer to as a TV Mirror. However, the present inventor prefers the use of what is known in the art as a switchable transflective mirror rather than a non-switchable two-way mirror. Companies such as KentOptics sell what they refer to as an electrically switchable transflective mirror. This transflective mirror can operate between three states including: substantially reflection (i.e. full mirror,) transflective (e.g. a half-reflection or what is known as a half-mirror,) and substantially transmissive (i.e. similar to a clear glass window.) Such technology is often used for automobile rearview mirrors. Many other switchable mirror technologies exist as will be well known to those skilled in the art, for example based upon chromogenic materials such as transition metals as developed at Berkeley Lab's Environmental Energy Technologies Division. Transition metals have the ability to offer multiple reflectivity/transition states for a more continuous mirror/display transition.

One anticipated advantage to a switchable transflective mirror 28*c* is to allow guest 2 a manual override control so that switchable mirror 28*c* can be forced into a reflective only (mirror) mode, locally shutting off the features of mirror-display 20 and system 1 and effectively turning mirror-display 20 into a normal mirror. More importantly, if the switchable mirror 28*c* also covers the object tracking system 24 as shown in FIG. 2A, guest 2 has a means of assuring privacy by blocking the optical path to the camera within system 24. Another advantage is that mirror-display 20 in coordination with global eco-system 40 and local eco-system 30, may automatically trigger the various reflective/transmissive states of the switchable mirror 28c, thus providing fun effects for guest 2. For example, when mirror-display 20 is being used inside a theme park hotel room and detects the presence of guests 2 via commands from local eco-system 30, mirror-display 20 may automatically switch from a mirror state into either a transflective (half-mirror/half-display) or transmissive (full display) state and present specially themed video and audio content as commanded by global eco-system 40. Mirror-display 20 might then also simultaneously issue commands back to local eco-system 30 for effecting the local environment (e.g. flickering the room lights on and off or changing their output color if the lighting is for example color LEDs.)

Still referring to FIG. 2A, switchable polarizer screen 28b may for instance be constructed from a material commercially referred to as ZScreen sold by RealD. The purpose and main use of ZScreen is to be placed in front of projectors used especially in movie theaters, oppositely polarizing alternating projected images, thus along with matching polarized glasses such as 14LL and 14RR allowing for the 3D effect enjoyed at movie theaters (see US2007258138 A1 from Lenny et al.) This technology is generally referred to as stereoscopic polarizing modulators. It is important to note that the switchable polarizer screen 28b overlays display 28a, such that images output by display 28a are conditionally polarized, while at the same time switchable transflective mirror 28c overlays polarizer screen 28b, such that reflections of guest 2 are not polarized, although images output from display 28a pass through transflective mirror 28c remaining polarized. The present invention will teach the many new uses and benefits of polarization screen 28b in combination with glasses such as 14LL and 14RR in several upcoming Figure's including 2b, 5a, 5b, 5c, 5d, 6a, 6b, 6c and 7c.

Still referring to FIG. 2A, display layer 28 includes overlaid touch surface 28d that may be implemented using various well-known technologies as will be well understood by those familiar with touch technology, e.g. using multi-touch IR. The present inventor notes that many options are available for each component 28a, 28b, 28c and 28d where any specific choice will have tradeoffs and is acceptable for the present teachings. What is most desirable is that the preferred mirror-display 20 be switchable from a state of full mirror to partial mirror to full display, such that when operating as a partial mirror guest 2 perceives the effect of a mirror simultaneously combined with the effect of a video image display, where mirror-display 20 optionally outputs polarized video images mixed with non-polarized guest 2 reflections, where guest 2 may use article 12 or touch the surface of mirror-display 20 for indicating responses and commands, where movement of article 12 by guest 2 are visualized by display layer 28 including feedback paths 29a and interpretations 29b, all being dynamically synchronized with coordinated glasses such as 14LL and 14RR being worn by guests 2. As will be made clear from a careful reading of the remaining specification, many alternate embodiments of mirror-display 20 are possible while still remaining within the scope of the present invention. For instance, any of touch surface 28d, switchable polarizer screen 28b, or switchable transflective mirror 28c may optionally be omitted while still providing new and useful functions for guest 2.

Referring next to FIG. 2B, there is shown for example a first stream of 60 alternately polarized image frames 28a-s1 being output by the combination of display 28a and switchable polarizer 28b, upon which switchable mirror 28c is overlaid, where mirror 28c is preferably in a semi-reflective state. As will be well understood by those familiar with 3D technologies, the traditional concept is to present alternating, oppositely polarized left-eye 28a-s1L versus right-eye 28a-s1R images that represent slightly offset perspectives of the same scene, where each left-eye versus right-eye image is oppositely polarized either linearly or circularly. Guests 2a and 2b then traditionally wear identical coordinated glasses 14LR such that each guest's left eye is limited by a polarizer of identical orientation to the left-eye frames to receiving only 28a-s1L and each guest's right is limited by a polarizer of identical orientation to the right-eye frames to receiving only 28a-s1R, thereby producing what the guests 2a and 2b perceives as a 3D effect. It is important to note that using this traditional approach, if there are two guests 2a and 2b each wearing identical glasses such as 14LR, then both guests will perceive the same 3D video of the same scene, while also seeing their overlaid combined partial mirror reflection.

Referring next to FIG. 2C, there is shown for example a second stream of 60 alternately polarized image frames 28a-s2 being output by the combination of display 28a and switchable polarizer 28b, upon which switchable mirror 28c is overlaid, where mirror 28c is preferably in a semi-reflective state. What is different and preferred is that stream 28a-s2 comprise alternating left frames 28a-s2L and right frames 28a-s2R that represent unique scenes rather than the same scene from slightly different perspectives. Similar to 28a-s1L versus 28a-s1R, unique left video frames 28a-s2L are polarized oppositely from unique right video frames 28a-s2R. What is also different between FIG. 2B and FIG. 2A, is that guest 2a is wearing differently polarized glasses 14LL as compared with guest 2b that is wearing glasses 14RR. Specifically, on glasses 14LL, both left and right lens are similarly polarized to match the polarization of left video frames 28-s2L thus limiting guest 2a's left and right eyes to only perceiving frames 28-s2L in a 2D video effect. Conversely, on glasses 14RR, both left and right lens are similarly polarized to match the polarization of right video frames 28-s2R thus limiting guest 2b's left and right eyes to only perceiving frames 28-s2R in a 2D video effect. In so doing, the present arrangement allows both guest 2a and 2b to see the same partial reflection of each guest 2a and 2b, while guest 2a then perceives a different and unique underlaid video (i.e. 28a-s2L) than what guest 2b perceives (i.e. 28a-s2R.) As will be appreciated by those familiar with the movie Harry Potter and the Sorcerer's Stone, in this movie when Harry Potter (e.g. guest 2a) looks into the Mirror or Erised he sees his own reflection and his parents (e.g. the unique left video stream 28a-s2L) while Tom Riddle (e.g. guest 2b) sees his own reflection and Lord Voldemort (e.g. the unique right video stream 28a-s2R.) Harry (guest 2a) cannot also see Lord Voldemort, while Tom (guest 2b) cannot also see Harry's parents.

Referring once again to FIG. 2A as well as FIG. 2B, polarization glasses 14LL and 14RR are depicted as passive and therefore not dynamically switchable, which will be well understood by those familiar with 3D projection systems. As will also be well understood, passive glasses are significantly less expensive for providing to guests 2a and 2b than active glasses. Both glasses 14LL and 14RR are also depicted to include markers 14LL-m and 14RR-m respectively, where the preferred markers 14LL-m and 14RR-m are one or more retroreflectors that operate in the non-visible IR spectrum similar to the article 12 tip as described by both Kawash et al. and Aman et al. and as such remain not visually apparent to guest 2. The purpose of markers 14LL-*m* and 14RR-*m* is to allow object tracking system 24 to detect the type of glasses being worn by a guest 2*a* or 2*b*, specifically, are the glasses left 14LL or right 14RR polarizing? Using this additional information, the present inventor anticipates that mirror-display 20 will at times operate in a glasses-only mode to ensure that each one or more guest 2*a* and 2*b* standing in front of the mirror-display 20 will be: 1) always confirmed as: a) wearing glasses of type 14LL, b) wearing glasses of type 14RR, or c) not wearing glasses, and 2) preferably identified individually as herein discussed using any of multiple methods especially including using facial recognition.

When operating in glasses only mode, mirror-display 20 will controllably limit the video frames such that each of left stream 28*a*-*s*2L and right stream 28*a*-*s*2R are only presented through hi-def display 28*a* if at least one guest is wearing appropriately matched glasses 14LL or 14RR respectively, and all guests 2 are wearing glasses. If some guest 2 is not wearing any glasses, or is for example was wearing glasses 14LL but then takes them off in an attempt to see the right video that is meant for glasses 14RR, the mirror-display 20 will immediately detect this change and turn off the projection of both the left and right video streams. Those familiar with the Harry Potter movies such as Harry Potter and the Sorcerer's Stone, will understand that when Harry (e.g. guest 2*a*) is standing in front of the Mirror of Erised (e.g. mirror-display 20) he only saw his parents, while Tom Riddle (e.g. guest 2*b*) standing in front of the same mirror only saw Lord Voldemort. To best complete this effect, if guest 2*b* (Tom) decides to take off their glasses in order to see what guest 2*a* (Harry) is looking at, then both video streams will be turned off 28*a*-*s*2L and 28*a*-*s*2R in order to prevent this and to increase the magic and fun of mirror-display 20. In summary, when mirror-display 20 detects at least one guest 2 not wearing glasses, mirror-display 20 will either: 1) output no images from display 28*a* and then switch transflective mirror back into full reflection mode, or 2) output some images meant for all guests 2 (and therefore not any "secret messages," e.g. 28*a*-*s*2L or 28*a*-*s*2R.)

And finally, with respect to these aspects of mirror-display 20, when mirror-display 20 uses for example facial recognition to identify a given guest 2*a*, it is possible that mirror-display 20 act on a command to only show guest 2*a* for example "Video Clip ABC." Therefore, in such a case if guest 2*a* puts on glasses 14LL, then Video Clip ABC will be presented as left video stream 28*a*-*s*2L and appropriately left polarized to match glasses 14LL. Whereas, if guest 2*a* puts on glasses 14RR, then Video Clip ABC will be presented as right video stream 28*a*-*s*2R and appropriately right polarized to match glasses 14RR. As a careful reader will understand, there are many potential uses and benefits for being able to only show some video clip when all guests 2 are wearing glasses and identified, and therefore to be able to controllably present only certain video clips to certain identified guests 2. Example of uses for such glasses only mode especially include providing clues to guests who are competing in park wide games, and further who may be on different levels of the game or have earned different rewards. The present inventor will also describe in detail an active glasses variation to passive glasses 14LL and 14RR in upcoming FIGS. 5A, 5B, 5C and 5*d* allowing for even more sophisticated visual effects.

Referring next to FIG. 3 there is shown a block diagram of local environment eco-system 30 preferably comprising any one of, or any combination of environment sensing system 32, environment control system 34 and interactive gaming system 36. A local environment preferably includes: 1) a confined space such as a hotel room or guest 2 house room, or 2) a semi-confined space such as an outdoor area in a theme park or a theme park ride area. Preferably the local environment has a limited area for viewing mirror-display 20, such that mirror-display 20 in combination with local environment sensing system 32 can self-detect when: 1) guests 2 are present, 2) the identities of guests 2, 3) the locations of guests 2 with respect to the mirror-display 20, and 4) which of guests 2 are or are not wearing glasses such as 14LL and 14RR. As will be well understood from a careful reading of the present invention, it is not mandatory for all guests 2 to be wearing glasses such as 14LL and 14RR for the enjoyment of the secret messages being provided to guests 2*a* and/or 2*b*. Indeed, the present inventor teaches in relation to upcoming FIGS. 6A, 6B and 6C an alternate method for displaying secret messages to one or more selected guests 2, where non-selected guests 2 not wearing glasses will still not substantially perceive the displayed secret message.

Still referring to FIG. 3, environment sensing system 32 comprises any one of, or any combination of sensing devices for detecting the state of various attributes of the local environment, where the preferred environment attributes to be detected at least include: lighting, sounds, temperature, people and objects. As will be well understood by those familiar with sensing devices, many options are possible for sensing each of the preferred environment attributes and the particular manner and technology chosen is immaterial to the present invention. What is important is that the sensing system 32 has the ability to measure any of, or any combination of environment attributes for providing commands to any one of, or any combination of local control system 34, local gaming system 36, global eco-system 40, or mirror-display 20.

Still referring to FIG. 3, environment sensing system 32 provides commands issued by individual sensing devices or issued in computational consideration of multiple sensing devices. For example, when a guest 2 enters a local environment such as a hotel room, they will usually turn on the lights, where the light sensing apparatus would then send a room-entered command to the mirror-display 20, local control system 34, and interactive gaming system 36 indicative of lights being turned on along with any other identifying information such as a location id. After receiving such a room-entered command, mirror-display 20 optionally presents a themed video/audio greeting, control system 34 optionally sets or changes one or more other environment attributes such as the air conditioning, and interactive gaming system 36 optionally causes a local game piece (such as a Harry Potter owl) to hoot and turn its head. However, once individuals are in a hotel room, it is common to turn lights on multiple times thus potentially causing multiple undesirable mirror-display 20 and/or local environment attribute changes. As such, what is preferred is for the present invention to include means for first aggregating and processing the combined states of all environment attributes prior to issuing commands, for example providing the ability to sense people tracking status as well as lighting status to determine if the hotel room first has no individuals present and then at least one individual present at which time the lights are then also turned on, and only under these conditions issuing a room-entered command.

As will be well understood by those familiar with computer systems and sensing devices, many arrangements are possible. In a first arrangement, individual sensing devices such as light sensors, sound sensors, temperature sensors, as well as people and object tracking sensors operate individually with their own computing means capable of sensing various states and changes to states and providing this information as commands to mirror-display 20, global eco-system 40, local control system 34 or local gaming system 36. In a second arrangement, the local environment sensing system 32 might also comprise a sensing rules computer for aggregating the first commands from the individual sensing devices for potential combination into second commands, using for instance a rules engine or any of many well understood information learning, assessment and combining methods, such that mirror-display 20, global eco-system 40, local control system 34 or local gaming system 36 only receive second commands from the sensing rules computer and not first commands directly from any of the various sensing devices.

Still referring to FIG. 3, in a variation of the second arrangement, mirror-display 20 receives all sensing device first commands and then uses its own local computing 22 for processing the first commands from the individual sensing devices for potential combination into additional second commands, using for instance a rules engine or any of many well understood information learning, assessment and combining methods. In this modified second arrangement, no local rules computer associated with the local environment sensing system 32 is necessary. What is most important for the present invention is that sensed information is determined for aggregation and processing ultimately providing commands useful for triggering or directing changes in any one of, or any combination of: 1) the state of any one of, or any combination of mirror-display 20 parts including individual layers 22, 24, 26 and 28, especially including changes to display layer 28 and speaker 26*b*, for example a triggered presentation of information including UI changes as well as audio or visual output changes that would be caused for example by computer in layer 22 processing a video/audio file, 2) the state of any one of, or any combination of the environment attributes controllable by the environment control system 34, 3) the state of any one of, or any combination of the gaming attributes controllable by the interactive gaming system 36, 4) the state of any one of, or any combination systems comprising global eco-system 40.

Also shown in FIG. 3 is environment control system 34 comprising any of, or any combination of controllable devices or interfaces for setting or changing the state of various attributes of the local environment, where the preferred environment attributes to be set or changed at least include: ambient lighting, sound, air conditioning, appliances, as well as sleep control or timing such as an alarm clock, switchable glass windows, or automatically drawn blinds or curtains for altering the amount of outdoor light entering the room. As will be well understood by those familiar with environment control devices or interfaces, many options are possible for setting or changing each of the preferred environment attributes and the particular manner and technology chosen is immaterial to the present invention. What is important is that the system 34 has the ability to set or change any one of, or any combination of environment attributes at the request of commands from any one of, or any combination of local sensing system 34, local gaming system 36, global eco-system 40, or mirror-display 20.

Still referring to FIG. 3 and the functions of control system 34, one example command could be received from global system 40 to engage mirror-display 20 for presenting a themed video/audio presentation while simultaneously engaging control system 34 to manipulate local lighting and sound systems, the combination of which create a more immersive experience for guest 2. Where the example command also includes valid triggers for initiating the presentation by mirror-display 20 in coordination with control system 34, where triggers might include any one of, or any combination of fixed time of day if guests 2 are present, fixed time increment from guest 2 presence in room detected, or guest 2 article 12 command received. What is most important to understand for the present invention is the coordination of global system 40, local system 30 and mirror-display 20 to provide enhanced user experiences for guest 2, whether mirror-display 20 and local system 30 are for example situated inside a theme park, in a hotel room associated with a theme park, or at a residential home associated with a guest 2.

Referring to FIG. 3 there is also shown interactive gaming system 36 comprising any one of, or any combination of preferred game parts including: game state and control, game-human interfaces and game-pieces interfaces. It is not the purpose of the present invention to describe in detail the workings of a preferred interactive gaming system 36, but rather to describe the general nature and how mirror-display 20, global eco-system 40, local sensing system 32 and local control system 34 are benefited by the ability to exchange commands with gaming system 36 in order to enhance the user experience of guest 2. Details of a preferred interactive gaming system 36 will be the focus of a related patent application by the present inventor.

Still referring to FIG. 3, one example of a preferred local gaming system 36 is a non-electronic board game, where individual challenge cards include a QR code or similar, where QR codes will be well understood by those familiar with bar code technology. Upon picking a challenge card, guest 2 may present the card exposing the QR code to the mirror object tracking system 24, where that system 24 is capable of detecting and translating the QR code into a challenge question or action possibly requiring the guest 2 to conduct an article 12 movement or gesture, or otherwise engage with mirror-display 20 display layer 28 interface. The response of the guest 2 to this challenge could then be evaluated by mirror-display 20 providing a result that is then usable for directing the guest 2's next steps or option in the board game. In this example, the interactive gaming system includes no electronic parts, as such the game-human interface includes challenge cards with machine readable markings such as QR codes. However, as will be obvious to those skilled in the art of board games and machine interfaces, QR codes detected by object tracking system 24 should be seen as an exemplification and not a limitation as other interfaces are possible. For example, as shown in FIG. 2A, computing and communication layer 22 might include a guest ID reader capable of detecting RFID markers or scanning bar codes, either of which could be affixed to or printed upon a challenge card and provide a means for triggering mirror-display 20 actions as opposed to object tracking system 24 detecting a QR code or similar.

What is important is that some aspect of the board game directs guest 2 to interact with mirror-display 20, where also mirror-display 20 may command global eco-system 40 or local eco-system 30. For example, mirror-display 20 may issue a command to global system 40 to receive a theme park challenge of the day where the results of the guest 2's response not only direct the next board game 36 actions, but are also stored with guest related information by eco-system 40. In another example, mirror-display 20 issues a command to local control system 34 which then causes flashing colored lights and the sound of thunder clapping as mirror-display 20 simultaneously plays a themed video/audio via display 28, with or without requiring glasses such as 14LL or 14RR.

Still referring to FIG. 3 and gaming system 36, mirror-display 20 might store ongoing game information such that each additional time the same challenge card is presented to the mirror-display 20, different challenges may be presented based upon the guest 2 detected. At least four methods are available for identifying guests 2 and hereby incorporated into the present teachings, including: 1) identification through pre-association with a unique encoding associated with the article (such as a wand) 12 (see FIG. 8 of the present invention), 2) identification through guest 2 facial recognition using for example pre-known facial information such as pictures provided to mirror-display 20 by global eco-system 40 or as captured and registered by guest 2 using mirror-display 20, where current images are then also captured by object tracking system 24 for comparison to the pre-known information, 3) identification through scanning of RFID wrist bands 3-*rfid* as worn by guest 2, and 4) identification through scanning of bar code on guest ticket 3-*bc*.

As the careful reader will observe, as compared to a guest 2 playing a board game that has no additional interfaces, a multitude of unique experiences are possible if the board game has interfaces to any one of, or combination of mirror-display 20, global eco-system 40 or local eco-system 30 that effectively extends gaming system 36 by any one of, or any combination of: 1) allowing guests to participate with a broader theme park and hotel community for community-wide themed games, 2) allowing guests to interact with an article 12 tracking mirror-display 20 capable of interpreting unique guest 2 controlled article 12 movements as guest inputs including responses or commands, 3) detecting local environment attributes via sensing system 32 where environment states alter game 36, and 4) allowing automatic changes to local environment attributes via control system 34, where environment states are altered as a part of game 36.

And finally, also referring to FIG. 3 and interactive gaming system 36, alternate gaming system 36 extends beyond a non-electronic board game by additionally including any one of, or any combination of: 1) electro-mechanical or electrical game-pieces with interfaces that are actuated at least in part due to commands communicated by any one of, or any combination of components of system 1 including eco-systems 30 and 40 and mirror-display 20, and 2) computing platforms, mobile apps, gaming consoles or similar that provide a virtual experience for guest 2 as a part of gaming system 36's game-human interface, where such game-human interfaces are capable of receiving and processing commands from any one of or combination of system 1 components including eco-systems 30 and 40 and mirror-display 20, and where the received and processed commands alter the virtual experience as perceived by guest 2. For example, an electro-mechanical game-piece could be a talking owl that maintains a wireless communication path with mirror-display 20 for excepting commands. The owl might then be controlled by any of global eco-system 40, for instance by waking up and giving community wide gaming clues at any moment, for example while guests 2 are detected as present in their hotel room, or by local eco-system 30, for instance hooting a morning wake-up call based upon commands from environment system 34 that is setting or changing sleep control and timing, or by mirror-display 20, for instance in response to guest 2 casting spells by moving article 12 along a correct pre-known path or trajectory.

Examples of a virtual game-human interface include a cell-phone mobile app communicating over blue tooth with mirror-display 20, and therefore also global eco-system 40 and local eco-system 30. The mobile app could then be used by guest 2 to issue commands, for example changing various local attributes such as lighting, sound, air conditioning, appliances or sleep control and timing. The mobile app could also be used to both issue as well as receive and process commands to any of interactive gaming system 36 or the interactive gaming system component of eco-system 40 (to be discussed with respect to upcoming FIG. 4.) There are many imaginable uses for issued and received local and community wide gaming system commands and as such what is most important to understand is that the components of system 1 as presently taught provide significant novel advantages for increasing the enjoyment and experiences of guests 2 via connected global and local interactive gaming systems. And finally, local interactive gaming system may also comprise a game state and control part, which is primarily a computing system with memory for maintaining a game state, such as which guests 2 are involved in the game and their current game positions and accumulations, etc. As will be appreciated by those skilled in the art of computer systems, a game state and control part could easily be incorporated into computer and communicating layer 22 of mirror-display 20 or even within global eco-system 40 without any detraction from the usefulness to guest 2. As such, what is important is that system 1 has the ability to maintain a game state and control for any and all guests 2 and their own-going positions and accumulations within any local or global, community wide game.

Referring next to FIG. 4 there is shown a block diagram of global environment eco-system 40 preferably comprising any one of, or any combination of theme park administration system 42, hotel administration system 44, guest tracking system 46 and interactive gaming system 48. Theme park administration system 42 comprises preferred datum relating to any one of, or any combination of: guest 2 related information, entity related information, and product sales related information. Hotel administration system 44 comprises preferred datum relating to any one of, or any combination of: guest 2 related information, entity related information, and product sales related information. Guest tracking system 46 comprises preferred datum relating to any one of, or any combination of: guest 2 current and historical locations, guest 2 schedules and itineraries, and guest 2 social media controls and information. Interactive gaming system 48 comprises any one of, or any combination of preferred game parts including: game state and control, game-human interfaces and game-pieces interfaces.

Still referring to FIG. 4, guest related information associated with them park administration system 42 or hotel administration system 44 includes any one of, or any combination of: a) any information for identifying guests 2 such as ticket encoding and guest 2 biometrics, where ticket encoding includes alpha-numeric sequences in any format such as unique bar codes or RFID codes, and biometrics includes unique guest 2 facial images or finger prints, and where any of guest 2 related information may be communicated in commands for exchanging information with mirror-display 20 for guest identification, some uses of which have been prior discussed, other uses of which will become apparent based upon a careful consideration of the present system 1. Guest related information associated with system 42 or 44 additionally includes, c) any information for specifying guest 2 theme park or hotel access and restrictions, where access and restrictions includes entrance times, hotel room numbers, allowed activities, purchased or allowed special events, and in general any types of marketable experiences that guest 2 has contracted for with either the theme park or hotel.

Referring still to FIG. 4, entity related information associated with park administration system 42 or hotel administration system 44 includes any one of, or any combination of: a) status information regarding the entity (i.e. park(s) or hotel(s)) as a whole and any separable part of the entity that has controlled access, for example including individual themed areas, rides, shops, restaurants, theaters with shows and performances, and anywhere guest 2 may have an entity planned or provided guest experience, and where status information is useful for guest 2 when planning and conducting their entity activities, b) status information regarding special events occurring in association with the entity and available to guest 2, where special events includes any of themed character meetups, parades, shows, fireworks, presentations, concerts, entity-wide holiday celebrations or similar, and where status information is useful for guest 2 when planning and conducting their entity activities, and c) promotional materials for promoting, advertising or otherwise providing information and explanation about an entity or a special event, including any of digital information such as images, audio, audio/visual movies.

Referring still to FIG. 4, product sales related information associated with park administration system 42 or hotel administration system 44 includes any one of, or any combination of: a) information related to products or services for sale including terms, pricing, availability, shipping and delivery options and promotional materials for promoting, advertising or otherwise providing information and explanation about a product, including any of information including digital information such as images, audio, audio/visual movies, and where services includes any of meals, spas, treatments, personal themed events, other otherwise guest experiences for sale by the entity, b) information relating to products or services already sold to guest 2, including status of sale, delivery times and locations, pick up times, access times, reservation times, changes, cancellations, and otherwise any information related to a purchased entity product or service that is required or helpful knowledge for guest 2.

Still referring to FIG. 4, there is shown guest tracking system 46, preferably comprising datum relating to guest current and historical locations. Various systems are known such as an active RFID system based upon patents assigned to Disney Enterprises, where the commercialized implementation is referred to as "Disney MagicBands." Using such RFID technology, it is possible to locate a specific park guest 2 by using either short or long-range RFID detection and tracking. Current tracking information includes park entrance, restaurant seating location, ride entrance, ride-car/guest 2 association as well as hotel room entrance. Other passive systems are known such as a printed ticket with bar code implemented at many theme parks, where the ticket provides time and location information related to guests 2 for at least park entrance and ride entrance. The present inventor also intends to teach additional novel apparatus and methods related to guest 2 tracking in a theme park as part of a related application. What is most important for the present application, is that as much detail as possible is known to guest tracking system 46 about the guest 2's current location, and preferably also a history of their movement including tracking on park rides.

As will be appreciated by those familiar with theme parks, guest 2 tracking information 46 including current and historical locations, and schedules and itineraries, is very advantageous information for use by a park-wide interactive gaming system 48. While the details of such a gaming system 48 is not the focus of the present invention, what is important to understand is that a park-wide gaming system 48 can interact with guest 2 through mirror-display 20 for example placed throughout the park, in associated park hotels, and even at a guest's home. Furthermore, as will be obvious from a careful reading of the present invention, while there are other user-interfaces in addition to mirror-display 20 that are useful for gaming system 48, e.g. including a mobile device app, mirror-display 20 is unique in that it provides many novel features including allowing the guest 2 to use an article 12 such as a Harry Potter Wand or any other article that is built according to the teachings of either Kawash et al. or additionally using any of the alternative teachings of the present invention (see FIGS. 7A, 7B, 7C and 8.) One example of another article for use with mirror-display 20 is a Disney light saber, where either the saber's tip or preferably the entire saber shaft is trackable using the non-visible IR energies of mirror-display 20's object tracking system 24. Mirror-display 20 is also unique as a game interface in its ability to present secret messages to guest 2, some description of which has already been provided in relation to prior FIGS. 2A, 2B and 2C, and more descriptions of which will be detailed with respect to upcoming FIGS. 6A, 6B, 6C and 9. As will also be appreciated, guest 2 might get secret messages including game clues and answer secret questions using article 12 movements.

Still referring to FIG. 4, guest tracking system 46 preferably comprises datum relating to guest social media controls and information, where this datum includes connection and control information for communicating with a guest 2 via any of social media means including facebook, twitter, snapchat, whatsapp, instatram, text messaging, etc. For example, guest 2 might specify to tracking system 46 which user-generated or park-generated content should be posted to which of zero or more social media means, where examples of user-generated content include guest 2 cellphone pictures taken at a given park location and/or an accompanying text message, and where examples of park-generated content include automatic park ride pictures or a park photographer picture taken at a given park location. Guest 2 might also desire to create a custom profile such as defining an associated group of guests 2, examples being a family, friends or a youth group, and then also limit how associated group of guests 2 and park generated content is distributable over social media, e.g. including a sign-up list for non-guests to pre-subscribe to such information. Again, the present inventor intends to further teach a guest tracking system 46 as well as interactive gaming systems 36 and 48 in related applications.

What is important to understand regarding the present invention is that a guest tracking system 46 is usable for detecting guest 2 locations and gathering guest 2 content, either self or park generated, and for automatically providing that content via social networks to other individuals within the limits accepted or established by a guest 2 or representative thereof, and/or automatically sharing that same content with any of the components of the present system 1 via commands. One example is where interactive gaming system 48 sends assignment commands that are personalized game aspects such as a clue, question or task specific to the identified guest 2 via an associated park game app, or where a secret assignment command is given to guest 2 by mirror-display 20, and where guest 2 uses their mobile device camera to take a picture at some park location which is then received, scanned and identified by gaming system 48 as answering or otherwise being responsive to the assignment. Such a guest 2 picture can also have its GPS location and time stamp used to give additional game points, e.g. showing which guests 2 completed assignments faster or in a correct sequence. Many uses for the novel combination of system 1 components taught herein will be obvious from a careful consideration of the present invention, where the examples provided herein are meant as exemplifications and not limitations.

Still referring to FIG. 4, another example of interactive gaming system 48 is where personalized game aspects including clues, assignments or answers are provided within select products available for sale at park and hotel shops, or where similar clue information is provided to the guest 2 in conjunction with purchasing a meal at a park or hotel restaurant, and where regardless of the manner in which a guest 2 receives the clue, assignment, answer or other game information, the guest 2 may then use any game interface including mirror-display 20 or a mobile device app to respond, where the responses are then incorporated into interactive gaming system 48's collective datum for tracking, awarding, responding, etc.

What will also be obvious to the anyone skilled in the art of information systems is that preferred datum as taught in FIGS. 3 and 4, comprising global eco-systems 30 and 40 respectively, can be stored or associated in any number of configurations that are not exactly the same as the components listed by the present inventor for systems 30 and 40. What is important is that the information or its equivalent is preferably created, received, processed, etc. in accordance with the functions taught herein, and not that for example that guest social media controls and information are stored or associated with a guest tracking system 46, since it is obvious that this is also guest related information and otherwise can be maintained in logical association with other named components of the present invention without sacrificing any herein taught novel benefits.

Still referring to FIG. 4, while the present inventor intends to teach additional novel apparatus and methods related to interactive gaming system 48, what is preferable for the present application is that system 48 comprises any one of, or any combination of preferred game parts including: game state and control, game-human interfaces and game-pieces interfaces. It is not the purpose of the present invention to describe in detail the workings of a preferred interactive gaming system 48, but rather to describe the general nature and how mirror-display 20, global eco-system 40, local eco-system 30 are benefited by the ability to exchange commands with gaming system 48 in order to enhance the experience of guest 2. As prior mentioned, details of a preferred interactive gaming system 48 will be the focus of a related patent application by the present inventor.

Still referring to FIG. 4, and also to interactive gaming system 36 discussed in relation to FIG. 3, gaming system 48 is also anticipated to be at least a non-electronic game, where instead of a board that might be used inside a room, the guest 2 has a fold out rally-map with tasks. The game can be designed similar to what is generally referred to as a road-rally, were a contestant must follow a course throughout the park, looking for clues and answering questions and often associated with time limits for extra points. Some of the stops in the rally are ideally at a mirror-display 20, where mirror-display 20 detects both guest 2's identity using any of prior mentioned methods, as well as a QR code printed for example on a section of the rally-map that guest 2 presents to the bar code scanner 22c in mirror-display 20. The guest 2 might then be required to make a specific one or more gestures with article 12, e.g. moving a Harry Potter Wand to cast a specific spell. Or guest 2 might be required to put on their guest 2 polarizer glasses such as 14LL or 14RR and receive a secret question, after which they answer using their theme park app loaded on their mobile device. All interactions are tracked by gaming system 48 to build up points for guest 2 usable for rewards of any and all types including discounts, free fast passes to select rides, special reward tokens that can be dispensed immediately by an automatic dispenser which is commanded by the mirror-display 20, where the automatic dispenser is an example of a game-piece. Additionally, the guest 2 could be required to visit a certain shop in the theme park in order to pick up their token.

Still referring to FIG. 4, as will be appreciated by those familiar with gaming systems and computer systems in general, many options for theme-park wide games are conceivable. What is important to understand is how the presently described mirror-display 20 is usable both locally, e.g. in a guest's 2 hotel room, or globally, e.g. somewhere in the theme park or associated hotel lobby, and how the mirror-display 20 provides unique ways for the guest 2 to interface with gaming system 48 (and 36) including by making gestures that are interpretable as inputs including response and commands with article 12 and receiving secret messages in video and or video/audio formats. As will also be appreciated, when gaming system 48 can exchange datum associated with guest tracking system 46 via commands, this provides opportunities for making the guest 2's experience more customized. For example, guest tracking system 46 preferably detects and records the times at which guest 2 participates in each individual theme park ride and uses this information to, for example: 1) send personalized game aspects such as messages with questions and challenges to guest 2 either before a ride starts or after a ride completes, where a question before the ride starts might be "what does Voldemort say inside the Gringgots bank" which the guest 2 must enter on their mobile device game app after leaving the ride, and where a question after the ride ends might be a list of comments made by characters on the ride along with a list of characters that must be matched up, 2) send messages to guest 2 re-routing their quest if the next ride in a sequence is not currently working or the ride queue is excessively long, or 3) set up a timer count-down on the guest 2's mobile device app requiring them to find a mirror-display 20 and receive a personalized game aspect such as a clue or assignment via a secret message, or answer an article 12 movement challenge associated with the ride theme, all before the timer expires. As will be appreciated by those skilled in the art of theme parks and gaming systems, these are only some of many possible uses for the present system 1, and these uses are considered by the inventor to be exemplifications and not limitations of the present invention.

And finally, still referring to FIG. 4, the present inventor considers that local eco-systems 30 may be located outside of the theme park, such as in guest 2's hotel room or even in their home, or local eco-systems 30 may also be inside the theme park. As such, any and all of the components of local system 30 including environment sensing system 32, environment control system 34 and interactive gaming system 36 may be found within the theme park for interactive command exchange with global gaming system 48. This for example means that a local section of a park might include lighting and people tracking for use in automatically commanding mirrors 20 and/or control system 34 to cause various outputs to guests 2. Another example is special dining tables with game surfaces that can detect the presence of park tokens that have been awarded to a guest 2, when the tokens are either laid on the tables surface or placed in certain token specific locations on the table. After detection, the guest 2 may for example be able to apply the tokens for restaurant discounts or character food deliveries to their table. As will be well understood by those familiar with systems for detecting electro-magnetic energies, there are many ways of making a passive token with an embedded material that is detectable remotely by a sensor embedded within a table. One such technologies for accomplishing this are RF tokens and readers such as produced by Silone Cardtech Co, Ltd of San Jose, Calif. The present inventor notes that a mirror-display 20 might also be embedded in the surface of a restaurant table, to be useable for showing secret messages to guests 2 and otherwise interacting with guest 2 while they wait for their food. Using such an arrangement, the mirror-display 20 embedded in the restaurant table can also be used to provide menu information including videos and explanations, providing food preparation status, take orders and make payments, all as will be obvious from a careful reading of the present invention.

Referring next to FIGS. 5A, 5B and 5C collectively, there are shown three exemplary configurations for display layer 28 as 28-1, 28-2 and 28-3 coordinated with guest glasses 14-1, 14-2 and 14-3 respectfully. As will be well understood by those skilled in the art of display technology, there are many possibly technologies for use as a display, at least including CRT, LCD, AMLCD, LED, OLED, AMOLED, projection, and plasma. What is most important is that mirror 20 detects and understands which guests 2 are available for viewing images and controllably presents customized images via a display technology while simultaneously controlling which particular guests 2 wearing glasses such as 14-1, 14-2 and 14-3 may view the presented images. The present invention discloses several variations for accomplishing this customized controlled display images to guests 2, while other alternatives will be obvious to those skilled in the necessary arts as herein referenced.

It will also be well understood that a complete working display layer includes the display technology as well as typically some graphics display computing element as well as a general computing element. Since these are all well known in the art, the present invention assumes that those skilled in the art of computers are sufficiently knowledgeable to create a working display system with all its necessary computing components and therefor this aspect of the display layer is not the focus or teachings of the present invention. The present inventor further notes that in general, displays with the highest refresh rates of 240 hz and above are preferred and that graphics display elements of the highest image rates of 120 to 240 fps are also preferred. Such technology is now generally available and as will be evident from a careful reading of the present teachings, greater refresh and frame rates have significant advantages especially for creating separately viewable full motion streams such as 28a-s2L and 28a-s2R as depicted in FIG. 2C as well as secret messages with buffer images as will be discussed shortly with respect to upcoming FIGS. 6A, 6B and 6C.

Referring to FIGS. 5A and 5C collectively, display layer 28-1 and 28-3 as well as respective glasses 14-1 and 14-3 comprise a polarization layer. As will be well understood by those skilled in the art of polarization systems and especially 3D polarization systems used for projecting 3D images, there are many possibly technologies for use as display 28-1's polarization layer. These polarizing technologies at least include: 1) passive orthogonal polarizing filters that are for example either linearly or circularly polarizing, 2) active achromatic liquid-crystal shutters such as used for commercial products like Z-Screen from RealD, or similar competitive solutions from Xpandvision, that are capable of switching polarization orientation under electronic control, 3) film-type patterned retarder, and 4) anaglyph color filters that are not polarizing but may be used to accomplish similar effects as is well known. What is important is that images that are output by the display layer are either always polarized or controllably polarized by the polarization layer in such a way as to coordinate with the polarization layer of glasses 14-1 or 14-3 respectively. Where the effect of coordination between the polarization layer of display layer 28-1 or 28-3 and the polarization layer of glasses 14-1 and 14-3 respectively, is to either cause images output by display layer 28-1 or 28-3 to pass through glasses 14-1 and 14-3 to be seen by a guest 2, or to be blocked and not seen by a guest 2. As will be discussed shortly in greater detail, there are tradeoffs between using any particular passive or active polarization technology for either display layer 28-1 or 28-3 and glasses 14-1 or 14-3, any combination of which is considered to remain within the scope of the present invention.

And finally, with respect to the polarization layer, the present inventor notes that significant research and development continues to be made especially with respect to creating 3D effects for videos, where these effects often use polarization or similar. The present invention will make it clear that any of these new technologies would also be directly applicable to the present invention, in that these new 3D effect technologies can be used to present a first image stream to both eyes of one guest 2a, while optionally presenting a second image stream to both eyes of some other guest 2b, rather than the typical 3D strategy of presenting a first image stream to the left eye and a second image stream to the right eye of all guests 2a and 2b.

Referring again to FIGS. 5A, 5B and 5C collectively, display layers 28-1, 28-2 and 28-3 comprise a transflective mirror layer. As will be well understood by those skilled in the art, there are many possibly technologies for use as a transflective mirror layer, where the present inventor uses transflective to mean that some portion of ambient light is reflected off the transflective mirror such that guest 2 can see some reflected image of themselves, while also back light as output from the display layer transmits through the transflective mirror such that guest 2 can see some image as output by the display, thus creating a combined image of both guest 2 and display 28a, 28b (FIG. 2A) presented content. The present inventor notes that there are several well-known passive transflective mirror technologies including two-way mirrors created from various materials including acrylic or glass.

While these passive technologies are useful for most of the features of the present invention and are considered within the scope of the present teachings, active transflective mirror systems are preferred and provide the possibility of being in any of multiple, controllable states including: reflective, transflective and transmissive, where the state of transflectivity may also be variable from mostly reflective to mostly transmissive. There are several well-known technologies for active transflective effects often referred to as switchable mirrors, at least including: 1) thin film liquid crystal, 2) chromogenic smart materials including transition metals as used by Berkeley Lab's Environmental Energy Technologies Division to create a lower cost switchable mirror with variable states of transflection, 3) electrochromic glass and similar. What is important is that at least the state of partial reflection and partial transmission is manifest by the transflective mirror layer, and that preferably the transflective mirror layer includes the three or more states of substantially reflective, transflective and substantially transmissive that are electronically controllable within mirror-display 20.

And finally, with respect to the display layers 28-1, 28-2 and 28-3, the present inventor notes that significant research and development continues to be made especially with respect to creating electrically controllable transflective materials and systems or similar, for example the Advanced Industrial Science and Technology (AIST) of Japan is working on a sheeting that can be placed over glass to create a controllable transflective experience, where the sheeting comprises an interior gap filled with a gaseous mixture that can be controllably electrolyzed creating hydrogen that causes the change in transflection. The present invention will make it clear that any of these new technologies would also be directly applicable to the present invention, in that these new controllable transflective technologies can be used to accomplish some one or more combinations of reflection and transmission for presenting to the guest 2 a reflection of their own guest 2 image as well as some transmission of the display layer 28a, 28b output images.

Referring next to FIGS. 5B and 5C collectively, glasses 14-2 and 14-3 comprise an active shutter layer. As will be well understood by those skilled in the art, a typical electronically controllable active shutter comprises some form of liquid crystal technology. The liquid crystal is normally transparent and becomes opaque in response to an applied electronic voltage. There are many companies that manufacture what are generally referred to as active shutter glasses where the glasses are capable of receiving timing signals for applying the voltage that allow each lens of the glasses to alternately become opaque while the other lens remains transparent, thus blocking the view of one eye while the other remains unblocked. This operation is different from polarization that requires both a polarization layer associated with the display layers such as 28-1 and 28-3 and a matched or opposite polarization layer associated with guest glasses such as 14-1 and 14-3 respectively, as will be well understood by those familiar with 3D image projection technology. With active shutters, it is only necessary to have the active shutter on the guest 2's glasses such as 14-2 and 14-3 and not also within the associated display layer 28-2 and 28-3. While the present inventor is not aware of any other base technologies for creating active shutter glasses, it is conceivable that some other new technology other than liquid crystal could be devised. What is most important is that the active shutter be able to controllably switch between two states of substantially transparent and substantially opaque in response to a control signal, and any such current or future technology is considered sufficient for the present invention and therefore within the present scope.

Referring next to FIG. 5D, glasses 14 are representative of any glasses depicted in the present invention including 14-LL and 14-RR shown in FIGS. 2A, 2B and 2C as well glasses 14-1, 14-2 and 14-3 shown in FIGS. 5A, 5B and 5C. Regardless of the construction of any glasses herein taught as it relates to the methods for receiving secret messages from display layers such as 28-1, 28-2 and 28-3 and then selectively passing these secret messages to a guest 2 through various apparatus such as 14-1, 14-2 or 14-3, all glasses herein taught preferably include the additional features of glasses 14 depicted in FIG. 5D. As will be well understood by those familiar with eye glass terminology, glasses 14 comprise a frame 14-*frame* and temples 14-*temples*, where 14-*temples* are hinged such that they may be opened orthogonal to 14-*frame* for fitting over a guest 2's head and onto their ears. The preferred glasses 14 further include: 1) in-use hinges 14-*h* that are capable of sensing whether 14-*temples* are currently open, and therefore wearable, or closed and therefore not wearable, 2) in-use pads 14-*p* that are capable of sensing whether 14-*frame* is resting on guest 2 nose or not resting on nose, 3) left and right active shutter and/or passive or active polarizer filter lenses 14-*sl* that are capable of alternating between substantially transmitting or substantially blocking image states as prior discussed, 4) hidden signal LEDs such as 14-*led*1, 14-*led*2 and 14-*led*3, 5) visible notification signal LEDs such as one or more 14-*led-x*, 6) camera 14-*cam*, 7) audio outputs 14-*a*1 and 14-*a*2, and 8) detector-communicator 14-*dc* comprising additional orientation and location detectors, haptic or kinesthetic notification devices, a computing element and communications elements for communicating with hinges 14-*h*, pads 14-*p*, hidden signal LEDs 14-*led*1, 14-*led*2 and 14-*led*3, visible notification signal LEDs 14-*led-x*, camera 14-*cam*, audio outputs 14-*a*1 and 14-*a*2 as well as mirror-display 20.

Still referring to FIG. 5D, in-use hinges 14-*h* comprise any of well-known technologies for sensing the separation of two parts, including piezoelectric, magnetic, electro-mechanical, etc., where the purpose of the hinge is to detect when the hinge is closed, and therefore the 14-*temples* are folded onto and parallel with 14-*frame*, or open, and therefore the 14-*temples* are open and orthogonal with 14-*frame*. In-use pads 14-*p* comprise any of well-known technologies for sensing contact with skin including capacitive sensors, where the purpose of pads is to detect when 14-*frame* is resting upon guest 2's nose. Hidden signal LEDs such as 14-*led*1, 14-*led*2 and 14-*led*3 are preferably near-IR LEDs that are not visually apparent but otherwise sufficiently detectable by object tracking system 24 of mirror-display 20, where the purpose of hidden signal LEDs is to create either or both of an identification signal or orientation and location tracking signal, as will be discussed shortly in greater detail. Visible notification signal LEDs such as one or more 14-*led-x* are visible light LEDs of one or more colors, where the purpose of visible signal LEDs is to help guest 2 and others surrounding guest 2 recognize that mirror-display 20 (or essentially system 1) is either contacting guest 2 requesting that guest 2 put on their glasses 14, or if the glasses 14 are already being worn, contacting guest 2 to let them know that they are now being selected for participation or perhaps letting them know that they have won a competition, as will be discussed shortly in greater detail.

Camera 14-*cam* comprises any of well-known cameras capable of being embedded within eyeglasses such as 14, where the purposes of the glasses camera 14-*cam* include any one of, or any combination of: 1) allowing mirror-display 20 (and therefore system 1) to automatically cause camera 14-*cam* to capture images representative of the guest 2's field-of-view, where the images captured by camera 14-*cam* are then processed by a component of system 1 (such as by a computing element comprised within any of glasses 14, mirror-display 20 or either of local 30 or global 40 eco-system) to determine the orientation and location of guest 2; 2) to allow glasses 14 to capture images of the movements of article 12 similar to object tracking system 24, especially if article 12 as been further adapted to include additional visible light reflective markers (see markers 13-*a*, 13-*b* and 13-*c* or FIG. 7A,) where the images captured by camera 14-*cam* are then processed by a component of system 1 (such as by a computing element comprised within any of glasses 14, mirror-display 20 or either of local 30 or global 40 eco-system) to determine the motion of any one or more detected markers (such as 20, 13-*a*, 13-*b* and 13-*c*) for translation into a guest 2 response or command (where for example a guest 2 motions with the wand 12 within camera 14-*cam*'s field-of-view in a certain trajectory to cause a picture to be taken by their glass's camera 14-*cam* and provided to another component of the system 1 as a response or as social media content), or 3) to allow guest 2 to otherwise capture and process images e.g. to communicate to mirror-display 20 (and therefore system 1) for the use as responses in competitions, contests or for automatic sharing via social media, where otherwise includes pressing a physical button located on glasses 14 or pressing a physical or virtual button on their cell-phone that is running a special app for communicating with glasses 14.

Still referring to FIG. 5D and also in anticipation of the upcoming teachings related to FIGS. 7B and 7C, the present invention enables for example two or more guests 2 facing each other, wearing system glasses 14 (whereby the guests' 2 locations and orientations are known to the system 1,) to engage in a competition with each other by for example using a combination of instructions received from the system 1 on the guests' 2 mobile device in combination with spells enacted by each guest 2 as detected by a combination of images captured by camera 14-*cam* and processing by an embodiment of the system's object tracking system 24 running on the guest's 2 mobile device. The instructed spells are for example given as words or symbols displayed on the mobile device app or audibly output on the glass's speakers 14-*a*1, 14-*a*2, any of which the guest 2 must translate correctly in to motions of their wand 12, where with a multiplicity of guests 2 the spell might also need to be motioned while a certain other guest 2 is within the motioning guest's field-of-view as confirmed by images captured by the motioning guest 2's camera 14-*cam*. As the careful reader will see, there are many fun and exciting possibilities enabled by the system with its various components, some uses of which require all the components including mirror-display 20, eco-systems 30 and 40 and glasses 14 with article 12, others of which are enabled by use of only some of the components, e.g. mirror-display 20, article 12 and eco-systems 30 or 40. In some novel uses, mirror-display 20 is implemented in a more traditional "mirror-on-the-wall" form (such as 20 in FIG. 1, 2A or 7A,) while in other uses mirror-display is implemented in a "mobile device form" (such as element 20*b* of FIG. 7B or element 20*c* of FIG. 7C.)

Referring still to FIG. 5D, audio outputs 14-*a*1 and 14-*a*2 may be any of well-known technologies such as the preferred bone speakers for communicating audio signals to a guest 2. In-use orientation detectors comprising detector-communicator 14-*dc* include any of well-known technologies including accelerometers, magnetometers, gyroscopes, inclinometers, tilt sensors and the like, where the purpose of the in-use orientation detectors is to at least detect that orientation of 14-*frame* including oriented upright and level, such as when ready to be put onto a guest 2 face. Where location detectors comprising detector-communicator 14-*dc* include any of either a global area positioning system such as GPS, or a local area positioning system such as passive or active RF, ultra-wide-band (UWB), low power Bluetooth, and other well-known technologies for tracking objects, where the purpose of the location detectors are to provide glasses 14 alone, mirror-display 20 alone, or glasses 14 in combination with mirror-display 20, the ability to sense when glasses 14 are within a proximity that is a general location of at least a mirror-display 20 (or some other component of system 1 that is capable of communication with glasses 14,) such that glasses 14 might then communicate with a nearby mirror-display 20 in order to identify itself and begin to exchange commands. Where haptic or kinesthetic notification communication comprising detector-communicator 14-*dc* includes any of well-known technologies such as a rumble pack for creating a vibrational notification to a guest 2. Where computing element comprising detector-communicator 14-*dc* includes any of well-known embedded processors such as a Snapdragon 835, for controlling all glasses parts as described in relation to FIG. 5D. Where communications element comprising detector-communicator 14-*dc* includes any of well-known wireless communications technologies and protocols, such as Bluetooth, IR or RF, where the purpose of wireless communication between glasses 14 and mirror-display 20 (or any component of system 1) is to exchange commands for example providing glasses identity, location, orientation, open/closed state, for providing audio information to glasses 14 and therefore to audio outputs 14-*a*1 and 14-*a*2, for providing vibrational notification to guest 2 through glasses 14 via e.g. haptic devices, for receiving video or image information from glasses 14 and therefore from camera 14-*cam*, as well as controlling synchronization signals for operating any of active filter lenses 14-*sl*, camera 14-*led*2, hidden signal LEDs 14-*led*1, 14-*led*2 and 14-*led*3, visible notification signal LEDs 14-*led*-*x*.

Still referring to FIG. 5D, detector-communicator 14-*dc* preferably further includes unique encoding such as an electronic serial number for uniquely identify glasses 14 to mirror-display 20 and/or to filter received mirror-display 20 commands thereby only responding to mirror-display 20 commands that are properly encoded for the unique serial number of the given glasses 14, all as will be well understood by those familiar with wireless communication systems. After detecting the unique identification of glasses 14, such as by receiving a unique serial number transmitted by glasses 14's communication means 14-*dc*, mirror-display 20 preferably commands global system 40 to provide additional datum associated with unique glasses 14, where additional datum includes any of the preferred datum maintained in association with unique glasses 14 by global system 40 or local system 30.

For example, the present inventor anticipates that guests 2 may purchase or rent unique encoded glasses 14 using either system 40 or 30, where the purchase or rent transaction then preferably gathers guest 2 datum or associates with pre-gathered guest 2 datum, where the guest datum includes any one of, or any combination of: facial image(s) of the guest, their name, age, sex, first language, or guest-entity related datum including any one of, or any combination of theme and character preferences, hotel room, park access restrictions, selected options, and other park ticket related datum, global or local gaming status and history as well as global tracking locations. After obtaining such datum, especially including facial images, mirror-display 20 using object tracking system 24 then processes images captured of guest 2 wearing glasses 14 to confirm the identity of guest 2, for example using any facial recognition or barcode technology. Mirror-display 20 also uses associated datum to uniquely create, mix, select and otherwise present customized secret video and/or audio messages to identified guest 2 wearing identified glasses 14, either for receiving through glasses 14 or for example being received by a special theme park app associated with guest 2's mobile device.

Still referring to FIG. 5D, means 14-*dc* is preferably in further communication with one or more signal emitting devices attached to glasses 14 such as three IR LEDs 14-*led*1, 14-*led*2 and 14-*led*3, where each emitting device is preferably embedded within glasses 14 such that the emitting device is not visually apparent. Under synchronized communication with mirror-display 20, means 14-*dc* controllably operates emitting devices for communication of a hidden signal to object tracking system 24 of mirror-display 20, where the hidden signal may be interpretable by mirror-display 20 as a unique encoding representative of glasses 14, and where the unique encoding is similarly usable as the prior discussed unique serial number. For example, if emitting devices are IR LEDs 14-*led*1, 14-*led*2 and 14-*led*3 as shown, communication means 14-*dc* causes any one of, or any combination of IR LEDS 1, 2 and 3 to flash for any of one or more durations or otherwise energizes IR LEDs 14-*led*1, 14-*led*2 and 14-*led*3 for creating a hidden signal, all as will be well understood by those familiar with communication systems and protocols. These signals have at least two distinct purposes.

A first purpose for hidden signals such as the emissions of IR LEDs 1, 2 and 3 is to allow mirror-display 20 to send unique instructions to glasses 14 to cause a controlled response signal. For example, if multiple guests 2 each wearing uniquely addressable glasses 14 are in the proximity of mirror-display 20, mirror-display 20 may then send an omni-directional signal with encoding for identifying a single pair of glasses 14 and response instructions, where all glasses in proximity of mirror-display 20 receive the omni-directional signal but only the individual glasses 14 corresponding to the encoded identification then respond according to instructions by causing a hidden signal from emitting devices such as a signal output by any one of, or any combination of IR LED's 1, 2 and 3, the response of which is detectable by object tracking system 24 of mirror-display 20. As will be appreciated by those familiar with the art of object tracking, this provides an accurate method for confirming and identifying the location of unique glasses 14 within object tracking system 24's field-of-view, where the field-of-view may comprise a multiplicity of unidentified guests 2 wearing identified glasses 14. Thus mirror-display 20 has both apparatus and method for controllably determining: 1) which of many possible unidentified glasses 14 are within object tracking system 24's field-of-view, 2) what is the unique identifier for each of the many possible glasses 14, 3) where are each of the identified glasses 14 located in system 24's field-of-view, 4) what is the datum pre-associated with each of identified glasses 14, 5) what is the identity of unidentified guest 2 detected by system 24 to be wearing identified glasses 14, where the identity is confirmed for example through facial recognition, 6) what is the datum pre-associated with each of identified guests 2, 7) what is the identity and type of the article 12 detected by system 24 as being held by identified guest 2, and 8) what is the tracked trajectory and path of at least the tip of article 12, and therefore an associated guest 2 command. As will be appreciated by those skilled in the art of theme parks and gaming systems, this information controllably determined by mirror-display 20 is especially useful with the prior discussed interactive gaming systems 36 and 48.

Still referring to FIG. 5D, a second purpose for hidden signals is to provide means for mirror-display 20's object tracking system 24 to detect and track the current location and orientation of glasses 14 in up to as many as 6 DOF. As will be appreciated by those skilled in the art of human motion tracking, by tracking at least the location of glasses 14 in as many as 6 DOF in association with a given guest 2 face if not also body, mirror-display 20 has significant information for modeling the guest 2's location, posture and estimating where guest 2 is looking and moving. The present inventor reiterates that object tracking system 24 of mirror-display 20 also tracks article 12 movements in up to 6 DOF if guest 2 is controllably moving article 12, where any one of, or any combination of the identity or tracking datum associated with glasses 14, article 12, or guest 2 is valuable for creating customized guest 2 experiences. The present inventor anticipates that customized guest 2 experiences include: 1) the presentation through mirror-display 20 of any one of, or any combination of pre-stored video and/or audio, 2) the presentation through mirror-display 20 of dynamically created, mixed or animated video and/or audio, and 3) the actuated movements of either global game-pieces or local game-pieces.

Still referring to FIG. 5D, as will be appreciated by those skilled in the art of entertainment systems, mirror-display 20 and system 1 have significant apparatus for presenting customized and even secret video and audio to any of individual guests 2 within a multiplicity of guests 2, not the least of which is important for the envisioned global gaming system 48 and local gaming system 36. As will also be well understood by those familiar with the art of smart glasses, many other features can be usefully included in glasses 14 for use by system 1. Glasses with these many other features are already being patented and/or built by many companies including Google, Microsoft, Sony, Apple as well as smaller startups. The present inventor anticipates that some of these glasses may be useable in part for adaptation to the present invention, and in part for extension of the ability of the herein specified glasses 14 to collect information for, and exchange commands with, global system 40 and local system 30, where the adaptations include adding any of the features described herein for any glasses depicted in the present invention including 14-LL and 14-RR shown in FIGS. 2A, 2B and 2C, as well as 14 shown in FIG. 5D and implied in FIGS. 5A, 5B and 5B.

And finally, with respect to the tracking of glasses 14, as will be well understood by those skilled in the art of object tracking, the three active IR LEDs 14-*led*1, 14-*led*2 and 14-*led*3 and associated communication device 14-*dc* could be replaced by passive elements, such as IR retroreflectors. Using passive markers for tracking glasses 14 provides the advantage of lower cost. It is herein alternatively taught that a multiplicity of retroreflective elements, each responsive to a limited band of electromagnetic frequencies, can be arranged in an encoded pattern such that object tracking system 24 after emitting the various limited band frequencies, can then detect the strategic arrangement of retroreflectors as a means for uniquely identifying either a type of glasses 14, or individual glasses 14.

Returning now to FIG. 5A, there is shown display layer 28-1 with coordinated glasses 14-1. Given the significant range of polarization layer technology as prior discussed, the present inventor teaches certain exemplary combinations especially of the polarization layers found within display layer 28-1 and glasses 14-1. A first combination is to use an active polarization layer within display layer 28-1 combined with a passive polarization layer for glasses 14-1. More specifically, active polarization is used for example to alternatively or selectively polarize individual video frames being output by the display layer 28-1, where the polarization for example is either left circular or right circular. Guest 2*a* wearing glasses 14-1 that are fitted with passive left circular polarizing lenses covering both the left and right eyes will then only see video frames that have been left circular polarized by the active polarizer layer within display layer 28-1. Conversely, guest 2b wearing glasses 14-1 that are fitted with passive right circular polarizing lenses covering both the left and right eyes will then only see video frames that have been right circular polarized by the active polarizer layer within display layer 28-1. This construction thereby allows two separate video streams to be output by display layer 28-1 that are individually seen by guests 2 depending upon which glasses 14-1 they are wearing, either left or right circular polarizing. In either case, guests 2 will also preferably see some reflection of their and any other guest 2's images while standing appropriately in front of the display layer 28-1. One advantage of this first construction of display layer 28-1 and coordinated glasses 14-1 is that the glasses 14-1 would typically be less expensive and of lighter weight by using passive rather than active polarizing technology, as will be well understood by those skilled in the art.

The present inventor notes reference art U.S. Pat. No. 9,516,292 B2 from Bickerstaff et al. In the Bickerstaff teaching, normal left-right eye images embedded in various 3D signals are repurposed to transmit "two images for different respective non-stereoscopic viewpoints of a virtual environment." Similar to the present invention, this provides a means for two guests 2a and 2b, each wearing active shutter glasses, to receive their own unique 2D images. Bickerstaff is mainly concerned with creating an interface device for connecting existing 3D or 2D televisions with existing gaming systems such as a Playstation 3, where the interface device detects a range of possible TVs, gaming systems and peripherals and manages to convert between normal 3D (i.e. left-right perspective images) and what is referred to as "dual-view mode" (i.e. first 2D images for guest 2a and second 2D images for guest 2b.) As a careful reading of the present invention will show, there are many advantages to the herein taught apparatus and methods over the Bickerstaff teachings, especially upcoming teachings regarding the hiding and blending of customized (secret message) images for a guest such as 2a or 2b within a total stream of images viewable by guests without any glasses.

Still referring exclusively to FIG. 5A, a second construction of display layer 28-1 and coordinated glasses 14-1 is to use an active polarization layer within both display layer 28-1 and glasses 14-1, where these active polarization layers are controllably synchronized by preferably the computing and communication layer 22 of mirror-display 20 along with the output of video frames by display layer 28-1. Remote synchronization communications with glasses 14-1 can be accomplished using any of well-known technologies especially including DLNA (Digital Living Network Alliance) compatible technology. An advantage of using this second construction is that all guests 2 are wearing the same glasses 14-1, where preferably each instance of glasses 14-1 are uniquely identifiable and detectable by mirror-display 20 as prior discussed in relation to FIG. 5D. As mirror-display 20 is then able to uniquely identify and track each of individual glasses 14-1 within its field-of-view, system 1 is then able to individually engage any of guests 2, especially by transmitting individualized video/audio to guest 2 through glasses, e.g. 14-1, 14-2 or 14-3.

Referring still to FIG. 5A, a third construction of display layer 28-1 and coordinated glasses 14-1 is to use a passive polarization layer within both display layer 28-1 and glasses 14-1. As will be well understood by those skilled in the art of 3D systems, by using a passive film-type patterned retarder with an appropriately matched display layer such as found on some of LG's 3D televisions, every other row of the images output by the display layer are alternately polarized such that half of the horizontal resolution is left circularly polarized while the other half is right circularly polarized. Normally, the alternately polarized rows are meant to be left and right eye images of the same scene, in which case the glasses worn by a guest would need to have a left lens that matches the polarization of the left eye image and a right lens that matches the polarization of the right eye image, all as will be well understood by those familiar with film-type patterned retarder 3D systems. The present inventor teaches alternatively using every other row of the display resolution to represent a first image stream of a first distinct scene while then using the remaining alternate rows of the display resolution to represent a second image stream of a second distinct scene. In this case, glasses 14-1 would come in two variations, one variation with identical passive polarizers for each left and right eye adapted to match the polarization applied to the first image stream such that the guest 2a only sees the first scene, and a second variation with identical passive polarizers for each left and right eye adapted to match the polarization applied to the second image stream such that another guest 2b only sees the second scene. One of the advantages of this third construction is that it uses only passive polarization layers within both the display layer 28-1 and glasses 14-1 thus reducing cost, all at the expense of providing image streams of a first and second stream at one half of the possible resolution of the display layer.

Referring next exclusively to FIG. 5B, there is shown display layer 28-2 with coordinated glasses 14-2, where glasses 14-2 comprise active shutter layer. As prior discussed, a typical and well-known implementation for the active shutter layer is electronically controllable LCD that can be switched between substantially opaque and substantially transparent. The herein disclosed mirror-display 20 preferably uses any of well-known wireless communications means to set the state of the active shutter layer to be either opaque or transmissive in coordination with mirror-display 20's presentation of output images through display layer 28-2.

Referring next exclusively to FIG. 5C, there is shown display layer 28-3 with coordinated glasses 14-3. Display layer 28-3 is exactly like 28-1 and comprises a display layer, polarization layer and transflective mirror layer, where the anticipated alternative technologies and operations as prior discussed especially in relation to FIG. 5A about 28-1 are considered likewise descriptive of 28-3. Glasses 14-3 however, are unique in comparison to prior glasses 14-1 and 14-2 in that they comprise both an active shutter layer in combination with a polarization layer. As will become clear from a careful reading of the present invention, the ordering of the shutter layer versus the polarization layer with respect to the conducting of the output image emitted by the display layer 28-3 is immaterial. However, as will also be clear to those skilled in the art of electronics, by offsetting the switching signals of the active shutter lens versus polarization lens, it is possible to significantly reduce the effective switching time of glasses 14-3 versus either of glasses 14-1 or 14-3, where the switching time is the amount of time it takes any glasses 14-1, 14-2 or 14-3 to change from blocking images to transmitting images back to blocking images. For example, if both polarization and active shutter lenses are capable of switching off-on-off in 6 ms, and the active shutter lens is switched for example 3 ms prior to the polarization lens, then the combined switching time will be on the order of 3 ms, or twice the rate which more closely matches an image display refresh time for displays operating at 240 hz. As will be well understood, the offset times of the two slower switching devices can be adjusted in order to exactly match the duration of a given image being displayed by the faster switching display, which is useful for exactly blocking selected displayed images. One alternative to using the depicted combination of active shutter and polarization layers is to alternatively use a polarization layer that is capable of three switchable states: 1) left polarization, 2) right polarization, and 3) transmissive, this alternative of which is herein taught and falls within the scope of the present invention. The uses and operation of display layer 28-3 in combination with 14-3 will be described in greater detail along with the combinations of 28-1 and 14-1 as well as 28-2 and 14-2 after the ensuing description of FIGS. 6A, 6A and 6A.

Referring next to FIG. 6A, there is shown mixed video stream 28*a*-*s*3 to be output by any of the mirror-display 20 preferred and alternate constructions herein taught and all alternatives that will be obvious to those skilled in the various necessary arts, the entirety of which is considered to be within the scope of the present invention. Mixed video stream 28*a*-*s*3 comprises a temporally output set of total image frames, further comprising three subsets of image frames including: 1) one or more image frames forming base video stream 28*a*-*s*3-*b;* 2) one or more image frames forming one or more secret message video streams(s) 28*a*-*s*3-*sm*, and 3) zero or more image frames forming buffer video stream 28*a*-*s*3-*f.* In order to best understand the purposes and novel value of the mixed video stream 28*a*-*s*3 it is first helpful to understand an exemplary use case for the present system 1, and in particular mirror-display 20. In this use case the transflective layer of mirror-display 20 is removed and the remaining construction of mirror-display 20 is placed in an outdoor setting inside of a theme park area where crowds of guests 2—all gather simultaneously. As will be obvious to those familiar with transflective layer technology, it is also possible to set the state of the transflective layer to be substantially transmissive thereby accomplishing the same goal as removing the transflective layer all together, where the goal is that any onlooking guests 2—all do not see any substantial reflections of themselves or others. The present inventor is now teaching that mirror-display 20 of the present invention has significant novelty and uses even when it is not acting in a reflective or transflective manner, even when it does not include a transflective mirror layer such as 28*c* shown in FIGS. 2A and 2A, and transflective mirror layer shown in FIGS. 5A, 5B and 5C, all of which falls under to scope of the present invention. The careful reader will understand that mirror-display 20 without a transflective layer is equivalent to a display such as a television or computer monitor possibly covered by a polarization layer, and that especially when the display layer is a combination projector, polarization device (e.g. a Z-Screen from RealD) and movie screen, then the teachings herein regarding mirror-display 20 are also applicable to movie theaters, all of which is considered to be within the scope and teachings of the present invention.

Still referring to FIG. 6A, there is shown multiple guests 2—all that are positioned to be capable of viewing any one or more image frames comprising mixed stream 28*a*-*s*3. Guests 2—all further comprise zero or more onlookers 2*o* that see all image frames in stream 28*a*-*s*3 including subsets 28*a*-*s*3-*b*, 28*a*-*s*3-*f* and 28*a*-*s*3-*sm*, and one or more selected guests 2*s* that are controllably restricted to see only one or more image frames in subset secret message video stream(s) 28*a*-*s*3-*sm*. As will be well understood by those familiar with human vision, all images output by a display regardless of any added polarization will be seen by the naked human eye that does not filter or detect polarization. Given this understanding, all guests in the group 2*o* that are not wearing glasses such as 14-1, 14-2 or 14-3 and are positioned to be able to see mixed video stream 28*a*-*s*3 will see all image frames in stream 28*a*-*s*3, including image frames comprising buffer video stream 28*a*-*s*3-*f* and secret message stream(s) 28*a*-*s*3-*sm*.

As will also be well understood by those familiar with human vision, the human eye has limited capacities for detecting any single image frame in an ongoing stream such as 28*a*-*s*3. One of the most critical factors effecting human visual perception is the amount of temporal contrast from image to image, where higher temporal contrast will be more noticeable, and where temporal contrast includes the change in brightness (e.g. black to white is more noticeable than grey 60% to grey 65%,) the change in hue (e.g. colors that are opposite on the color wheel like yellow and violet have more contrast than neighboring colors like yellow and yellow-orange,) and the change in saturation (e.g. the same color at two different saturation levels will have more contrast the greater the difference in saturation.) Another critical factor is image refresh rate, where the refresh rate is a combination of how long an individual image is displayed and how many of the same individual images are displayed successively. It is well-known that a unique image displayed multiple (e.g. 24) times in one second, where each display is a of short duration (such as ⅟₂₄sth of a second) will be perceived substantially equivalent to that same unique image continuously displayed for 1 second.

As will also be understood by those familiar with image display systems, there are two critical measures for evaluating a display system, specifically the image frame rate and the display refresh rate. The image frame rate is the number of distinct images that can be loaded into the display's image buffer per second which is typically limited by the graphics control system outputting to the display and for example is at least 24 frames (images) per second (fps.) It is generally understood that to show fluid motion, the minimum image frame rate is 24 fps. The refresh rate is the number of times per second that a display system can display the contents of its image buffer (regardless of what image is in that buffer,) and for example is at least 60 refreshes per second to achieve what is referred to as "flicker free," meaning that a person will not perceive the background that is visible when an image is not being displayed, where the background is typically black. For example, a movie in a theater is traditionally displayed at 24 fps, where each frame is repeated 3 times yielding a total refresh rate of 72 fps, providing flicker-free motion.

Commercially available, state-of-the-art display systems are now exceeding image frame rates of 240 fps and refresh rates of 240 hz. Therefore, using available technology, mirror-display 20 is at least able to output a mixed video stream 28*a*-*s*3 at a rate comprising 240 unique images per second. A state-of-the-art polarizer from RealD called Z-screen can polarize 144 frames per second. As will be understood by the careful reader, prior described display layers 28-1 and 28-3 (with or without a transflective mirror layer) are therefore capable of oppositely polarizing at least every other set-of-two of these 240 unique images, providing at least 120 oppositely polarized images per second. Using the same state-of-the-art polarizers on glasses such as 14-1, it is possible to block or transmit at least these same 120 images per second to guest 2 wearing such glasses. State-of-the-art shutter glasses from Ultra-Clear can refresh up to 144 times per second. Using the same state-of-the-art active shutter technology on glasses such as 14-2, it is possible to block or transmit at least 120 images per second to guest 2 wearing such glasses. As will be appreciated by those skilled in the various arts herein described, it is reasonable to forecast that near future mirrors 20 and coordinated glasses such as 14-1, 14-2 and 14-3 can be constructed with at least double this performance, for example displaying 480 unique images per second, blocking or transmitting at least 240 of these using polarization alone, and blocking the remaining 240 using active shutters.

Still referring to FIG. 6A, as will be well understood by those skilled in the art of human visual perception, using mirror-display 20 displaying a mixed video stream 28a-s3 comprising e.g. 240 image frames per second, it is possible to interleave e.g. 24 secret image frames 28a-smf per second, where each of the 24 secret frames 28a-smf may then also be repeated e.g. 1 to 3 times yielding up to 72 total frames per second. Using wireless control of identified glasses 14-1, 14-2 or 14-3 being worn by identified and selected guest 2s, mirror-display 20 is capable of synchronously controlling guest 2's glasses such that guest 2s is limited to seeing only the 24 to 72 secret image frames 28a-smf, thus perceiving a private secret message. Mirror-display 20 is also capable of controlling guest 2s's glasses such that guest 2s is able to see a combination of the 24 to 72 secret images along with some or all of the base video stream 28a-s3-b, thus perceiving a private secret message overlaid onto a public video. Furthermore, as will be discussed in greater detail forthwith, all other non-selected guests 2o will perceive the total of image frames in mixed stream 28a-s3, including buffer frames 28a-bf, were buffer frames 28a-bf reduce and eliminate the ability of guests 2o to perceive secret message frames 28a-smf. It is also possible that any successive secret message frames 28a-smf are the same or different images, where different images introduce motion as will be well understood by those skilled in the art of video. It is also possible that secret message frames 28a-smf are any one of, or any combination of images without representations of text that is viewable by selected guests 2s, or images with representations of text that is viewable and therefore readable by selected guests 2s. Guests 2o are either not wearing glasses, or wearing glasses such as 14-1, 14-2 and 14-3 that are controllably disabled via communications with mirror-display 20 consequently remaining in a full-time transmissive state, and therefore all guests 2o visually receive all image frames comprising mixed stream 28a-s3.

Referring still to FIG. 6A, selected one or more guests 2s are wearing glasses such as 14-1, 14-2 and 14-3 that are enabled and controlled via communications with mirror-display 20 to receive one or more of the secret message frames 28a-smf within stream 28a-s3-sm, while also receiving zero or more frames within either base video stream 28a-s3-b or buffer video stream 28a-s3-f. The exemplification in FIG. 6A portrays that guest 2s receives only secret message frames 28a-smf and that all buffer frames 28a-bf and base frames within stream 28a-s3-b are blocked, although this is not mandatory for the present teachings as guest 2s could usefully be allowed to see a portion of base video stream 28a-s3-b. As the careful reader will understand, mirror-display 20's control of selected guests 2s's glasses such as 14-1, 14-2 and 14-3 allows the secret message stream 28a-s3-sm to: 1) be seen by multiple selected guests 2s actually simultaneously, where all selected guests 2s are seeing the same message frames 28a-smf, 2) be seen by multiple selected guests 2s perceived simultaneously, where individual guests 2s are actually seeing temporally different secret message frames 28a-smf with different secret messages over a short time that all guests 2s perceive to be simultaneous, and 3) seen by multiple selected guests 2s alternately, where individual guest(s) 2s see either the same or different secret messages 2a-smf at perceived different moments in time, for example 5 or more seconds apart.

Still referring to FIG. 6A, as prior mentioned, secret message video stream 28a-s3-sm might comprise 24 to 72 image frames dispersed within the total 240 image frames being output per second in mixed stream 28a-s3. Again, as will be well understood by those familiar with human vision perception, depending upon the temporal contrast between any given secret message frame 28a-smf and either its preceding or subsequent base video image frames from within stream 28a-s3-b, a guest 2o may or may not perceive the single secret message frame 28a-smf. As will also be well understood, in order to further disguise any given single secret message frame 28a-smf, it is possible to reduce the temporal contrast between the given secret message frame 28a-smf and the preceding or subsequent base image frames by inserting one or more buffer images 28a-bf either preceding or subsequent to the secret message frame 28a-smf. There are at least two methods for creating buffer frames 28a-s3-f for disguising secret message frames 28a-smf, including the strategies of hiding and blending. The present FIG. 6A addresses hiding, where the upcoming FIG. 6B addresses blending.

Referring still to FIG. 6A, disguising by hiding is where one or more buffer frames 28a-bf are inserted into mixed stream 28a-s3 either before or after a given secret message frame 28a-smf, where each inserted buffer frame 28a-bf is constructed on a pixel by pixel basis to temporally neutralize the given secret message frame 28a-smf, where neutralizing means effecting human perception of the temporal sequence of buffer frames 28a-bf and surrounded secret message 28a-smf frame such that the successive combination of these frames is perceived as a specifically chosen hue, saturation and intensity, for example a pale grey or black. For instance, in the example shown in FIG. 6A, for each representative white or black pixels in the secret message frame 28a-smf, there is an opposite black or white pixel located in a surrounding buffer frame 28a-bf. As will be understood by those skilled in the art of human visual perception, a subsequent flashing of black-WHITE-black, or white-BLACK-white, (where the capitalized colors are from the secret frame 28a-smf and the lowercase colors are from either the before or after sequenced buffer frames 28a-bf) will be perceived as some level of grey by a guest 2o, depicted as perceived grey frame 28a-pf. Furthermore, to shift perceived grey frame 28a-pf closer to black, the surrounding pixel-by-pixel sequence would preferably be: black-black-BLACK-black-black or black-black-White-black-black, with more buffer frames added in order to better neutralize the secret message frame 28a-smf. As will also be well understood, another issue for hiding is to choose a hue, saturation and intensity that is less extreme and as such is easier to hide with an offsetting buffer frame. In this simple example, the secret message could use 20% grey pixels rather than 0% grey (i.e. white pixels,) thus temporally mixing with black pixels in the buffer frame to hide more effectively.

Still referring to FIG. 6A, the example chosen for creating perceived frame 28a-pf is exemplary, and specifically exemplary of textual secret messages that are formed exclusively of black or white pixels, whereas the preferred secret message frames 28a-smf will comprise pixels of various colors, hues and intensities. As will also be well understood by those familiar with human visual perception of video color spaces, the concept of the color space difference between any two pixels is quantifiable as a Euclidean distance. For example, in the RGB color space, the color difference between any two pixels $(R_1, G_1, B_1)$ and $(R_2, G_2, B_2)$ can be calculated as: distance=SquareRoot $[(R_2-R_1)^2+(G_2-G_1)^2+(B_2-B_1)^2]$, where distance is the color difference between the two pixels. As is also well known, there are a number of color distance formulae that attempt to use a given color space (such as RGB or HSV) for calculating this difference, some formulae of which further attempt to account for the differences in the sensitivity of human visual perception to different colors such as green verses red, where human perception is further varied based upon the brightness of the color.

Regardless of the color space or formulae chosen, what is important to understand is that pixels with smaller color differences tend to have less visual contrast, thus limiting guest 2o's ability to perceive a difference when the pixels are presented in the same spatial location at successive moments in time. The concept of a "just noticeable difference" relates to the minimum Euclidian distance (color difference) that is perceivable by the average human between any two colors within some color space. The present inventor prefers the use of one or more buffer images coming timewise before or after a single secret message image, where multiple spatially aligned pixels across the combination of one or more buffer images surrounding a secret message image, form a single temporal pixel.

Referring next to FIG. 6B, there is shown an exemplary set of five sequential image frames 28-*sif*, labeled f1, f2, f3, f4 and f5. Image f3 for example is a chosen secret message frame such as 28a-*smf* depicted in FIG. 6A, while image frames f1, f2, f4 and f5 are created as surrounding buffer frames 28a-*bf* depicted in FIG. 6A. As will be understood by those familiar with image processing and human visual perception, there are at least two well-known methods for merging neighbor pixels to alter the perception of a human observer. In the temporal method, a single pixel of the same row-col location in each of frames f1, f2, f3, f4 and f5 is considered to form a temporal group 28-*sif-p* that is perceived by an observer as a single perceived pixel 28-*sif*-P*p*. In the spatial method, a neighborhood of spatially adjacent pixels is perceived by an observer as a single pixel, essentially a color blend of all neighboring pixels. This for example is how various spatial combinations for red, green and blue are perceived as a multiplicity of different colors. The present figure extends the spatial method to be a spatio-temporal method, where groups of pixels sharing the same row-col locations in each of frames f1, f2, f3, f4 and f5 are considered to form a spatio-temporal group 28-*sif-pg* that is perceived by an observer as a single perceived pixel 28-*sif*-P*p*.

Referring still to FIG. 6B, whether using a temporal set 28-*sif-p* of single pixels to create a perceived pixel 28-*sif*-P*p*, or using a spatial-temporal set 28-*sif-pg* of groups of pixels to create a perceived pixel 28-*sif*-P*p*, the goal is that perceived pixel 28-*sif*-P*p* is slightly under the "just noticeable" Euclidean distance from a target pixel 28-*sif*-T*p*, where the target pixel 28-*sif*-T*p* represents the desired perception for selected guest 2s to best disguise a secret message pixel. As prior discussed, the desired minimal Euclidean distance ensures that the color difference between perceived pixel Pp and target pixel Tp is equal to or less than the human perceptible difference. Also, as prior mentioned, there are many well-known formula for working in various color spaces to calculate and meet the goal of non-perceptible difference between Pp and Tp, where these same principles are herein included for determining and setting individual buffer pixels. The result of properly selected buffer pixels is that a secret message pixel appears to a guest 2o as a target pixel, wherein the target pixel was predetermined so that the secret message would be not visually apparent to any guest 2o.

Referring again to FIG. 6A, using a display capable of outputting 240 fps, it is possible for example to create a mixed stream 28a-*s3* wherein every 10 image frames includes 5 "on" frames for repeating a single base image of base video stream 28a-*s3*-*b* and 5 "off" frames for displaying secret image frame 28a-*smf* along with 4 buffer frames 28a-*bf*, where the temporal perception of the five "off" frames is that of a single frame perceived frame 28a-*pf* that is preferably dark or near black. Also as prior mentioned, especially as display and glasses technologies improve, many combinatorial variations will be possible without departing from the teachings herein.

Referring next to FIG. 6C, there is shown a mixed video stream 28a-*s4* that is similar to mixed video stream 28a-*s3* shown in FIG. 6A in that it comprises the same base video stream 28a-*s3*-*b* and secret message stream(s) 28a-*s3*-*sm*. However, stream 28a-*s4* is different from stream 28a-*s3* in that it comprises a differently constructed buffer video stream 28a-*s4*-*f* rather than buffer stream 28a-*s3*-*f*. What is different about buffer stream 28a-*s4* is that individual buffer frames 28a-*bf* comprising stream 28a-*s4*-*f* are created in consideration of both a secret message frame 28a-*smf* and one or more base image frames coming temporally before or after the buffer frames 28a-*bf*. (Essentially, the before or after base image frames are the target frames usable for calculating the values of individual pixels within buffer frames for either temporal or spatio-temporal mixing with associated secret message frame pixels, all as discussed in relation to FIG. 6B.) As will be obvious to a careful reader, in this second strategy, the goal is to blend the secret message into the preceding or following base images, rather than hiding the secret message inside of buffer frames to form a perceived frame that is homogenously colored, such as dark grey or black. All other teachings with respect to FIGS. 6A and 6B are applicable to FIG. 6C and will be obvious to those skilled in the arts of video processing and human visual perception.

Still referring to FIGS. 6A and 6C, the following is an exemplification and anticipated use of system 1 for selecting guests 2s out of a multiplicity of guests 2—all, for a competition, where the competition includes receiving secret video/audio messages. In this example, mirror-display 20 again either has no transflective layer, or the layer is set to transmissive and therefore is minimally reflective and is situated in a theme park area where many guests 2—all may be congregating. First, mirror-display 20 determines via omni-directional communications which of many possible glasses 14 are within range of mirror-display 20, as well as the individual identifying codes of each in-range glasses 14. Mirror-display 20 then sends an omni-directional notification signal that causes all in-range glasses 14 to begin vibrating the haptic device preferably included in detector-communicator 14-*dc* and flashing visible LED notification signals using visible LEDs 14-*led*-*x*. (The careful reader will note that this is similar to the technique used by restaurants for indicating when a guest's table is ready if that guest is holding a specialized pager.) Simultaneously, mirror-display 20 then outputs public (base images) video/audio announcing to guests 2—all that a challenge is to be held—e.g. "Lord Voldemort is challenging all Harry Potter's to a spell dual, please put on your glasses if your dare."

Still referring to FIGS. 6A and 6C, unidentified guests 2 then put on their vibrating glasses 14, which requires opening glasses, orienting them upright and level, and then placing them on their head such that pads 14-*p* are in contact with their nose. Detector-communicator 14-*dc* detects any one of, or any combination of events including glasses have been opened, oriented upright and level or that pads 14-*p* are in contact with skin, where after communicator 14-*dc* turns off vibration and visible light blinking and communicates to mirror-display 20 that identified glasses are now placed on unidentified guest 2's face. Mirror-display 20 then communicates specifically with each of identified glasses to cause specific glasses 14 to emit a hidden signal using LEDs 14-*led*1, 14-*led*2 and 14-*led*3, where object tracking system 24 detects the unique hidden signals and locates each of identified specific glasses 14 within system 24's field-of-view. Next, mirror-display 20 retrieves or uses already retrieved datum associated with identified specific glasses 14 including facial images of associated renter/purchaser guest(s) 2, where this image information is used to uniquely confirm the identity of each guest 2 wearing identified and located specific glasses 14. Mirror-display 20 may then next output video/audio announcing to all identified guests 2, even by using their individual names, to perform some action with their article 12 or to otherwise make movements to indicate that they wish to "challenge Lord Voldemort," where the announcement could be in the form of a secret message or a public message.

Still referring to FIGS. 6A and 6C, there are many possible solutions for then selecting one or more guests from 2—all to become a selected guest 2*s*, for example detecting which guest 2 raises their article 12 the fastest. Once selected by mirror-display 20, the glasses 14 being worn by one or more selected guests 2*s* are then made to vibrate again, perhaps now also flashing visible LEDs 14-*led-x* in a new pattern, and possibly communicating either or both of a secret video message or secret audio message asking selected guests 2*s* to approach a certain location that was designed to bring the one or more selected guests 2*s* into an ideal proximity and view of object tracking system 24. As will be appreciated by those skilled in the art, and by a careful reading of the present invention, mirror-display 20 may then output base video images 28*a*-*s*3-*b* to be seen by all guests 2—all using mixed video stream 28*a*-*s*3 or 28*a*-*s*4, along with secret message images 28*a*-*smf* to be viewed by the one or more selected guests 2*s* along with any associated buffer images 28*a*-*s*3-*f* and 28*a*-*s*4-*f*, respectively. Selected guests 2*s* may also be receiving from mirror-display 20 example secret audio messages transmitted to their glasses 14, or text messages transmitted to their mobile device theme park app, and otherwise either alone or with a group of other selected guests 2*s* must perform some challenges, which preferably include moving article 12. The present inventor anticipates that mirror-display 20 will continue to track the location of each selected guest 2*s* within the field-of-view of system 24 at least by causing and detecting hidden signals from IR LEDs 14-*led*1, 14-*led*2 and 14-*led*3 associated with identified glasses 14 and therefore also guests 2*s*. It is further anticipated that mirror-display 20 will create real-time customized 2D and 3D content for use in secret messages, where the 3D content is optimized based upon the tracked location of guests 2*s*. And finally, when a particular selected guest 2*s* is determined to have won or lost a competition, mirror-display 20 might then cause either the same or different vibrations and visible light emissions to be generated by glasses 14 as well as send update commands to any of interactive gaming systems 36 or 48.

The ability of system 1 and mirror-display 20 to individually identify, locate and track a given guest 2 for also selecting as guest 2*s*, and then further tracking guest 2*s* and their article 12 movements, provides a multiplicity of exciting uses for interacting with guest 2*s* and providing secret communications, where secret communications are any one of, or any combination of: 1) visual communication via secret message video stream 28*a*-*s*3-*sm*, 2) audio communication via audio outputs 14-*a*1 and 14-*a*2 on glasses 14-1, 14-2 or 14-3, or 3) textual communication via prior discussed by not displayed theme park app or similar, and where the multiplicity of uses especially include park-wide themed gaming such as contests, treasure hunts and puzzles as well spontaneous gifting and promotional awards, etc. As will be appreciated by those skilled in the art of theme parks and gaming systems, the preset system 1 provides significant novel apparatus and methods such as just described, and as such the present teachings should be considered as exemplifications and not limitations of the present invention.

With respect to FIGS. 6A, 6B and 6C, as will be understood by those skilled in the art of display systems and human perceptions, hiding and blending as herein taught are exemplary techniques meant to teach general methods and therefore should be construed as exemplifications and not limitations of the present invention. For example, variations combining both inter-frame hiding and blending are possible as well as variations of intra-frame blending allowing neighboring pixel groups to overlap and effect each other's color settings. Furthermore, the number of individual buffer image frames 28*a*-*bf* comprising a buffer stream 28*a*-*s*3-*f* or 28*a*-*s*4-*f*, either preceding or following a given secret message frame 28*a*-*smf*, can vary in number and does not need to precisely match the examples depicted in either FIG. 6A or 6C. Also, display systems employed by mirror-display 20 may output fewer, e.g. 120 fps, or more, e.g. 480 fps, total individual image frames in mixed video stream 28*a*-*s*3, 28*a*-*s*4 as compared to the example 240 fps, where the changes in total fps of mixed stream 28*a*-*s*3, 28*a*-*s*4 alters the number of buffering frames 28*a*-*bf* or secret message frames 28*a*-*smf*.

With respect to the teachings herein for presenting video streams to guest 2 via mirror-display 20, with or without a transflective mirror layer, and specifically with respect to the teachings of secret message video streams 28*a*-*s*3-*sm* in relation to FIGS. 6A and 6C, as will be well understood by those familiar with 3D video, it is possible that one or more individually output frames from a mirror-display 20 display layer are presented as a single frame combining stereoscopic left eye—right eye images. The teachings for creating the 3D effect using either a single image frame, therefore spatially combining both the left and right eye perspectives (each in half resolution,) or using two successive image frames, therefore temporally combining both the left and right eye perspectives (each at full resolution) are well known in the art and can be accomplished using either glasses technology of polarization 14-1, 14-3 or active shutter 14-2, 14-3. What is typical in current practice is that the 3D images presented either spatially or temporally are predetermined for an average guest location assumed to be in front of the display layer—e.g. the 3D perspectives assume that the guest is ideally horizontally and vertically centered within the displayed image and backed off a certain fixed distance. Any guests 2 not so ideally centered will still perceive the 3D effect, but the effect is distorted the further offset a guest 2 is from the ideal center perspective. As will be understood from a careful reading of the present invention, system 1 is capable of determining where an individual guest 2 is located with respect to a given mirror-display 20 by use of its object tracking system 24 capabilities especially in combination with identifying glasses 14 (see FIG. 5D,) and as such system 1 is capable of dynamically creating visual content that correctly accounts for both the perspective and binocular shift of the individually selected guest 2s, all as will be understood by those familiar with 3D video systems.

In the preferred system 1, these individualized 3D left-right eye images, either spatially or temporally mixed, are controllably created by system 1 to match the unique perspective of a selected guest 2s or multiple selected guests 2s that are preferably standing in close proximity. The uniquely created stereo images are then controllably output to one or more selected guests 2s as secret message image frames 28a-smf for stream 28a-s3-sm.

When system 1 is outputting stereo images, mirror-display 20 will then controllably direct guest(s) 2s's glasses 14-1, 14-2 or 14-3 to limit the guest's left eye to receiving only the left-eye perspective and right eye to receiving only the right-eye perspective. The understanding of this technique is well known using either polarization or active shutter, where polarization can operate with either spatial or temporally mixed left-right images and active shutter is limited to temporal mixing.

As will also be understood by a careful reading of the present invention and an understanding of 3D systems, when mirror-display 20 is outputting temporally mixed stereoscopic information, mirror-display 20 may then controllably operate selected guest 2s's glasses to match the polarization of the alternating left-right images, thus allowing guest 2s to see and perceive the temporally mixed stereoscopic information as 3D, while conversely operating non-selected guest 2's glasses to oppose the polarization of the alternating left-right images, thus not allowing non-selected guests 2 to see and perceive the temporally mixed stereoscopic information as 3D. Likewise, to block guest 2 from seeing temporally mixed and polarized stereoscopic information, mirror-display 20 can also operate glasses such as 14-3 to close the active shutter in coordination with the output 3D images. Again, the careful reader will see that the combination of teachings herein provided for constructing mirror-display 20 in coordination with glasses 14-1, 14-2 or 14-3, especially including either or both active polarization and active shutter layers, and for constructing mixed video streams 28a-s3, 28a-s4 including secret message images 28a-smf that may be either hidden within or blended into the mixed stream such that any non-selected guest 2o does not visually perceive the secret images 28a-smf, allows for system 1 to provide either 2D or 3D secret images to selected guests 2s, where 3D secret images may be either spatially mixed (at half resolution) or temporally mixed (at full resolution) and otherwise created with a perspective and binocular shift to best match the tracked guest 2s's current location with respect to mirror-display 20.

And finally, mirror-display 20 coordinated with either glasses 14-2 or 14-3 comprising an active shutter layer has the ability to controllably output any sequence of temporally mixed left-right stereo images while opening active shutters for selected guests 2s and simultaneously closing active shutters for non-selected guests 2. As the careful reader will see, especially as technological advancements increase the image frame rate and refresh rates of display layer and active polarization technologies for constructing mirrors 20, and similar advancements increase the active polarization and active shutter layers of glasses 14-1, 14-2 and 14-3, increased options are then possible for presenting multiple 2D and 3D image streams controllably created and directed at selected guests 2s within a multiplicity of guests 2 by following the herein taught apparatus and methods.

Referring next to FIG. 7A, there is shown alternate mirror-display 20a, where mirror-display 20a object tracking system 24a is an alternative to object tracking system 24 of mirror-display 20, and otherwise where all other components and teachings regarding to mirror-display 20 are the same for mirror-display 20a. What is different about object tracking system 24a is that it only comprises a visible light camera and neither emits nor detects non-visible energy such as IR, where in preferred object tracking system 24 the emitted IR tracking energy reflected or retroreflected of special markings in at least the tip of article 12 (teaching of Kawash et al.) Alternate object tracking system 24a may therefore be implemented as for instance using a lower cost web-camera and does not require associated circuitry for synchronizing IR LED emitters (as described by Kwash et al.) Also depicted as added onto wand 12 are visible markers 13-a, 13-b and 13-c, where visible markers are preferably: 1) made of a material that adheres to a location on the article, e.g. marker 13-a is preferably placed on the tip of article 12, and 2) reflect a very bright and non-typical color such as phosphorescent orange or pink that is not likely to be otherwise found by object tracking system 24a when processing images, thus making the markers 13-a, 13-b and 13-c sufficiently unique in the ambient color space.

Still referring to FIG. 7A, as will be appreciated by those skilled in the art of image processing, feature detection and object tracking, by placing sufficiently unique markers 13-a, 13-b and 13-c on article 12 (e.g. an existing Harry Potter Wand,) it is straightforward to track the tip of article 12 in 2 DOF (using marker 13-a alone,) and the entire shaft of article 12 in 6 DOF (using all three markers 13-a, 13-b and 13-c.) As will also be appreciated by those skilled in the art, using the display output of mirror-display 20a, it is possible to conduct a calibration process whereby guest 2 presents article 12 after having adhered one or more sufficiently unique markers 13-a, 13-b and 13-c on article 12, such that object tracking system 24a images article 12 with any of attached markers 13-a, 13-b and 13-c and determines the relative distances between any two or more markers, as well as the relative placements of each of the markers 13-a, 13-b and 13-c with respect to the article 12 (e.g. marker 13-a is placed on the tip, marker 13-b is placed on the mid-shaft, and marker 13-c is placed near the base.) It is also possible to that each of markers 13-a, 13-b and 13-c comprise their own sufficiently unique color, e.g. marker 13-a is phosphorescent orange, marker 13-b is phosphorescent pink and marker 13-c is phosphorescent lime green. What is most important is that guest 2 who is using article 12 with a lower cost mirror-display 20a that uses only an inexpensive web camera or similar, may apply and calibrate one or more visible markers 13-a, 13-b and 13-c, each with sufficiently unique colors, and use the marked article 12 to practice and otherwise make any motions with marked article 12 that will at least be recognized and interpreted by mirror-display 20a the same as any motions made using non-marked article 12 would be recognized and interpreted by mirror-display 20.

Returning briefly to FIGS. 2A and 2B, as will be appreciated by those skilled in the art of image processing and object tracking, it is also possible and has value that guest 2 uses a marked article 12 with mirror-display 20, where object tracking system 24 of mirror-display 20 includes the ability to capture visible light images. For instance, if object tracking system 24 was limited to only capturing IR images and to only tracking the tip of article 12 using these non-visible IR images (i.e. Kawash et al.,) then by further adapting system 24 to also capture visible light images, and by at least adhering two sufficiently unique markers to locations on article 12 other than the tip (e.g. 13-*b* to the mid-shaft and marker 13-*c* to near the article base,) object tracking system 24 would have 3 points of tracking (i.e. the tip, mid-shaft and near base,) and therefore could easily determine the orientation and movement of article 12 in 6 DOF. (Again, without the 2 additional points beyond the article 12 tip, tracking is limited to only 2 DOF as is well-known in the art of object tracking using image processing.)

As will also be appreciated by those skilled in the art of visual user interfaces and gesture tracking, by tracking article 12 in 6 DOF and displaying representations such as 29*a* or 29*b* thereof through display 28, it is possible to provide more helpful training to guest 2 as they are learning to transcribe select paths with article 12. Furthermore, tracking in 6 DOF versus 2 DOF also provides for many more uniquely interpretable trajectories, motions and gestures for determining and issuing guest 2 responses and commands. For instance, non-marked article 12 is held steady in a unique orientation and simply moved closer or further away from mirror-display 20 along a line perpendicular to the plane of the mirror, this would be difficult to differentiate using article 12 tip tracking only (Kawash et al.) but can sufficiently be detected by tracking the entire marked article 12 tracked by 3 points. As will be well understood by those skilled in the art of object tracking using image processing, the 3 points will tend to converge along the perpendicular line as the article is retracted from the mirror-display 20, where the convergence (or divergence as the article is moved towards mirror-display 20,) is interpretable as direction of travel or further as a direction and distance of travel.

Thus, using an appropriately marked article 12 guest 2 can for example issue a unique command through mirror-display 20 by holding their article 12 steady in any orientation and then moving article 12 forward or backward along a line perpendicular to the plane of the mirror-display 20. As will be appreciated by those skilled in the art of object tracking, many other unique motions are possible using 6 DOF tracking versus 2 DOF, and therefore many other responses and commands. It is not the purpose of the present invention to describe the multiplicity of responses and commands and their interpretable meanings, and in fact the present inventor anticipates allowing guest 2 to employ the additional information contained within 6 DOF tracking to establish the define at least their own unique commands (based upon unique article 12 movements.) What is most important is that system 1 is further adapted by markers such as 13*a*, 13*b* and 13*c* used with either mirror-display 20 or mirror-display 20*a* to provide greater functionality for guest 2, many variations beyond those presently described of which will be well understood by those familiar with gesture interfaces and are considered to fall within the scope of the present invention.

Referring next to FIG. 7B, there is shown hand-held mirror-display 20*b*, where mirror-display 20*b* is exactly like mirror-display 20*a* in that it at least comprises a visible light imaging camera and is usable for tracking article 12 with added markers 13-*a*, 13-*b* and 13-*c*, all as prior taught in relation to FIG. 7A. What is most important to understand is mirror-display 20*b* is in the form of a mobile device such as a cell phone or tablet constructed for guest 2 by allowing guest 2 to load a controlling theme park app onto their mobile device such as a cell phone, where for example the guest 2's cell phone with theme park app becomes mirror-display 20*b*. As will be well understood by those skilled in the technology of cell phones and the art of cell phone application development, the preferred controlling theme park app uses the cell phone's front facing camera for capturing visible light images, uses the cell phone's processor for doing real-time object tracking, uses the cell phone display for presenting any one of, or any combination of: 1) semi-transparent images of guest 2 as if guest 2 was looking in a half-mirror, 2) images such as 29*a* or 29*b* representative of article 12 and its motions, including images 29*a* showing the article 12 tip path that are perceived by guest 2 as spells if article 12 is a wand, and 3) images of other content representative of any prior discussed functions and features of system 1, especially including functions related to global eco-system 40 and local eco-system 30. The preferred theme park app and therefore mirror-display 20*b* also uses audio output to communicate with guest 2 and uses either cellular communications, Bluetooth or wireless network to communicate with either or both global system 40 and local system 30.

Still referring to FIG. 7B, as will also be appreciated by those skilled in the art of cell phone technology and by a careful reading of the present invention, given sufficient image frame rates and refresh rates, mirror-display 20*b* is also capable of presenting secret message frames 28*a-smf* (in accordance with the teachings of FIGS. 6A, 6B and 6C,) where guest 2 is then also wearing active shutter glasses 14-2 in communication with mirror-display 20*b*, and cell phone as mirror-display 20*b* is representative of display layer 28-2 without a transflective mirror layer all as prior described. In such an arrangement, mirror-display 20*b* can also uses audio output on glasses 14-2 (as taught in relation to glasses 14 of FIG. 5D) for presenting secret audio messages to guest 2 across for example Bluetooth communications. As will be further appreciated by those skilled in the art of image processing and object tracking, mirror-display 20*b* composing cell phone with controlling theme park app, is also capable of performing facial recognition of guest 2 where facial images are made available for comparison via commands exchanged with either global system 40 or local system 30, all as prior taught herein especially with respect to mirror-display 20. The present inventor further anticipates that glasses 14-2 incorporating the teachings of glasses 14, may communicate unique identity to mirror-display 20 using various methods including electronic serial numbers or even unique markings on the glasses, where the unique markings are visible markers as opposed to the non-visible embedded LED's 14-*led*1, 14-*led*2 and 14-*led*3 described in relation to FIG. 5D. Hence, all of the benefits and operations prior described herein for system 1, including mirror-display 20's interactions with non-selected guest 2 in general, or selected guest 2s in particular, are equally applicable to and provided by the alternative mirror-display 20*b*.

Referring next to FIG. 7C, there is hand-held mirror-display 20*c*, that is similar to mirror-display 20*b* in that in comprises the components of a cell phone loaded with a controlling theme park app as prior discussed in relation to FIG. 7B. While mirror-display 20*b* comprised a cell phone with front facing camera capable of capturing and processing visible light images of article 12 under the direction of a controlling theme park application, some cell phones are known to have front facing cameras capable of detecting both visible and IR light (such as an IPhone.) Mirror-display 20c comprises cell phone case 21c with built in visible light filter and IR emitter opening 24c-o. Also attached to case 21c is movable filter and emitter mount 24c-m comprising attached IR emitting LEDs 24c-ire and visible light filter 24c-visf. Filter and emitter mount 24c-m is capable of movement within case 21c such that it can be adjusted by guest 2 back-and-forth into a location either: 1) covering the native cell phone front facing camera 24c-c, or 2) not covering the native cell phone front facing camera 24c-c. When mount 24c-m is located to cover the native cell phone camera 24c-c, preferably one or more IR emitting LEDs 24c-ire is brought into close proximity with camera 24c-c such that IR light emitted by IR LEDs that impinges upon IR retroreflecting markers (such as tip 20 of the Harry Potter Wand as depicted in FIG. 2A) is substantially reflected back into camera 24c-c with minimal loss of signal, all a will be well understood by those familiar with camera based object tracking systems. Mount 24c-m further includes communications and circuitry (not shown but as will be obvious to those skilled in the art of computer hardware) for both communicating with the encased cell phone and activating IR emitting LEDs 24c-ire in synchronization with image capture and processing as directed by the controlling theme park application.

Still referring to FIG. 7C, in a first mode of operation of mirror-display 20c, guest 2 slides mount 24c-m such that underlying cell phone camera 24c-c is not covered and remains capable of capturing images comprising both visible and IR light, at which point mirror-display 20c functions similar to mirror-display 20b. In a second mode of operation of mirror-display 20c, guest 2 slides mount 24c-m such that underlying cell phone camera 24c-c is covered by visible light filter 24c-visf and is therefore limited to capturing and processing only IR images. In the second mode of operation, IR LEDs 24c-ire are optimally positioned to emit IR tracking energies for reflecting off IR markers attached to article 12, where the IR energy reflected off article 12 is then received through filter 24c-visf by camera 24c-c, therefore collectively operating similar to object tracking system 24 used by mirror-display 20 and conforming to the teachings of either Kawash et al.

Referring still to FIG. 7C, cell phone case 21c optionally comprises additional polarization layer 28p similar to any of the teachings regarding display layers 28-1, 28-2 or 28-3 in FIGS. 5A, 5B and 5C respectively. When case 21c is further adapted to include either a passive or active polarization layer 28p as prior discussed in relation to FIGS. 5A, 5B and 5C, then guest 2 may wear and use any of glasses 14-1, 14-2 and 14-3 as a careful reading an understanding of the present invention will make clear, with all of the attending uses and benefits herein described. When case 21c is not further adapted to include either a passive or active polarization layer 28p as prior discussed in relation to FIGS. 5A, 5B and 5C, then guest 2 may wear and use active shutter glasses 14-2 as a careful reading and understanding of the present invention will make clear, with all of the attending uses and benefits herein described. The present inventor also anticipates that case 21c could be fitted with at least a passive (fixed) two-way mirror such as an acrylic film, either on top of an included polarization layer 28p or without a polarization layer 28p. Preferably, case 21c is fitted with an active (electronically switchable) transflective mirror such as 28c in mirror-display 20, whereby like mirror-display embodiment 20, mirror-display embodiment 20c is capable of switching between the states of substantially a full-mirror, to a half mirror—half display, to a substantially full display, all as prior discussed in relation to embodiment 20. If so adapted, mirror-display 20c may then controllably reflect guest 2's image without requiring that the controlling theme park app to output semi-transparent images of guest 2 in order to simulate a mirror effect.

Referring still to FIG. 7C, it is further preferred to adapt cell phone case 21c to additionally comprise a touch surface 28d using any of well known technologies that is placed or affixed over transflective mirror 28c, such that the touch surface is in between the transflective mirror 28c and the guest 2, where touch surface 28d then provides for touch input to the cell phone as the native touch surface provided with the native cell phone display has been covered over by any of the further adapted transflective mirror 28c or the further adapted polarizer screen 28b, as will be clear from a careful consideration of the present teachings. Alternatively, the present inventor anticipates that the combination of the touch surface 28d, transflective mirror 28c and the polarizer screen 28b can be affixed to a flap hinged to the cell phone case 21c such that when the flap is closed the combination of parts 28d, 28c and 28b substantially covers over the native cell phone display, and when the flap is open the same combination of parts is substantially displaced from covering the native display.

Furthermore, when the mirror-display 20 is implemented in the cell-phone (or mobile tablet) form such as 20b shown in FIG. 7B or 20c shown in FIG. 7C, it is then possible to use the cell phone's native location tracking and orientation sensing devices for providing additional guest datum to any of the components of system 1 in communications with the mirror-display 20b or 20c, such as local 30 or global 40 eco-systems. Guest datum including a GPS location of the mirror-display 20b or 20c is useful in a theme park setting for example to determine that the guest is in a ride line, in a store, walking towards a certain location, etc., where this useful guest datum provides additional opportunity for triggering mirror-display 20b or 20c functions and for supporting the game play enabled by the system 1, all as will be well understood by those familiar with guest entertainment and gaming. For example with game play, the guest 2 might be required to cast different spells in different locations of the theme park or associated hotel areas at different times, where the guest 2 casts a spell using an article 12 such as a Harry Potter wand additionally comprising any of added markers such as 13-a, 13-b or 13-c, and where the required appropriate movements of the wand 12 are confirmed using either the cell phone's native camera comprised within device 20b or 20c, or the camera 14-cam comprised within glasses 14 being worn by the guest 2, all of which has been prior described herein. In another example, guests 2 waiting in or outside of a ride line might engage in a spell-casting contest where the winner is provided with an electronic coupon transmitted by any of local 30 or global 40 eco-systems to the guest's 2 cell phone app, where then this coupon might be usable to switch the guest into a "fast last" line for the same ride, or perhaps provide a discount in a theme park store or restaurant. As the careful reader will see, there are many possibilities enabled by the present system 1 for providing increased guest enjoyment and activities at any number of destinations such as theme parks, hotels, restaurants, air ports, museums, etc. And finally, when the mirror-display 20 is implemented in a mobile form such as 20b or 20c, these mobile devices typically include native means for providing an audio layer 26 and often include sufficient native guest ID reader means 22c for performing guest identification, for example where native guest ID reader means 22c is near field communications (NFC) that is capable of detecting RF IDs as is well-known in the art.

Referring next to FIG. 8, there is shown a preferred alternate remote-active article 12b comprising a shaft 12b-s within which one or more IR emitting LEDs such 12b-IR-LED1, 12b-IR-LED1 or 12b-IR-LED1 are embedded, where the IR emitting LEDs are powered by a rechargeable battery 12b-b connected to the LEDs in a circuit also comprising wireless power system transmitter-receiver 12b-tr. Shaft 12b-s preferably comprises a material such as acrylic that it is at least substantially transmissive to the IR wavelengths emitted by any of IR LEDs such as 12b-IR-LED1, 12b-IR-LED1 or 12b-IR-LED1, where typically these wavelengths are within what is referred to as the near-IR region comprising 700 nm to 1000 nm that is also detectable by a typical visible light sensor as might be included within a typical mobile device such as a cell phone. One such source for this acrylic material is URL www.tapplastics.com that sells a product called ACRYLITE, versions of which meet these criteria of being substantially transmissive to near-IR emitted by the IR LEDs 12b-IR-LED1, 12b-IR-LED1 or 12b-IR-LED1 and detectable by a camera 10's sensor such as might be found in a cell phone or tablet. Many other sources of sufficient acrylic are available. Furthermore, ACRYLITE comes in a version referred to as "ACRYLITE GP Black 1146-0 IR Transmitting," where this version of ACRYLITE substantially absorbs visible light (and is therefore visually black,) while then also substantially transmitting the near-IR spectrum. A typical use for such a material is for the dooms covering an IR security camera, all of which is well-known in the art of security camera systems.

Still referring to FIG. 8, it is also possible to provide pigments or paints 12b-sp on shaft 12b-s that provide a visible color while then still sufficiently transmitting some amount of the near-IR spectrum, where for example that some amount typically ranges depending upon the paint from 20% to 90%. These types of paints 12b-sp are generally referred to as "infrared transparent" ink or paint. Many paints have this characteristic but must be separately tested using a test rig including an IR emitter and IR sensitive camera, since many manufacturers of paints do not specifically test for what is generally known in the art as the spectral response of the paint. The present inventor has found several IR transparent inks or paints 12b-sp that are generally available in craft and supply stores. While the visible color black is easily obtained with very high IR transmission characteristics, many other paints 12b-sp exist that can be used to provide the article with a desired visible color while still allowing a substantial percentage of the infrared light emitted by the IR LEDs such as IR LEDs 12b-IR-LED1, 12b-IR-LED1 or 12b-IR-LED1 to be first transmitted through shaft 12b-s, second transmitted through a visible light filter 10f and third sufficiently detected by IR sensitive camera 10 for the purposes of detecting and tracking the location of each of any IR LEDs such as IR LEDs 12b-IR-LED1, 12b-IR-LED1 or 12b-IR-LED1 and therefore of tracking the article 12b in 2 to 6 DOF.

As will be well understood by those familiar with object tracking systems, using an active emitter of IR light within the article 12b is preferable versus having a passive reflector or retroreflector marker embedded within the shaft 12b-s, since the passive markers require the emission of IR light by or near the camera (see element 14a in FIG. 2A,) and this light emission will attenuate significantly (and therefore is limited in distance) based at least upon the distance between the emitter 14a and the article 12b as well as the IR transmissivity of the shaft 12b-s, all of which will be well understood by those familiar with IR based object tracking systems. One advantage of embedding passive markers within the shaft 12b-s is that it is easier for manufacturing and the guest 2 to not include battery means 12b-b that must be replaced or the functioning of the article 12b will ultimately be curtailed. For this reason, the present inventor prefers using new remote power systems such as sold by Ossia Inc. or other manufacturers for at least remotely charging an embedded battery 12b-b, where the remote power system extends over a significant distance and therefore can also service the recharging of a multiplicity of articles 12b without requiring that for example that the guest 2 place their specific article 12b in what is often called a charging cradle or dock.

Ossia Inc. refers to their remote wireless power technology as Cota that comprises both a Cota Power Transmitter that communicates with a Cota Power Receiver, where for example the Cota Power Transmitter is element 25 of the present figure while the Cota Power Receiver is element 12b-tr. Several advantages of the Ossia technology are: 1) multiple transmitters (also referred to as Cota Tiles) can be configured to cover a large area as might be expected in a destination such as a theme park, for example a waiting area, shop or restaurant; 2) the Cota transmitter and Cota receiver are in communications wherein a unique id representative of the specific receiver and therefore a specific article 12b is transmittable for uniquely addressing the article 12b; 3) preferably using the same communications path (i.e. Cota transmitter to Cota receiver) it is possible to send at least on-off signals for controlling either all or individual LEDs IR LEDs such as 12b-IR-LED1, 12b-IR-LED1 or 12b-IR-LED1, depending upon the electronic circuit configuration connecting the LEDs to both power and the controlling device such as 12b-tr, all of which is well known in the art of electrical engineering, where it is also possible to embed other communications devices such as a low power Bluetooth chip within article 12b for either transmitting an article 12b ID and/or controllably operating any embedded IR LEDs such as IR LEDs 12b-IR-LED1, 12b-IR-LED1 or 12b-IR-LED1, and 4) the wireless power system will ensure that battery 12b-b remains sufficiently charged with a minimum of attention from a guest 2 so that article 12b can flash IR light to be received by camera 10 for IR marker tracking as controlled by system 1, all as is well-known in the art.

As those familiar with remote wireless power systems will understand, there are several possible systems either available on the market today or becoming available that offer different features and advantages for use with the presently described system 1 comprising article 12b. What is most important is that there is a means for ensuring that the battery 12b-b of article 12b remains sufficiently powered for a guest 2 while allowing guest 2 to move about within a destination largely unaware or concerned about the charged state of the battery 12b-b. What is also desirable is that the same communications path for remotely charging the battery 12b-b is also further adaptable to provide article 12b control functions including providing a unique article 12b ID to system 1 and receiving from system 1 control signals preferably encoded with the unique ID such that system 1 can operate a specific article 12b from within a multiplicity of articles 12b, where operating includes causing any one or more embedded IR LEDs such as 12b-IR-LED1, 12b-IR-LED1 or 12b-IR-LED1 to emit IR light at a given time and for a given duration. The present inventor further notes that the current Cota technology communicates at a rate of 100 times per second, which is sufficient for synchronizing the flashing of IR LEDs such as 12b-IR-LED1, 12b-IR-LED1 or 12b-IR-LED1 timed with the capturing of images using camera 10, where sufficient images include rates of 30 to 60 frames per second, all as will be well understood by those familiar with image processing and object tracking systems.

Still referring to FIG. 8, for the purposes of backwards compatibility with the existing Universal Studios Harry Potter Wand, it is preferable that an article 12*b* further include a retroreflector 20 visually exposed in the tip of the article 12*b* (all as taught by Kwash, et. al.) While the presently described article 12*b* is sufficiently operable without retroreflector 20 for determining at least 2 DOF (using at least 1 embedded IR LED) and the desirable 6 DOF (using at least 3 IR LEDs such as 12*b*-IR-LED1, 12*b*-IR-LED1 or 12*b*-IR-LED1,) including the retroreflector 20 can be considered as additional to the desirable 3 IR LEDs or as a replacement of 1 of the 3 desirable embedded IR LEDs. The present inventor also notes that like article 12, article 12*b* may take the form of a wand but then can be other forms such as a Disney Light Saber, or a Wizard's Staff, swords, rifles, etc.

Referring next to FIG. 9, there is shown a flow diagram of the five main internal functions of the mirror-display 20. These five main internal functions include: 1) detecting a guest's presence 20-*f*1; 2) identifying the detected guest 20-*f*2; 3) detecting guest inputs 20-*f*3; 4) determining and processing the detected inputs 20-*f*4 as guest responses and commands, and 5) controllably operating mirror-display parts 20-*f*5 (also referred to as components.) The reader is referred to the specifications and drawings provided herein describing the preferred and alternative apparatus and methods for performing these five main internal functions as depicted in the present figure. The processing within mirror-display 20 further comprises four main tests including: 1) determining if the device (mirror-display 20) is switched on 20-*t*1; 2) determining if a guest has been detected 20-*t*2; 3) determining the identity of a detected guest 20-*t*3, and 4) determining if a guest's interaction with the mirror-display 20 is concluded 20-*t*4. It is preferable that each of four main tests are implemented as specialized computer algorithms executed on computing apparatus comprised within computing and communications layer 22. However, as will be well understood by those skilled in the art of computing systems, it is possible that any and each of the specialized computer algorithms may be executed on computing apparatus that is comprised within other component-parts of the mirror-display 20. What is important is the relationship of the various tests to the various functions and the apparatus and methods that provide the datum being used in part for the processing of the various tests.

Still referring to FIG. 9, processing within mirror-display 20 preferably starts with determining if the device (mirror-display 20) is switched on or off using test 20-*t*1. As prior described, in some use cases mirror-display 20 is anticipated to be in public-private settings such as a hotel/resort room at a theme park, where the guests staying in the room might prefer to not use any of the features of the mirror-display 20 other than its function as a full-mirror. As will be well understood by those familiar with electronic devices that include "on/off" switches, there are many possible ways of implementing the apparatus necessary for determining test 20-*t*1. For example, there could be a decorative push-button switch themed to match the look of the mirror-display 20 that is affixed to the wall near the mirror-display, but not otherwise physically touching the mirror-display 20. Whether physically separated or physically joined to the mirror-display 20, such a on/off switch maintains a communication path with preferably the computing and communications layer 22 that is either wired or wireless. What is most important is that a guest of the (presumably private) local area in which the mirror-display 20 is situated, has means for disabling the functions of the mirror-display 20 especially including the functions of the object tracking system layer 24 and any included cameras 10. What is also desirable is that in the off state, the switchable transflective mirror 28*c* maintains the state of substantially reflective and is therefore operating as a full-mirror. While on/off test 20-*t*1 is a desirable function given some use cases such as a hotel/resort room, in other use cases it is desirable that the mirror-display is always on and therefore this first on/off test 20-*t*1 and any necessary apparatus and methods are considered to be optional, as mirror-display 20 has many novel and useful tests and functions regardless of on/off test 20-*t*1.

Still referring to FIG. 9, after it has been determined that mirror-display 20 is switched on, guest detection test 20-*t*2 commences the processing of any datum determined by function 20-*f*1 regarding the detection of a guest 2's presence within a proximity of the mirror-display 20. The present invention has provided many descriptions herein of apparatus and methods for detecting the presence of a guest 2 in the proximity of mirror-display 20, any one of which, or any combination of which are sufficient for providing detections to test 20-*t*2. As will be further understood by those familiar with electronic apparatus, it is possible that the many apparatus herein described for detecting the presence of a guest 2 are themselves either turned on and operational even if mirror-display 20 is turned off or are only turned on and operational after the mirror-display 20 is turned on. Furthermore, in the case where any of the guest detecting apparatus are turned on even when the mirror-display is turned off, it is also possible that the output communications of these any guest detecting apparatus with the apparatus and methods for implementing test 20-*t*2 are ceased, or that the output communications are continuing but that the processing of the communicated guest detections by test 20-*t*2 apparatus and methods is ceased. What is most important to see is that when mirror-display 20 is on, whether turned on or always on, any of the guest detection apparatus and methods as described herein, or any of the anticipated or obvious equivalents, provide guest detection datum to the apparatus and methods responsible for executing test 20-*t*2.

Still referring to FIG. 9, it is possible that any one of, or any combination of apparatus and methods for implementing guest presence detection function 20-*f*1 are always on and also providing datum to device switched on test 20-*t*1, such that the determination of whether the mirror-display 20 is turned on or off is at least in part determined by any of datum determined by function 20-*f*1. As prior described in the present specification, it is possible that guest detection datum is determined by apparatus and methods external from the apparatus and methods comprised as components within mirror-display 20 and responsible for implementing function 20-*f*1, where for example datum are determined by environment sensing system 32. Such externally determined guest presence datum can be provided either directly to a mirror-display 20 component implementing function 20-*f*1 or can be provided directly to the mirror-display 20 component implementing test 20-*t*2, or any combination thereof as will be obvious to those familiar with the necessary arts.

Still referring to FIG. 9, test 20-*t*2 determines if a guest is detected within the proximity of the mirror-display 20 based at least in part upon any of the guest detected datum provided by any one of, or any combination of the apparatus and methods for implementing guest detection as herein described or their equivalents, whether or not the apparatus and methods are comprised internal or external with respect to mirror-display 20. As depicted in the present figure, the guest detected test 20-*t*2 is preferably continuously active wherein after a first guest 2 is detected within the proximity of mirror-display 20 the function 20-*f*1 (whether performed with internal or external apparatus and methods) continues to operate such that it is possible to then also detect an second and other guests 2 within the proximity of mirror-display 20. For each one or more guests 2 detected, datum indicative of the detection is provided by the apparatus and methods performing test 20-*t*2 to each of: 1) function 20-*f*2 for identifying a detected guest; 2) function 20-*f*3 for detecting a guest's input, and 3) function 20-*f*4 for determining and processing inputs, where for example this detection of presence is used at least in part by function 20-*f*4 to determine a command and information for controllably changing the state of one or more components of the mirror-display such as: a) changing the reflective state of transflective mirror 28*c* from any one current state such as full reflective (mirror,) partially reflective (half-mirror,) or substantially transparent (display) to any other different reflective state; b) outputting a visual image or video on display 28*a*, including any of a secret message along with any of control signals to glasses being worn by the guest 2; c) outputting audio through speaker 26*b*, or any of a secret message through speakers 14-*a*1, 14-*a*2 on glasses being worn by the guest 2, or d) issuing commands to the external control system 34 for causing a change in any of the controlled environment attributes.

Still referring to FIG. 9, after it has been determined that a guest 2 is present within a proximity of the mirror-display 20, guest identification test 20-*t*3 commences the processing of any datum determined by function 20-*f*2 regarding the identification of a detected guest 2. The present invention has provided many descriptions herein of apparatus and methods for determining the identity of a guest 2 detected in the proximity of mirror-display 20, any one of which, or any combination of which are sufficient for providing detections to test 20-*t*3. As will be further understood by those familiar with electronic apparatus, it is possible that the many apparatus herein described for detecting the identity of a guest 2 are themselves either turned on and operational even if mirror-display 20 is turned off or are only turned on and operational after the mirror-display 20 is turned on. Furthermore, in the case where any of the guest identification apparatus are turned on even when the mirror-display is turned off, it is also possible that the output communications of these any guest identifying apparatus with the apparatus and methods for implementing test 20-*t*3 are ceased, or that the output communications are continuing but that the processing of the communicated guest identification by test 20-*t*3 apparatus and methods is ceased. What is most important to see is that when mirror-display 20 is on, whether turned on or always on, any of the guest identification apparatus and methods as described herein, or any of the anticipated or obvious equivalents, provide guest identification datum to the apparatus and methods responsible for executing test 20-*t*3.

Still referring to FIG. 9, it is possible that any one of, or any combination of apparatus and methods for implementing guest identification function 20-*f*2 are always on and also providing datum to device switched on test 20-*t*1, such that the determination of whether the mirror-display 20 is turned on or off is at least in part determined by any of datum determined by function 20-*f*2. It is possible that guest identification datum is determined by apparatus and methods external from the apparatus and methods comprised as components within mirror-display 20 and responsible for implementing function 20-*f*2, where for example datum are determined by the guest 2 using a mobile device running an app, where the mobile device and app are in communications with the mirror-display 20 for providing guest identification datum. Such externally determined guest identity datum can be provided either directly to a mirror-display 20 component implementing function 20-*f*2 or can be provided directly to the mirror-display 20 component implementing test 20-*t*3, or any combination thereof as will be obvious to those familiar with the necessary arts.

Still referring to FIG. 9, test 20-*t*3 determines if a guest 2 in the presence of mirror-display 20 has been identified based at least in part upon any of the guest identification datum provided by any one of, or any combination of the apparatus and methods for implementing guest identification as herein described or their equivalents, or as is commonly used within the art available to a particular destination, whether or not the apparatus and methods are comprised internal or external with respect to mirror-display 20. As depicted in the present figure, the guest identified test 20-*t*3 is preferably ceased with respect to any guest 2 determined to be present within a proximity of mirror-display 2 and also identified, although as will be obvious to those skilled in the art of identification systems, this is not mandatory as redundant identification does provide some benefits with minimal costs such as additional computational time. It is possible that multiple guests 2 are detected in the proximity of mirror-display 20 and that at least one of guests 2 is identified while at least one of other guests 2 is not yet identified and or remains un-identified and therefore with respect to any present and un-identified guests test 20-*t*3 remains in operation.

For each one or more guests 2 identified, datum indicative of the identification is provided by the apparatus and methods performing test 20-*t*3 to each of: 1) function 20-*f*3 for detecting a guest's input, and 2) function 20-*f*4 for determining and processing inputs, where for example this detection of identity is used at least in part by function 20-*f*4 to determine a command and information for controllably changing the state of one or more components of the mirror-display such as: a) changing the reflective state of transflective mirror 28*c* from any one current state such as full reflective (mirror,) partially reflective (half-mirror,) or substantially transparent (display) to any other different reflective state; b) outputting a visual image or video on display 28*a*, including any of a secret message along with any of control signals to glasses being worn by the guest 2, where the choice of the visual image or video output including the secret message is based at least in part upon determined identity of the guest 2; c) outputting audio through speaker 26*b*, or any of a secret message through speakers 14-*a*1, 14-*a*2 on glasses being worn by the guest 2, where the choice of the audio output including the secret audio message is based at least in part upon determined identity of the guest 2, or d) issuing commands to the external control system 34 for causing a change in any of the controlled environment attributes.

Still referring to FIG. 9, after it has been determined that a guest 2 is present within a proximity of the mirror-display 20 by function 20-*f*1 and is therefore capable of providing input to function 20-*f*3, or furthermore that the guest 2 has also been identified by function 20-*f*2, guest interaction concluded test 20-*t*4 commences the processing of any datum provided by determine and process inputs 20-*f*4, where function 20-*f*4 determines a time at which a guest 2's interactions with mirror-display 20 have concluded or are being concluded for any reason based upon any commands or datum input to function 20-*f*4 and provides an indication to test 20-*t*4 such that test 20-*t*4 then re-initiates test 20-*t*1, where the re-initiation optionally includes turning off mirror-display 20. As will also be well understood, if multiple guests 2 have been determined to be within the proximity of mirror-display 2, where a first guest 2 has been given exclusive control over the inputs to mirror-display 20, then ceasing a guest 2's interactions can be limited to switching exclusive control to another guest 2 as opposed to turning off the mirror-display 20 and returning to test 20-*t*1. What is important to understand is that when using a device such as mirror-display 20 in a shared use case, it is advantageous to provide exclusive control to a single guest 2 and to definitively limit the this control from a beginning time to and ending time based upon any of criteria especially including commands or datum related to a game being conducting by for example the interactive gaming system 36 or 48.

As prior indicated and as will be understood by those familiar with multi-user systems, it is possible that multiple guests 2, whether identified or not, are each detected and providing inputs to mirror-display 20. However, as will also be understood by those familiar with games and shared devices, it is preferable that only one guest 2 is providing inputs at any given time to mirror-display 20. Given the present teachings, especially including article 12*b* taught in relation to FIG. 8, it is possible to determine which of several articles such as 12*b* that are detected within a proximity of mirror-display 20 are associated with a given identified guest 2, based at least upon a correlation between the ID of the detected article 12*b* and the pre-known association of a guest ID with an article ID, all as herein explained and is otherwise well-known in the art of gaming systems. When using an article such as 12 (including a currently available Harry Potter Wand) that is not capable of providing datum indicative of a unique id for associating with an identified guest 2, as will be understood by those familiar with image processing, it is still possible to associate the non-identified article 12 with an identified guest 2 using image analysis. For example, it is possible that any one or more cameras 10 comprised within the preferable object tracking system 24 capture images of two or more guests 2 in the proximity of mirror-display 20, after which visual or audible instructions are output for interacting with all detected guests 2 to determine which of the guests 2 is to be given exclusive control of the mirror-display, for example by requiring the controlling guest 2 to stand in a front-and-center position with respect to the mirror-display while the non-controlling guests 2 are directed to stand in a sufficiently different position so as to not create occlusions or algorithm ambiguity for example as determined by the processing of currently captured video images.

Still referring to FIG. 9, in the preferred operation a controlling and identified guest 2 provides input to mirror-display 20 using any of the apparatus and methods described in the present specification, any one of which, or any combination of which are sufficient for providing input to function 20-*f*3. As will be further understood by those familiar with electronic apparatus, it is possible that the many apparatus herein described for detecting guest 2 input are themselves either turned on and operational even if mirror-display 20 is turned off or are only turned on and operational after the mirror-display 20 is turned on. Furthermore, in the case where any of the guest input detection apparatus are turned on even when the mirror-display is turned off, it is also possible that the output communications of these any guest input detecting apparatus with the apparatus and methods for implementing function 20-*f*4 are ceased, or that the output communications are continuing but that the processing of the communicated guest detected input by function 20-*f*4 apparatus and methods is ceased. What is most important to see is that when mirror-display 20 is on, whether turned on or always on, any of the guest input detection apparatus and methods as described herein, or any of the anticipated or obvious equivalents, provide guest input detection datum to the apparatus and methods responsible for executing function 20-*f*4.

Still referring to FIG. 9, it is possible that any one of, or any combination of apparatus and methods for implementing guest input detection function 20-*f*3 are always on and also providing datum to device switched on test 20-*t*1, such that the determination of whether the mirror-display 20 is turned on or off is at least in part determined by any of datum determined by function 20-*f*3. It is possible that guest input datum is determined by apparatus and methods external from the apparatus and methods comprised as components within mirror-display 20 and responsible for implementing function 20-*f*3, where for example input datum are determined by the guest 2 using a mobile device running an app, where the mobile device and app are in communications with the mirror-display 20 for providing the input datum. As also herein described, input datum using article 12 alone or as augmented with additional markers 13-*a*, 13-*b* or 13-*c*, or using article 12*b*, may be determined by a mobile device, where the mobile device and app are in communications with the mirror-display 20 for providing the input datum. Such externally determined guest input datum can be provided either directly to a mirror-display 20 component implementing function 20-*f*3 or can be provided directly to the mirror-display 20 component implementing function 20-*f*4, or any combination thereof as will be obvious to those familiar with the necessary arts.

For a guest 2 providing input as determined by function 20-*f*3 to function 20-*f*4 this guest input is used at least in part by function 20-*f*4 to determine a command and information for controllably changing the state of one or more components of the mirror-display such as: a) changing the reflective state of transflective mirror 28*c* from any one current state such as full reflective (mirror,) partially reflective (half-mirror,) or substantially transparent (display) to any other different reflective state; b) outputting a visual image or video on display 28*a*, including any of a secret message along with any of control signals to glasses being worn by the guest 2, where the choice of the visual image or video output including the secret message is based at least in part upon determined guest 2 input; c) outputting audio through speaker 26*b*, or any of a secret message through speakers 14-*a*1, 14-*a*2 on glasses being worn by the guest 2, where the choice of the audio output including the secret audio message is based at least in part upon determined guest 2 input, d) issuing commands to the external control system 34 for causing a change in any of the controlled environment attributes, or e) providing any of movement feedback such as 29*a* or 29*b*.

Still referring to FIG. 9, determine and process input function 20-*f*4 is preferably always receiving and processing input datum at least while mirror-display 20 is turned on or otherwise considered operational, where input datum includes any one of, or any combination of: 1) guest 2 presence detected datum provided by test 20-*t*2; 2) guest 2 presence detected datum (such as a command) provided by external environment sensing system 32; 3) guest 2 identified datum provided by test 20-*t*3; 4) guest 2 detected input datum provided by function 20-*f*3, or 5) any of commands received from any of external systems including a destination administration system 42 or 44, a guest tracking system 46, or an interactive gaming system 36 or 48. Using any one of, or any combination of input datum, function **20-*f*4 determines at least one command for providing to any one of, or any combination of: 1) external systems such as 42, 44, 46, 36 or 48 or an external environment control system 34, or 2) function 20-*f*5 for controllably operating mirror-display parts. As will be well understood by those familiar with software systems and devices, it is possible that functions 20-*f*4 and 20-*f*5 are combinable into a single function, of that at least some of the inputs provided to function 20-*f*4 or instead provided to, or in combination provided to function 20-*f*5, where function 20-*f*5 controllably operates any of mirror-display 20 parts based upon these inputs preferably provided to function 20-*f*4. What is most important to see is that the various inputs as herein described to function 20-*f*4 are processed for determining commands and other datum useful for causing any one of, or any combination of changes in the states of external systems 42, 44, 46, 36, 48 or 34 or the states of any of the components comprised within mirror-display 20. Those skilled in the necessary arts discussed herein especially including information systems and devices will recognize other variations of the presently described system 1 and especially mirror-display 20**, where these variations remain within the spirit of the present invention.

Conclusion and Ramifications

Thus the reader will see that the present invention accomplishes its objective of teaching the apparatus and methods for: 1) providing visual article 12 movement feedback such as 29*a* or 29*b* to the guest 2 for practicing and leaning article movements; 2) extending the use and enjoyment of the article 12 tracking concepts, where the article 12 for example is Universal Studio's Harry Potter Wand, beyond the theme park into theme park hotels, restaurants and even to a guest 2's home; 3) providing means for conveniently sensing or in some way determining guest 2 identity; 4) providing access to theme park and hotel information systems through either or both local 30 or global 40 ecosystems for command and information exchange; 5) providing interfaces to local environment sensors and controls using either or both of environment sensing system 32 or environment control system 34 respectively, where the local environment includes a hotel room or guest home; 6) providing access for interacting with a distributed community of guests 2 for collective experiences including for example theme park-wide games, contests, treasure hunts, etc. controlled using an interactive gaming system 36 or 48; 7) interacting with a guest 2 wearing either passive or active glasses 14 for receiving secret messages and communications, and 8) interacting with a guest 2 via their mobile device 20*b*, 20*c* further adapted with a specialized theme park app causing the mobile device to act as a mirror-display and otherwise contribute as a theme park-wide game interface, as well as other benefits of the present invention that will be obvious to those skilled in the art of theme parks, guest services and entertainment.

As will be obvious to those skilled in the various arts herein mentioned, and by a careful reading of the present invention, many of the exemplifications have obvious alternates that have not been described, or as will become obvious as the herein specified underlying technologies are advanced. The present inventor expects significant advancements in display output resolutions (supporting spatial disguising,) as well as image frame rates and refresh rates (supporting hiding and blending.) Also anticipated are significant advancements in transflective mirrors even including new technologies for accomplishing the same effect other than those currently available or mentioned herein. Significant advancements are also anticipated in transflective liquid crystal displays, thus supporting faster switching speeds and higher frame rates for polarizers and active shutters, all of which support the disguising of secret 2D and 3D messages.

Many uses enabled by the herein taught apparatus and methods have not been described or fully described and will also be obvious to those skilled in the necessary arts. For example, a video secret message is displayed to selected guests in the form of a code, possibly using some make believe themed written language. Each of multiple selected guests then enters the secret code into their mobile device theme park app, where the app then translates the secret message into a unique readable message specifically for each individual guest. This allows for a fast way of engaging a large group of guests, were a single "secret code" is translated into multiple secret messages. In a variation of this method, a single secret message/code is flashed as visual output using a mirror-display for a brief time to multiple selected guests each wearing glasses, each of whom then have a short period of time to look at their mobile device park apps and select the correct secret code that was just flashed from a list of possible codes that are transmitted to the mobile device app by a system component such as the mirror-display. Only if the guest chooses correctly will they receive benefits such as the translated secret message.

Another use case anticipated by the present inventor is for customizable movies shown in movie theaters adapted according to the teachings herein, where it is also understood that at least the outer touch and transflective layers are not required within the display layer 28. Such an adapted movie theater might include a more sophisticated object tracking system 24, e.g. including many more cameras for viewing all seats and therefore all patrons 2 wearing uniquely encoded glasses 14. Conversely, the movie theater may use some technology for tracking the locations of glasses 14 other than cameras, e.g. unique RFID antennas in each of glasses 14 detected at the patron's seat. Additionally, the present teachings are still useful for sending secret messages to uniquely addressable glasses 14 even if the location within the theater or the identity of the patron wearing the glasses 14 remains unknown. Regardless of the apparatus and method for selecting at least a unique pair of glasses 14 if not also a uniquely identified associated patron 2, the movie theater system adapted from the herein teachings of system 1 may now embed secret messages to be viewable by only one or more selected patrons 2*s*. In another variation, patrons 2 choose either of two oppositely polarized glasses, such as 14LL or 14RR (see especially FIGS. 2A, 2B and 2C) prior to entering the movie knowing that each set of glasses might for instance see 80%-90% of the same movie with some key 20%-10% of scenes that are different, creating vastly different interpretations of the same basic movie.

As will also be understood by those familiar with see-through transparent OLED or LED displays as currently sold in the market by companies such as LG, Panosonic, Yipled, it is possible to construct the display layer 28 of a mirror-display 20, with or without the transflective layer, that has a substantially transparent backing. As will be understood by those familiar with this type of technology, when the transparent display is in operation, it will be perceived as a traditional display and guests 2 will only notice the output images, but when not in operation the display will appear as a transparent glass window. As will also be understood, when the display is in operation it is actually outputting multiple images per second that appear to form an opaque image, however, in between these output images the display is still transparent. The present inventor anticipates using these transparent displays within a mirror-display's 20 display layer 28, such that while guests 2 without active shutter glasses 14-2 or 14-3 only perceive the images being output by the transparent display, guests 2 wearing active shutter glasses 14-2 or 14-3 that are synchronized by mirror-display 20 to only open when the display output is off will see right through the transparent display (even though it is still outputting images.) With this effect, the special theme park glasses 14-2 or 14-3 can be controlled to give selected guests 2s glimpses to controlled scenes otherwise hidden from all other guests 2o, where the controlled scenes might include themed characters, themed displays, or more clues.

Another anticipated use case for the display layer 28 implemented using a transparent display is for a shop-window similar to the arrangements currently used at Universal Studios where a guest 2 stands in front of the transparent shop window, moves their wand 12 and then if the spell movement is performed correctly sees some automatic movement within the shop through the window (e.g. a mechanical flower perks up.) Using the existing system implemented at Universal Studios, guests do not receive any visual movement feedback such as 29a or 29b increasing the difficulty of the task especially for younger children, whereas using the present system 1 where the display 28 is further adapted to be a transparent display, it is possible to then additionally provide visual movement feedback such as 29a or 29b.

While many examples have been given for using mirrors 20 in theme park and hotel room settings, another anticipated use is to have special seating areas along park ride line queues where the glasses 14 of individual guests 2 are detected as they walk by. The seating area includes a mirror-display 20, where the system 1 follows some algorithm for selecting guests 2 to leave the line and become engaged in some fun task or challenge, especially using their article 12 such as a Harry Potter Wand. If the guest 2 successfully completes the challenge, they are given some benefit, for example being allowed to switch into a "fast lane" or getting a coupon for a snack, meal or gift. The present inventor also notes that many existing theme park rides already provide and require 3D glasses to be worn by guests 2. For these rides, the glasses 14-1, 14-2 or 14-3 as herein specified would be usable by guests 2 in place of the generic glasses. Furthermore, guests wearing the glasses 14-1, 14-2 or 14-3 as herein specified verses the generic classes could then be controllably allowed to view additional scenes or secret messages along the ride.

It is also anticipated that any of the various lens configurations described for system glasses 14-1, 14-3 or 14-3 (see FIGS. 5a, 5b and 5c respectively,) can be implemented in a larger format such as a window-sized lens that is dividing two portions of a ride line, where first guests 2 in a first portion of the ride line are standing in front of a mirror-display 20 in any of its various configurations described herein that is outputting a secret message that is otherwise not substantially detectable by the first guests 2 while second guests 2 in a second portion of the ride line are looking through the window-sized lens at the first guests 2 that are standing in front of the mirror-display 20, where the second guests 2 are then conditionally or continuously enabled to see the secret message depending at least upon whether the window-sized lens is implemented with a passive lens such as 14-2 or active lens such as 14-2 or 14-3. In this use case example, it is anticipated that the secret message is funny or taunting with respect to the first guests 2 that are unaware of the message such that the second guests 2 are laughing or pointing in the direction of the first guests 2. Other uses and variations of a larger lens for use with the present teachings will be obvious especially to those familiar with theme parks, for example as a window on a ride car that controllably enables one or more guest to receive secret messages without having to wear ride glasses.

Still yet another anticipated variation is to article 12, where instead of being a Harry Potter Wand or Disney light saber, article 12 is a themed character mask with hidden retro-reflecting marks similar to the teachings of Kawash or as presently taught in reference to FIG. 8. When standing in front of mirror-display 20, guests wearing a themed character mask representing for example Mickey Mouse, would then see animated images of Mickey Mouse overlaid where they would normally see their own head. Another article 12 could be a themed character hand with for example the pointer finger sticking out and including a non-visible retro-reflector, or a unique visible color, such that tracking system 24 tracks the character pointer finger similar to tracking the wand tip.

And finally, another anticipated use for a mirror-display 20c as taught in FIG. 7C is for the theme park to sell or provide maps or documents that include what is generally referred to as "invisible ink." This invisible ink is well-known in the art of UV and IR imaging systems, where the present inventor anticipates using an irk that reflects only in the IR such that mirror-display 20c, being a hand-held mobile device adapted to output IR and receive filtered IR images, can capture images of these secret message for a guest 2. Furthermore, special themed pens with the invisible ink could be sold to guests 2 for the crafting of their own secret messages, where mirror-display 20 is also capable of reading these secret messages using its IR sensing camera and processing the images with any of several software algorithms capable of recognizing handwriting, as will be well understood by those skilled in the art of neural nets, OCR and other software algorithms.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An interactive mirror-display for use by a guest in an eco-system associated with an entity, comprising:
    a computing and communications layer part for determining and processing commands, where processing commands includes any one of, or any combination of exchanging commands via communications means with either of a local or global eco-system, or electronically controlling one or more functions of one or more parts of the mirror-display based at least in part upon a command;
    an electronically controllable display part operated by the computing and communications layer for outputting image and video datum as provided by the computing and communications layer, where at least some of the image or video datum is provided to the computing and communications layer by either the local or global eco-system in association with an exchanged command;
    an electronically controllable switchable transflective mirror part placed over the display part such that the transflective mirror is situated in between the guest and the display, where the mirror is controllably operated by the computing and communications layer for changing state between substantially reflective, transflective, and substantially transmissive, and where the state change is controlled by the computing and communications layer in response to a command, and an electronically controllable object tracking system layer part for determining motion datum in relation to an article being moved about by the guest within a proximity of the mirror-display, where the determined motion datum is provided by the object tracking system to the computing and communications layer, where the computing and communications layer determines article movement feedback image or video datum for output on the display based at least in part upon the motion datum, where the feedback image or video datum at least includes a visualization of the trajectory being traced by the article and where the computing and communications layer determines at least one command based at least in part upon the motion datum.

2. The system of claim 1 where either the local or global eco-system comprises at least one information system for determining and processing commands including datum, where processing includes any one of, or any combination of exchanging commands and datum with the mirror-display or causing changes to at least a datum comprised within the at least one information system based at least in part upon a command or datum included within a command, where the either local or global eco-system is in communication with the interactive mirror-display, and where the datum includes electronic datum in visual and audible formats including any of images, video, audio, and text.

3. The system of claim 2 where the computing and communication layer determines or receives any of guest datum associated with a command, where the computing and communication layer is further adapted to comprise means for identifying a guest in the proximity of the mirror-display, where guest identification means includes any one of, or any combination of an RFID reader for detecting and decoding an RFID associated with the guest, a bar code reader for detecting and decoding a bar code associated with the guest's ticket, facial recognition processing of images captured of the guest by a camera comprised within the object tracking system layer part, or barcode processing of images captured of a barcode by a camera comprised within the object tracking system layer part, and where guest datum includes any one of, or any combination of facial image(s) of the guest, their name, age, sex, first language, or guest-entity related datum comprised within the at least one information system of the either local or global eco-system.

4. The system of claim 3 where the guest wears filtering glasses for further providing a secret message to an identified guest based at least in part upon any one of, or any combination of guest datum, where the secret message includes at least visual datum output by the display part that is transmitted through filter lenses of the glasses worn by the identified guest such that the identified guest substantially perceives the transmitted secret message while another not identified guest does not substantially perceive the secret message.

5. The system of claim 4 where the glasses are further adapted to comprise:

a detector-communicator part for providing glasses datum to, or processing commands received from, either the computing and communications layer of the mirror-display or either of the local or global eco-systems, where providing glasses datum includes electronically transmitting glasses datum detected or determined by the parts of the glasses via communications means, where glasses datum includes any of a unique identifier, and where processing commands includes any one of, or any combination of electronically controlling one or more functions of one or more parts of the glasses based at least in part upon a command;

at least one location detector part for enabling any of either a global or local area positioning system, where the location detector either determines or provides location glasses datum sufficient for determining when the glasses are within a proximity of the mirror-display, and where the filter lenses of the glasses are an electronically controllable part that is capable of altering the state of the filter lenses to either transmit or block the secret message in response to controlling synchronization signals received from the detector-communicator part, where the detector-communicator part determines the controlling synchronization signals based at least in part upon a received synchronization command, and where the received synchronization command is based at least in part upon any one of, or any combination of glasses datum including the unique identifier of the glasses and the proximity of the glasses as well as any of guest datum associated with the unique identifier of the glasses.

6. The system of claim 5 where the glasses are further adapted to comprise:

at least one guest notification part for providing perceivable stimulus to at least the guest wearing the glasses in response to controlling notification signals received from the detector-communicator, where the detector-communicator determines the controlling notification signals based at least in part upon a received notification command, where the received notification command is based at least in part upon any one of, or any combination of glasses datum including the unique identifier of the glasses and the proximity of the glasses as well as any of guest datum associated with the unique identifier of the glasses, and where perceivable stimulus includes any one of, or any combination of visible light emitted by an LED guest notification part or vibrations emitted by a haptic or kinesthetic notification part.

7. The system of claim 5 where the glasses are further adapted to comprise:

an audio output part further providing an audible secret message to the guest wearing the glasses in response to audio datum received from the detector-communicator, where the detector-communicator determines the audio datum based at least in part upon a received audio command, where the received audio command is based at least in part upon any one of, or any combination of glasses datum including the unique identifier of the glasses and the proximity of the glasses as well as any of guest datum associated with the unique identifier of the glasses, and where the audio part includes speakers such as bone speakers integrated with the glasses.

8. The system of claim 5 where the glasses are further adapted to comprise:

at least one in-use detector part for determining and providing to the detector-communicator glasses datum regarding the in-use state of the glasses with respect to the guest, where the detector-communicator receives the in-use state datum for including with an in-use command, and where the received synchronization command for controlling the filter lenses is based at least in part upon any one of, or any combination of glasses datum including the unique identifier of the glasses, the proximity of the glasses and the in-use state of the glasses as well as any of guest datum associated with the unique identifier of the glasses, and where an in-use detector part includes any one of, or any combination of in-use frame hinges, in-use nose pads or in-use orientation detectors.

9. The system of claim 5 where the secret messages are coordinated between the mirror-display and the guest's glasses using either or both of image filtering or polarization filtering, where for image filtering the filter lenses of the glasses include an active shutter and the computing and communication layer provides controlling synchronization signals for causing the active shutter to be in a state of transmissive for transmitting the secret message to the guest or opaque for blocking any of image and video datum output by the display part from the guest, and where for polarization filtering the filter lenses of the glasses include an active polarizer and the mirror-display is further adapted to comprise an electronically controllable switchable polarization screen part placed over the display and under the switchable transflective mirror such that the polarization screen is situated in between the transflective mirror and the display, where the polarization screen is operated by the computing and communications layer for causing the secret message output by the display to be polarized to either of a linear or circular polarization, where the computing and communication layer provides controlling synchronization signals for causing the active polarizer of the filter lens to be in a matching polarization state with the switchable polarization screen for transmitting the secret message to the guest or in a not-matching polarization state with the switchable polarization screen for blocking any of image and video datum output by the display part from the guest.

10. The system of claim 2 where the entity is a destination that includes either or both an environment sensing system or an environment control system, where the environment sensing system comprises one or more environment sensing devices for detecting the state of various attributes of the local environment, where any one of, or any combination of the sensing device, the environment sensing system or the computing and communication layer of the mirror display determines and provides a sensing command based at least in part on any of the detected various attributes of the local environment, and where sensing commands are received and processed by either the computing and communication layer of the mirror-display or an information system comprised within either of the local or global eco-systems, and where the environment control system comprises one or more controllable devices or interfaces for setting or changing the state of various attributes of the local environment, where the environment control system receives commands and datum from either or both the computing and communication layer of the mirror-display or an information system of the either of the local or global eco-systems, and where the environment control system processes at least one received command by causing at least one controllable device or interface to be set or changed.

11. The system of claim 2 where the entity is a destination that includes an interactive gaming system for conducting a game to be played by one or more guests using one or more mirror-displays, where the interactive gaming system comprises any one of, or any combination of preferred game parts including a game state and control, game-human interfaces and game-pieces interfaces, where the interactive gaming system exchanges commands and datum with either or both the computing and communication layer of the mirror-display or an information system of the either of the local or global eco-systems, and where the interactive gaming system processes at least one received command by causing at least one change to a preferred game part.

12. The system of claim 2 where the entity is a destination that includes an administration system for managing administration datum including any one of, or any combination of guest related information, entity related information or product sales related information, where the administration system exchanges commands and datum with either or both the computing and communication layer of the mirror-display or an information system of the either of the local or global eco-systems, and where the administration system processes at least one received command by causing at least one change to any of administration datum.

13. The system of claim 2 where the entity is a destination that includes a guest tracking system for managing guest tracking datum including any one of, or any combination of guest current and historical locations, guest schedules and itineraries, guest content or guest social media controls and information and for automatically providing guest content via social networks based at least in part upon guest social media controls and information, where the guest tracking system exchanges commands and datum with either or both the computing and communication layer of the mirror-display or an information system of the either of the local or global eco-systems, and where the guest tracking system processes at least one received command by causing at least one change to any of guest tracking datum or by automatically providing guest content via social networks.

14. The system of claim 2 further comprising an audio layer part operated by the computing and communications layer, where the audio layer part comprises either or both a microphone for receiving audio datum or a speaker for outputting audio datum, where the computing and communication layer determines a command based at least in part upon any of the received audio datum, where the computing and communication layer provides audio datum for output and where at least some of the audio datum for output is provided to the computing and communications layer by either the local or global eco-system in association with an exchanged command.

15. The system of claim 2 further comprising a touch surface part placed, including a configuration wherein the touch surface part is placed over the transflective mirror part such that the touch surface is situated in between the guest and the transflective mirror, where the touch surface is controllably operated by the computing and communications layer for accepting touch inputs from the guest, and where the computing and communications layer determines at least one command based at least in part on any of touch inputs.

16. The system of claim 1 where the object tracking system part comprises at least one camera for capturing and processing images of an area in front of the mirror-display wherein the guest is expected to be located, where the guest holds and moves an article within the view of the at least one camera, where the article comprises one or more markers that are detectable by the capturing and processing of the images, where processing on-going images includes detecting the location within each image of each one or more marker and translating the on-going location to movement trajectories associated with the article, where the movement trajectories are interpretable as guest responses and commands.

17. The system of claim 16 for tracking an article that is in the form of a wand including a Harry Potter Wand such as sold by Universal Studios, where a guest first adheres one or more sufficiently unique markers onto the exterior shaft of the wand, where the one or more sufficiently unique markers are detectable by the at least one camera, and where the capturing and processing of images translates the on-going locations of the one or more sufficiently unique markers into movement trajectories for interpretation as guest responses and commands.

18. The system of claim 17 where the form of the mirror-display is a mobile device held within a device case, where the computing and communications layer part is implemented as an app running on the mobile device, where the display part is the screen of the mobile device, where the object tracking system is implemented as a process either incorporated within the app or available to the app and executed on the mobile device, and where the mobile device includes any of a cell phone or tablet.

19. The system of claim 18 where the device case is further adapted to comprise the switchable transflective mirror, where the transflective mirror substantially covers the area comprising the mobile device display such that the transflective mirror is situated in between the guest and the display, where the device case further includes communications circuitry for allowing the computing and communications layer part that is an app running on the mobile device to operate the switchable transflective mirror.

20. The system of claim 19 where the device case is further adapted to comprise:
a moveable visible light filter that can be physically adjusted by the guest to either cover over the mobile device's native front facing camera, or not cover over the mobile device's native front facing camera, where when the visible light filter is covering the native camera the images captured by the native camera substantially represent infrared light comprised within the field-of-view of the native camera, and when the visible light filter is not covering the native camera the images captured by the native camera substantially represent any of the ambient light within the field-of-view of the native camera including at least any of visible and infrared light that is normally captured by the native camera, and
one or more infrared emitting LEDs situated sufficiently near the location of the native camera such that emitted infrared light that impinges upon a retroreflective surface such as a marker within the view of the native camera will be substantially retroreflected back into the native camera's sensor, where the one or more infrared emitting LEDs include communication circuitry for receiving signals from the object tracking system executed on the mobile device for activating the LEDs in synchronization with image capture and processing, and where the on-going locations of any one or more infrared retroreflecting or reflecting markers comprised within or attached to an article are captured by the native camera covered by the visible light filter such that the on-going locations of the infrared retroreflecting or reflecting markers are processed as movement trajectories for interpretation as guest responses and commands.

21. The system of claim 18 wear the guest wears glasses comprising a camera for capturing images of the guest's field-of-view, where the guest is moving the article within the field-of-view and the images captured by the glasses camera are communicated to the object tracking system for processing, where the article comprises one or more markers that are detectable by the capturing and processing of the images, where processing on-going images includes detecting the location within each image of each one or more markers and translating the on-going location into movement trajectories associated with the article, where the movement trajectories are interpretable as guest responses and commands.

22. A system for conducting games at a destination played by one or more guests using one or more articles, comprising:
one or more mirror-displays, where each mirror-display further comprises a computer and communications layer for determining commands based at least in part upon datum sensed by one or more components of the mirror-display, controlling the one or more components of the mirror-display in response to commands, and exchanging commands including information with either of a local or global eco-system associated with the destination, where the mirror-display components include a display for outputting visual information to the one or more guests in response to a command, an electronically controllable switchable transflective mirror situated between the display and the guest for controllably changing states between substantially reflective, transflective, and substantially transmissive in response to a command and an electronically controllable object tracking system for determining motion datum in relation to an article being moved about by a guest within a proximity of the mirror-display, where the determined motion datum is used at least in part by the computer and communications component to determine either of visual movement feedback that is output on the display substantially while the guest is moving the article or a guest article response-command, where an exchanged command received by the computer and communications component from either of the local or global eco-systems is any one of, or any combination of output commands or function commands, where output commands are used at least in part to determine visual information to be output on the display, where function commands are used at least in part for controlling any of the functions of the mirror-display components, where the either of a local or global eco-system further comprises at least an interactive gaming system for conducting a game, and where conducting a game includes providing commands to a mirror-display associated with an identified guest for causing changes to the components of the mirror-display including the output of a personalized game aspect such as a clue, question or task specific, receiving guest datum and inputs including at least one guest article response-command, and determining at least one personalized game aspect based at least in part upon at least one guest article response-command.

23. The system of claim 22 where the guest wears filtering glasses for further providing a secret message to an identified guest based at least in part upon any one of, or any combination of guest datum and inputs including a guest article response-command, where the secret message includes at least visual datum output by the display that is transmitted through filter lenses of the glasses worn by the identified guest such that the identified guest substantially perceives the transmitted secret message while another not identified guest does not substantially perceive the secret message, where the computing and communication layer is further adapted to comprise means for identifying a guest in the proximity of the mirror-display, where guest identification means includes any one of, or any combination of an RFID reader for detecting and decoding an RFID associated with the guest, a bar code reader for detecting and decoding a bar code associated with the guest's ticket, facial recognition processing of images captured of the guest by a camera comprised within the object tracking system, or barcode processing of images captured of a barcode by a camera comprised within the object tracking system, where the guest identification is used at least in part to retrieve predetermined guest datum and where guest datum includes any one of, or any combination of facial image(s) of the guest, their name, age, sex, first language, or guest-entity related datum comprised within the at least one information system of the either local or global eco-system.

24. The system of claim 22 where the either of a local or global eco-system comprises any one of, or any combination of information processing systems including an environment sensing system, an environment control system, a destination administration system or a guest tracking system, and where the either of local or global eco-systems updates at least one datum of at least one information system based at least in part from a command received from the computing and communications layer of the mirror-display.

25. A system for conducting games at a destination played by one or more guests using one or more articles and one or more mirror-displays, comprising means for:
  detecting the presence of a guest within a proximity of a mirror-display, where the mirror-display functions as any one of, or any combination of: a) a mirror that is detached from the guest, remains stationary with respect to the guest and reflects back an image of the guest across substantially the entire surface of the mirror-display, and b) a display that controllably emits light that is received on a direct optical path to the eyes of the guest;
  identifying a guest within the proximity of a mirror-display;
  detecting input from a guest within the proximity of a mirror-display;
  determining and processing inputs of a guest, and
  controllably operating mirror-display parts, where operations include changing the reflective and transmissive state of the mirror-display across substantially the entire surface of the mirror-display, providing visual movement feedback in relation to an article being moved by a guest, providing commands and information to an interactive gaming system and receiving commands from the interactive gaming system that include at least one personalized game aspect for output to a guest.

26. The system of claim 25 further comprising means for causing the output of the display to be a secret message that is substantially limited to being received only by the identified guest wearing filtering glasses.

27. The system of claim 25 further comprising any one of, or any combination of means for:
  sensing attributes of a local environment comprising the mirror-display and causing any one of, or any combination of a change in the functioning of the mirror-display or a change in the conducting of the game based at least in part upon a sensed attribute;
  causing changes to attributes of the local environment comprising the mirror-display;
  causing changes to datum within a destination administration system based at least in part upon a determined guest response or command, or
  causing changes to the conducting of the game based at least in part upon commands or datum provided by a guest tracking system to the interactive gaming system.

* * * * *